(12) United States Patent
Knutsson

(10) Patent No.: US 9,724,602 B2
(45) Date of Patent: Aug. 8, 2017

(54) METHOD FOR IMPLEMENTING A COMPUTER GAME

(71) Applicant: King.com Limited, St. Julians (MT)

(72) Inventor: Sebastian Knutsson, Stockholm (SE)

(73) Assignee: KING.COM LTD., St. Julians (MT)

(*) Notice: Subject to any disclaimer, the term of this patent is extended or adjusted under 35 U.S.C. 154(b) by 131 days.

(21) Appl. No.: 14/029,453

(22) Filed: Sep. 17, 2013

(65) Prior Publication Data

US 2014/0080561 A1    Mar. 20, 2014

Related U.S. Application Data

(60) Provisional application No. 61/701,907, filed on Sep. 17, 2012, provisional application No. 61/811,019, (Continued)

(30) Foreign Application Priority Data

Feb. 6, 2013    (GB) .................................. 1302121.7
Feb. 19, 2013   (GB) .................................. 1302910.3
(Continued)

(51) Int. Cl.
*A63H 13/10*    (2006.01)
*A63F 13/25*    (2014.01)
(Continued)

(52) U.S. Cl.
CPC .............. *A63F 13/25* (2014.09); *A63B 71/06* (2013.01); *A63F 13/00* (2013.01); *A63F 13/005* (2013.01);
(Continued)

(58) Field of Classification Search
CPC .......... A63F 13/10; A63F 13/18; A63F 10/32; G07F 17/32
See application file for complete search history.

(56) References Cited

U.S. PATENT DOCUMENTS 5,488,496 A    1/1996  Pine
6,068,552 A    5/2000  Walker et al.
(Continued)

FOREIGN PATENT DOCUMENTS

DE    10304725 A1    9/2004
EP    1564698 A2     8/2005
(Continued)

OTHER PUBLICATIONS

Amazon Survival YouTube video, Uploaded to YouTube on Mar. 13, 2009, 1 page, video length 6:06. https://www.youtube.com/watch?v=8S2gM5POUUk.*
(Continued)

*Primary Examiner* — Jay Liddle
*Assistant Examiner* — Alex F. R. P. Rada, II
(74) *Attorney, Agent, or Firm* — Saul Ewing LLP

(57) ABSTRACT

A method, implemented as computer code being executed by one or more processors, in which a computing device displays computer game graphics showing a gameboard with multiple game elements that are removed when matched or switched, such as in a match-3, clicker or switcher game; and in which the processor draws the elements as irregularly arranged columns of colored blocks; and the processor draws small animals are placed on or amongst the blocks; and the processor is programmed such that the object of the game is to enable a target number of the animals to descend to the ground and be rescued, by the player removing blocks from the gameboard.

40 Claims, 27 Drawing Sheets

Related U.S. Application Data filed on Apr. 11, 2013, provisional application No. 61/818,702, filed on May 2, 2013, provisional application No. 61/827,298, filed on May 24, 2013, provisional application No. 61/832,348, filed on Jun. 7, 2013, provisional application No. 61/832,355, filed on Jun. 7, 2013, provisional application No. 61/832,359, filed on Jun. 7, 2013, provisional application No. 61/832,362, filed on Jun. 7, 2013, provisional application No. 61/832,364, filed on Jun. 7, 2013, provisional application No. 61/832,369, filed on Jun. 7, 2013.

(30) Foreign Application Priority Data

| Date | Country | Number |
|---|---|---|
| Mar. 12, 2013 | (GB) | 1304442.5 |
| Mar. 12, 2013 | (GB) | 1304444.1 |
| Mar. 13, 2013 | (GB) | 1304545.5 |
| Apr. 4, 2013 | (GB) | 1306117.1 |
| Apr. 4, 2013 | (GB) | 1306118.9 |
| Jun. 13, 2013 | (GB) | 1310589.5 |
| Jun. 13, 2013 | (GB) | 1310592.9 |
| Jun. 21, 2013 | (GB) | 1311119.0 |
| Aug. 7, 2013 | (GB) | 1314147.8 |
| Sep. 10, 2013 | (GB) | 1316045.2 |

(51) Int. Cl.

| | | |
|---|---|---|
| G07F 17/32 | (2006.01) | |
| A63F 13/00 | (2014.01) | |
| A63B 71/06 | (2006.01) | |
| A63F 13/30 | (2014.01) | |
| A63F 13/40 | (2014.01) | |
| G06F 9/44 | (2006.01) | |
| A63F 13/428 | (2014.01) | |
| A63F 13/75 | (2014.01) | |
| A63F 13/537 | (2014.01) | |
| A63F 13/63 | (2014.01) | |
| A63F 13/46 | (2014.01) | |
| A63F 13/2145 | (2014.01) | |
| A63F 13/335 | (2014.01) | |
| A63F 13/822 | (2014.01) | |
| A63F 13/92 | (2014.01) | |
| A63F 13/80 | (2014.01) | |

(52) U.S. Cl.

CPC ............ *A63F 13/10* (2013.01); *A63F 13/12* (2013.01); *A63F 13/2145* (2014.09); *A63F 13/30* (2014.09); *A63F 13/335* (2014.09); *A63F 13/40* (2014.09); *A63F 13/428* (2014.09); *A63F 13/46* (2014.09); *A63F 13/537* (2014.09); *A63F 13/63* (2014.09); *A63F 13/75* (2014.09); *A63F 13/80* (2014.09); *A63F 13/822* (2014.09); *A63F 13/92* (2014.09); *G06F 9/44* (2013.01); *G07F 17/32* (2013.01); *G07F 17/3274* (2013.01)

(56) References Cited

U.S. PATENT DOCUMENTS

| | | | |
|---|---|---|---|
| 6,117,013 A | 9/2000 | Eiba | |
| 7,073,792 B2 | 7/2006 | Esposito et al. | |
| 7,749,060 B1 * | 7/2010 | Olmes et al. | 463/11 |
| 8,002,633 B2 | 8/2011 | Shimizu et al. | |
| 8,075,404 B2 | 12/2011 | Stamper et al. | |
| 8,088,010 B1 | 1/2012 | Hill et al. | |
| 8,237,743 B2 | 8/2012 | Csurka et al. | |
| 8,277,320 B1 | 10/2012 | Hart et al. | |
| 8,369,873 B2 | 2/2013 | Krasner et al. | |
| 8,388,446 B1 | 3/2013 | Craine et al. | |
| 8,526,490 B2 | 9/2013 | Buckley et al. | |
| 8,672,744 B1 | 3/2014 | Steere et al. | |
| 8,711,923 B2 | 4/2014 | Buckley et al. | |
| 8,727,893 B2 | 5/2014 | Otremba et al. | |
| 8,784,181 B2 | 7/2014 | Frank et al. | |
| 8,964,830 B2 | 2/2015 | Perlman et al. | |
| 9,033,803 B1 | 5/2015 | Etter et al. | |
| 2002/0068632 A1 | 6/2002 | Dunlap et al. | |
| 2002/0082068 A1 | 6/2002 | Singhal et al. | |
| 2002/0094870 A1 | 7/2002 | Murray et al. | |
| 2003/0049592 A1 | 3/2003 | Park et al. | |
| 2003/0074416 A1 | 4/2003 | Bates et al. | |
| 2003/0119581 A1 | 6/2003 | Cannon et al. | |
| 2004/0053688 A1 | 3/2004 | Hosaka et al. | |
| 2004/0137987 A1 | 7/2004 | Nguyen et al. | |
| 2004/0224772 A1 | 11/2004 | Canessa et al. | |
| 2005/0256985 A1 | 11/2005 | Shea et al. | |
| 2006/0068876 A1 | 3/2006 | Kane et al. | |
| 2006/0160620 A1 | 7/2006 | Matthews et al. | |
| 2006/0223635 A1 | 10/2006 | Rosenberg et al. | |
| 2006/0277474 A1 | 12/2006 | Robarts et al. | |
| 2006/0281541 A1 | 12/2006 | Nguyen et al. | |
| 2006/0287098 A1 | 12/2006 | Morrow et al. | |
| 2007/0077993 A1 | 4/2007 | Midgley et al. | |
| 2007/0259709 A1 | 11/2007 | Kelly et al. | |
| 2008/0005353 A1 | 1/2008 | Panabaker et al. | |
| 2009/0170608 A1 | 7/2009 | Herrmann et al. | |
| 2009/0203415 A1 * | 8/2009 | Falciglia, Sr. | 463/11 |
| 2009/0209311 A1 | 8/2009 | Bennett et al. | |
| 2010/0144426 A1 | 6/2010 | Winner et al. | |
| 2010/0151934 A1 | 6/2010 | Kniberg et al. | |
| 2010/0218135 A1 | 8/2010 | Brugler et al. | |
| 2010/0227675 A1 | 9/2010 | Luxton et al. | |
| 2010/0271367 A1 | 10/2010 | Vaden et al. | |
| 2010/0317437 A1 | 12/2010 | Berry et al. | |
| 2011/0014977 A1 | 1/2011 | Yamazaki et al. | |
| 2011/0053681 A1 | 3/2011 | Goldman et al. | |
| 2011/0111835 A1 | 5/2011 | Cohen et al. | |
| 2011/0136561 A1 | 6/2011 | Acres et al. | |
| 2011/0136572 A1 * | 6/2011 | Karn | 463/30 |
| 2011/0230246 A1 | 9/2011 | Brook et al. | |
| 2011/0269532 A1 | 11/2011 | Shuster et al. | |
| 2012/0030094 A1 | 2/2012 | Khalil et al. | |
| 2012/0040752 A1 | 2/2012 | Koo et al. | |
| 2012/0064969 A1 | 3/2012 | Uchibori et al. | |
| 2012/0077580 A1 | 3/2012 | Mahajan et al. | |
| 2012/0079126 A1 | 3/2012 | Evans et al. | |
| 2012/0122552 A1 | 5/2012 | Youm et al. | |
| 2012/0191606 A1 | 7/2012 | Milne et al. | |
| 2012/0198417 A1 | 8/2012 | Haviv et al. | |
| 2012/0311036 A1 | 12/2012 | Huhn et al. | |
| 2013/0035164 A1 | 2/2013 | Osvald et al. | |
| 2013/0109469 A1 | 5/2013 | Hill et al. | |
| 2013/0172061 A1 | 7/2013 | Iosilevsky et al. | |
| 2013/0267285 A1 | 10/2013 | Kelley et al. | |
| 2013/0316832 A1 | 11/2013 | Olofsson et al. | |
| 2013/0323697 A1 | 12/2013 | Shadduck et al. | |
| 2013/0331162 A1 | 12/2013 | Krivicich et al. | |
| 2014/0024450 A1 | 1/2014 | Ramachandran et al. | |
| 2014/0080600 A1 | 3/2014 | Knutsson et al. | |
| 2014/0235338 A1 | 8/2014 | Hansson et al. | |
| 2014/0252987 A1 | 9/2014 | Hinrichs et al. | |
| 2014/0342791 A1 | 11/2014 | Valeriano et al. | |
| 2014/0357367 A1 | 12/2014 | Lee | |
| 2014/0370950 A1 | 12/2014 | Jaksch et al. | |
| 2015/0050997 A1 | 2/2015 | Suzman et al. | |
| 2015/0174489 A1 | 6/2015 | Evald et al. | |

FOREIGN PATENT DOCUMENTS

| | | |
|---|---|---|
| EP | 1870143 A1 | 12/2007 |
| EP | 2211299 A2 | 7/2010 |
| JP | 2005-228086 | 8/2005 |
| JP | 2012-61060 A | 3/2012 |
| WO | WO01/46790 A2 | 6/2001 |
| WO | 2006/052212 A1 | 5/2006 |
| WO | 2007/078533 A2 | 7/2007 |

(56) References Cited

FOREIGN PATENT DOCUMENTS

| | | |
|---|---|---|
| WO | WO 2007/078533 | 7/2007 |
| WO | WO 2008/109685 A2 | 9/2008 |
| WO | 2009/029108 A1 | 3/2009 |
| WO | 2010/002897 | 1/2010 |
| WO | WO 2010/045716 A1 | 4/2010 |
| WO | 2010/083346 A1 | 7/2010 |
| WO | WO 2010/096784 A1 | 8/2010 |
| WO | 2011/011466 | 1/2011 |
| WO | WO 2011/041467 A2 | 4/2011 |
| WO | WO 2012/013198 A1 | 2/2012 |
| WO | WO 2013174933 | 11/2013 |

OTHER PUBLICATIONS

Candy Crush Saga for Facebook, Apr. 12, 2012, 1 page, YouTube video demonstrating levels 1-10, video length 15:23. https://www.youtube.com/watch?v=cfqHVkWX5yE.*

Anonymous, "Bejeweled 2 Wikipedia Article", Sep. 30, 2015, 1-3.

Anonymous, "Bejeweled article", Wikipedia, Sep. 30, 2015.

Anonymous, "Best iOS/Androoid cross-platform mobiledevelopment SDKs", retrieved from the Internet: URL:http://webification.com/best-iosandroid-cross-platform-mobile-development-sdks [retrieved on Jul. 2, 2013] XP055069062, Sep. 26, 2011, p. 1.

Anonymous, "Bubble Witch Saga—GameSpot", Retrieved from the Internet: URL:http://www.gamespot.co/bubble-witch-saga/ [retrieved on Mar. 21, 2014] XP055109245, pp. 1-2.

Anonymous, "Buck Rodgers Turn Based Strategy Game Design and Planning Document", https://cs.nyu.edu/courses/spring07/V22.0474.001/groups/tbsgame/tbsgame_des.pdf, Feb. 21, 2007.

Anonymous, "Candy Crush Saga Facebook Game levels 1-10 video on YouTube, YouTube screen shorts figures 1-7", https://www.youtube.com/watch?v=8TIeNDnJiN8, Apr. 15, 2012.

Anonymous, "Candy Crush Saga on Facebook Review on YouTube video, Screen shots of YouTube video, figures 1-13", https://www.youtube.com/watch?v=AbH8Givg6XM, Sep. 7, 2012.

Anonymous, "Cross-platform", retrieved from the Internet: URL:http://en.widipedia.org/w/index.php?title=Cross-platform&oldid=487867404 [retrieved on Jul. 1, 2013] XP055068984, Apr. 17, 2012, pp. 1-16.

Anonymous, "Daily Bonus Level Oct. 17, 2012: Bubble Witch Saga Fan Site", retrieved from the Internet:URL:http://bubble-witch-saga.se/daily-bonus-level-17-oct-2012/ [retrieved on Mar. 21, 2014] XP055109244, Oct. 17, 2012, pp. 1-2.

Anonymous, "Dig Dug article", Wikipedia, Sep. 30, 2015.

Anonymous, "Facebook Platform—Wikipedia, the free encyclopedia", Retrieved from the Internet: URL:http://en.wikipedia.org/w/index.php?title=Facebook_Platofrm&oldid=533105338 [retrieved on Mar. 21, 2014] XP055109249, pp. 1-2.

Anonymous, "Game Architecture: Model-View-Controller", retrieved from the Internet: URL:http://www.koonsolo.com/news/model-view-controller-for-games/ [retrieved on Oct. 8, 2013] XP055083073, Jul. 13, 2009, pp. 1-2.

Anonymous, "Guide to Bubble Witch Saga—Facebook Hints & Tips—How to level guide", retrieved from the Internet: URL:http://reindeerz.hubpags.com/hub/Bubblewitch [retrieved on Dec. 9, 2012] XP055092347, Apr. 10, 2012, pp. 1-2.

Anonymous, "iPhone Game 'Trism' break $250,000. Review.—[Updated] razorianflyofficial", retrieved from the Internet: URL: https://razorianflyofficial.wordpress.com/2008/09/25/iphone-game-trism-breaks-25000-review/, [retrieved on Apr. 15, 2015] XP055183153, Sep. 26, 2008.

Anonymous, "King.com expands to Google+ with Bubble Witch Saga", Retrieved from the Internet: URL:http://www.insidesocialgames.com/2012/01/24/king-com-expands-to-google-with-bubble-witch-saga/ [retrieved on Mar. 21, 2014] XP055109246, Jan. 24, 2012, pp. 1-2.

Anonymous, "Minecraft", retrieved from the Internet: URL:http://en.widipedia.org/w/index?title=Minecraft&oldid=409326251 [retrieved on Jul. 1, 2013] XP055068987, May 2, 2014.

Anonymous, "Model-view-controller", retrieved from the Internet: URL:http://en.widipedia.org/w/index/php?title=Model%E2%80%93view%E2%80%93controller&oldid=511810952 retrieved on Oct. 8, 2013] XP055083072, Sep. 11, 2012, pp. 1-2.

Anonymous, "OpenOffice, Creating Charts and Graphs", Dec. 2004, 1-17.

Anonymous, "Pygame", retrieved from the Internet: URL:http://web.archive/org/web/20120413123244/http://www.pygame.org/wiki/tut_design [retrieved on Oct. 8, 2013 XP055083074, Apr. 13, 2012, pp. 1-5.

Anonymous, "Search for Play Free Online Games on GamesGames.com Home Action Strategy Bomberman War Games Shoot & Throw Worms Fly & Shoot Run & Shoot Tower Defence Flying Wreck the City Adventure Collect & Run Puzzle & Run Role Playing Games Escaping Jump & Shoot Point", retrieved from the Internet: URL:http://web.archive.org/web/20120621061714/http://www.gamesgames.com/games/social-games/social-games.html [retrieved on Oct. 15, 2013] XP055084089, Jun. 21, 2012, pp. 4-6.

Demeter, "Trism: Upcoming iPhone Game by Demiforce", retrieved from the Internet: URL: https://www.youtube.com/watch?v=hy0ptZisr70, [retrieved on Apr. 16, 2015] XP054975820, Feb. 26, 2008.

Dotson, "Bubble Witch Saga Pops Bubbles o iOS and Facebook >148Apps> iPhone, iPad, and iPod touch App Reviews and News", retrieved from the Internet: URL:http://www.148apps.com/news/bubble-witch-saga-pops-bubbles-ios-facebook/ [retrieved on Dec. 9, 2013] XP055092342, Jul. 27, 2012, pp. 1-2.

Duffy, "Home Product Guies Software Internet 7 Great Google+ Games You Might Also Like", retrieved from the Internet: URL:http://www.pcmag.com/article2/0,2817,2391136,00.asp [retrieved on Oct. 15, 2013] XP055084091, Aug. 16, 2011, p. 1.

Josef, "Bloxley Tutorial #1—Sokoban", http://bloxley.net/2010/10/tutorial-1-sokoban, Oct. 13, 2010.

Murphy, "Bejeweled 2 Strategy Guide", www.bigfishgames.com, Aug. 15, 2010.

Namco, "Dig Dug Video Game", 1982.

Popcap, "Bejeweled Video Game", 2001.

Rua, "Candy Crush Saga Gameplay First Look (Episode 1-10 levels)", retrieved from the Internet: URL: https://www.youtube.com/watch?v=8TIeNDnJiN8 [retrieved on Apr. 16, 2015] XP054975821, Apr. 15, 2012.

Schoenau-Fog, "The Player Engagement Process—An Exploration of Continuation Desire in Digital Games", http://www.digra.org/wp--content/uploads/digital-library/11307.06025.pdf, 2011.

Squires, "Bubble Witch Saga is going mobile—Gamezebo", retrieved from the Internet: URL:http://www.gamezebo.com/news/2012/06/27/bubble-witch-saga-going-mobile [retrieved on Dec. 9, 2013] XP055092339, Jun. 27, 2012, pp. 1-2.

Anonymous: "Why King.com's Candy Crush is crushing it on Facebook," XP055085338, retrieved from the Internet: URL: http://blog.games.com/2012/05/01/why-king-coms-candy-crush-is-crushing-it-on-facebook/ [retrieved on Oct. 25, 2013, pp. 1-4 (May 1, 2012).

Anonymous: "Facebook Spiel Candy Crush Saga: Cheats, Tipps, News and Videos BILDspielt," XP055085339, retrieved from the Internet: URL: http://www.bildspielt.de/social-games/3-gewinnt/candy-crush-saga-180643/ [retrieved on Oct. 25, 2013], pp. 1-10 (Apr. 12, 2012).

Collins: "Will Collins Game Spotlight: Candy Crush Sage," XP055085345, retrieved from the Internet: URL:https//developers.facebook.com/blog/post/2012/06/15/game-spotlight--candy-crush-saga/ [retrieved on Oct. 25, 2013], pp. 1-2 (Jun. 15, 2012).

"King.com Skill Games for iPhone and Facebook: http://www.ubergizmo.com/2009/07/king-com-skill-games-for-iphone-and-facebook/", XP055085351, retrieved from the Internet: URL:http://www.google.de/imgres?client=firefox-a&hs=0gJ&sa=X&rls=org.mozilla:en-GB:official&biw=1680&bih=858&tbm=isch&tbnid=Dp0hnHVKMxtoUM:&imgrefurl=http://www.ubergizmo.com/2009/07/king-com-skill-games-for-iphone-and-facebook/&docid=fJQdwQQyyLis3M&imgurl=http://cdn.ubergizmo.com/photos/2009/7/Amazon-s [retrieved on Oct. 25, 2013], pp. 1-2.

(56) References Cited

OTHER PUBLICATIONS

International Search Report, dated Jan. 17, 2014, and Written Opinion, issued in corresponding International Application No. PCT/EP2013/069294.
Anonymous, "Salesforce Tutorial—Model View Controller (MVC)", [online] Retrieves from the Internet: <https://web.archive.org/web/20130814042919/http://www.salesforcetutorial.com/model-view-controller-mvc/> [retrieved Jul. 1, 2016], Apr. 10, 2013.
Adbang, "[How to block Anipang heart] HOw to block Anipang heart at i-phone", Internet blog, Internet: URL:http://blog.naver.com/cyco5202/110147101106, Sep. 11, 2012.
Goad, ""Why King.com's Candy Crush is crushing it on Facebook"", Games.com [online], Internet: URL:http://blog.games.com/2012/05/01/why-king-comes-candy-crush-is-crushing-it-onfacebook/, May 1, 2012.
Kangbelief, ""Kakao talk, how to reject the undesired invitation message of Anipang and receive the heart quietly"", Internet blog, Internet: URL:http://kangbelief.tistory.com/312, Sep. 16, 2012.

* cited by examiner

METHOD FOR IMPLEMENTING A COMPUTER GAME

CROSS-REFERENCE TO RELATED APPLICATIONS

This application is based on, and claims priority to U.S. Provisional Application No. 61/701,907, filed Sep. 17, 2012; UK Application No. 1302121.7, filed Feb. 6, 2013; UK Application No. 1302910.3, filed Feb. 19, 2013; UK Application No. 1304442.5, filed Mar. 12, 2013; UK Application No. 1304444.1, filed Mar. 12, 2013; UK Application No. 1304545.5, filed Mar. 13, 2013; UK Application No. 1306117.1, filed Apr. 4, 2013; UK Application No. 1306118.9, filed Apr. 4, 2013; U.S. Provisional Application No. 61/811,019, filed Apr. 11, 2013; U.S. Provisional Application No. 61/818,702, filed May 2, 2013; U.S. Provisional Application No. 61/827,298, filed May 24, 2013; U.S. Provisional Application No. 61/832,348, filed Jun. 7, 2013; U.S. Provisional Application No. 61/832,355, filed Jun. 7, 2013; U.S. Provisional Application No. 61/832,359, filed Jun. 7, 2013; U.S. Provisional Application No. 61/832,362, filed Jun. 7, 2013; U.S. Provisional Application No. 61/832,364, filed Jun. 7, 2013; U.S. Provisional Application No. 61/832,369, filed Jun. 7, 2013; UK Application No. 1310589.5, filed Jun. 13, 2013; UK Application No. 1310592.9, filed Jun. 13, 2013; UK Application No. 1311119.0, filed Jun. 21, 2013; UK Application No. 1314147.8, filed Aug. 7, 2013; and UK Application No. 1316045.2, filed Sep. 10, 2013, the entire contents of each of which being fully incorporated herein by reference.

BACKGROUND OF THE INVENTION

Field of the Invention

The invention relates to casual social games.

Technical Background

There are multiple technical challenges facing the designer of computer-implemented games to create a fun and compelling game. Three of these challenges can be broadly categorised into the following areas: 'engagement'; 'viralisation' and 'monetisation'.

We will look first at 'engagement', which involves designing gameplay to be engaging and rewarding to players. This typically requires games to be easily understood at their simplest or introductory levels, providing rewarding gameplay with quite simple game mechanics, but becoming progressively more challenging so that players are not bored, but remain engaged and develop rewarding skills. Effective engagement requires various forms of feedback to reinforce players' sense of success and accomplishment. Effective engagement can be greatly magnified if the game has as social aspect—for example if it is linked to a social network so that game players can interact with their friends in the social network. The game can then transform into something that goes far beyond a solo game experience and become more like a shared journey.

'Viralisation' requires a game to include various techniques that encourage players to share the game with others, encouraging them to play the game. It is a key technique in enabling mass-scale distribution or penetration of games. Viralisation can be especially effective when the game is integrated into or connected to a social network environment in some manner, so that the game can then propagate through the network of player's friends, and their friends and so on.

'Monetisation' covers those techniques that enable revenue to be generated from a game; this involves many challenges, because the monetisation techniques need to be acceptable to players and in no way undermine engagement.

A 'match-3 game' is a type of casual puzzle game where the player is required to find patterns on a seemingly chaotic board. The player then has to match three or more of the same type of game element on the game board and those matched elements will then disappear.

One variant of casual games are the so called 'clicker' games where the player can click on a group of adjacent game elements of a certain type and those will then be removed. Some clicker games only require two adjacent objects to remove those elements if clicked by the user.

Another type of match-3 games are the so called 'switcher' games where the player switches place on two adjacent game elements on the game board so that one or both of them create a chain of at least three adjacent game elements of the same type. Those matched game elements will then disappear. In a typical switcher game the game board will be repopulated with game objects from the top of the board with the physics of the game board being that the game pieces are falling downwards on the board.

Another type of match-3 game are the so called 'shooter' games where the player launches for instance a ball or bubble on to the game board tying to aim at groups of similar game elements already on the game board. If the launched ball hits or forms a group of more than 3 similar game elements then that group of game elements are removed from the game board. In a typical shooter game the physics of the game board being that the game pieces are falling downwards on the board.

There are also other types of games where groups of certain game elements are combined together and removed when they have reached a certain size. The user can connect the groups with a swiping movement touching each of the connecting elements in one implementation and in another implementation the groups are formed to one group when the elements of the same type are adjacent, the player then removes the group for instance by clicking on that group.

This patent specification describes not only various ideas and functions, but also their creative expression. A portion of the disclosure of this patent document therefore contains material to which a claim for copyright is made and notice is hereby given: Copyright King.com Limited 2012 and 2013 (pursuant to 17 U.S.C. 401). A claim to copyright protection is made to all screen shots, icons, look and feel and all other protectable expression associated with the games illustrated and described in this patent specification. The copyright owner has no objection to the facsimile reproduction by anyone of the patent document or the patent disclosure, as it appears in the Patent and Trademark Office patent file or records, but reserves all other copyright rights whatsoever. No express or implied license under any copyright whatsoever is therefore granted.

Discussion of Related Art

Casual social games have been implemented before and are known. However previous inventions have not successfully devised effective solutions to one or more of engagement, viralisation and monetisation in the same way as the present invention does.

SUMMARY OF THE INVENTION

A first aspect is:

A method, implemented as computer code being executed by one or more processors, in which a computing device displays computer game graphics showing a gameboard with multiple game elements that are removed when matched or switched, such as in a match-3, clicker or switcher game;

and in which the processor draws the elements as irregularly arranged columns of coloured blocks;

and the processor draws small animals are placed on or amongst the blocks;

and the processor is programmed such that the object of the game is to enable a target number of the animals to descend to the ground and be rescued, by the player removing blocks from the gameboard.

Any one or more of the following optional features may be included, resulting in a method:

in which another object of the game is to remove a target percentage or quantity of the blocks in which an animal can be placed within a blocking element, and that blocking element cannot itself be removed when matched or switched with other similar blocking elements in which a blocking element, such as a locked block, can only be unlocked when another element of a specific type, such as a key block, is moved adjacent to that blocking element in which a line blast booster that clears all blocks along a line can be selected and moved by the player to a specific line.

in which the animals are animated in which more than the target number of animals can be saved, to earn the player additional points or bonuses in which some or all game levels are untimed, eliminating any time pressure in which the game is a casual, social game and some or all levels have a true fail, to enable monetization through purchasing extra moves;

in which there is a continuous musical soundtrack plays during gameplay in which the game generates and displays congratulatory messages when the player scores more than a predefined amount, or matches more than a predefined number of game elements, in a single move in which there is an algorithm for automatically detecting when there are no possible moves left in which there is an algorithm for re-shuffling the elements on the game board.

in which a processor generates, if no move has been made for a while, help or hints by brightening and enlarging game elements used in a possible move on the board with a flashing animation, such as an animation that occurs once, or repeats twice or thrice in which a processor is programmed to require a player to reach a target score before running out of moves in order to complete a level successfully, but completing the level is not timed in which a processor is programmed to automatically replenish a life for a player in 30 minutes in which a processor is programmed so that, if a player finishes a level in under the target number of moves, then random game elements on the game board are triggered and give the player bonus points in which a processor is programmed so that, if a level is finished with moves left, those moves are converted to special game elements that trigger for extra bonus points in which a processor is programmed so that the game generates and displays congratulatory messages when the player scores more than a predefined amount, or matches more than a predefined number of game elements, in a single move in which a processor is programmed so that the player can ask his friends for lives in which a processor is programmed so that the player can ask his friends for other help in which social network friends are prompted to assist another player if that other player has played, but not completed, a level meeting a certain criteria in which a processor is programmed so that the player can send gifts to friends in which a processor is programmed so that the game can be synchronized between different devices in which a processor is programmed so that a player can seamlessly stop and re-start playing the game at any time since game state information is stored, e.g. remotely and/or on the playing device in which every change in the game state, such as every move of a game piece by the user, and every consequential change in every game piece on the game board, is accompanied by sound and visual feedback to provide immediate, positive gratification to the player in which game state information is preserved, enabling a remote server system to identify a player and all aspects of the state of the game they are playing, so that the player can end game play on one device and resume from a different device at a later time at exactly the same state in which the different device can be a different type of device, so that the player can move seamlessly between playing the game on a smartphone and on a tablet in which a remote server system can identify a player because that player has accessed the game through a social network in which the game is a casual, social game, namely a game that can be downloaded as an app to a smartphone and/or tablet computer and which can be accessed or played using a social network application or environment in which the processor is programmed to show a virtual path or other virtual world that indicates the level reached by the player and that player's social network friends in which the design of the game is optimised through a process including the step of: using data analytics to understand the impact of changes to the game design in terms of player engagement and/or monetisation and/or viralisation and; implementing changes to the game design, including frequent changes such as daily or weekly changes, to optimise player engagement and/or monetisation and/or viralisation.

A second aspect is:

A computing device adapted to play a computer game, the device including a processor, a memory, a display, a touch screen or a cursor based input device, and computer code stored in device memory or on a remote server and executable by the device processor or a remote processor, and in which the computer code generates computer game graphics for the display on the device, showing a gameboard with multiple game elements that are removed when matched or switched by a player, such as in a match-3, clicker or switcher game;

and in which the code running on the processor(s) draws the elements as irregularly arranged columns of coloured blocks;

and in which the code running on the processor(s) draws small animals placed on or amongst the blocks;

and in which the code running on the processor(s) defines an object of the game as to enable a target number of the animals to descend to the ground and be rescued, by the player removing blocks from the gameboard.

A third aspect is:

A non-transitory computer readable medium encoded with instructions for controlling a computer system to display a game on a display, the instructions including instructions for enabling the display to show a gameboard with multiple game elements that are removed when matched or switched by a player, such as in a match-3, clicker or switcher game;

and in which the instructions running on the processor(s) draws the elements as irregularly arranged columns of coloured blocks;

and in which the instructions running on the processor(s) draws small animals placed on or amongst the blocks;

and in which the instructions define the object of the game as being for a player to enable a target number of the animals to descend to the ground and be rescued, by the player removing blocks from the gameboard.

Various additional aspects can each be combined with any of the above.

A fourth aspect is:

A method, implemented as computer code being executed by one or more processors, in which a computing device displays computer game graphics showing a gameboard with multiple game elements that are removed when matched or switched, such as in a match-3, clicker or switcher game;

and in which the processor draws the elements as blocks supporting an object and the processor can determine physics properties of the object if it is unsupported and falls, such as velocity, acceleration, momentum, distance of fall, time of fall and/or force;

and if the object does fall, then it can remove blocks in its path, the number of blocks it removes being a function of the physics properties and an object of the game being to remove as many blocks as possible.

Any one or more of the following optional features may be included, resulting in a method:

in which the processor enables a player to remove blocks by the player clicking on blocks, such as matching pairs or triplets.

in which the processor enables blocks to be removed by the object crushing the blocks as it falls on them, the number of blocks crushed being a function of the physics properties of the falling object.

in which the processor enables the extent of the object's fall to be increased by earning animated objects, such as birds, that keep the object suspended for a short time, to give the player more time to clear blocks and hence increase the distance of the fall and hence the number of blocks crushed by the object.

in which the blocks are square, cuboid, brick-shaped, spherical or any other shape.

in which the object is a heavy object, such as a girder, brick, person, animal, house, or heavy household object such as an ironing board.

DETAILED DESCRIPTION

The terms user and player are used interchangeably throughout this document and no specific meaning is intended using one or the other unless the context suggests otherwise.

In the following description of various implementations of the invention, reference is made to the accompanying drawings which form a part thereof, and in which is shown by way of illustration various implementations in which the invention may be utilized. It is to be understood that other implementations may be utilized, and structural and functional modifications may be made without departing from the scope of the present invention.

Figure 1:
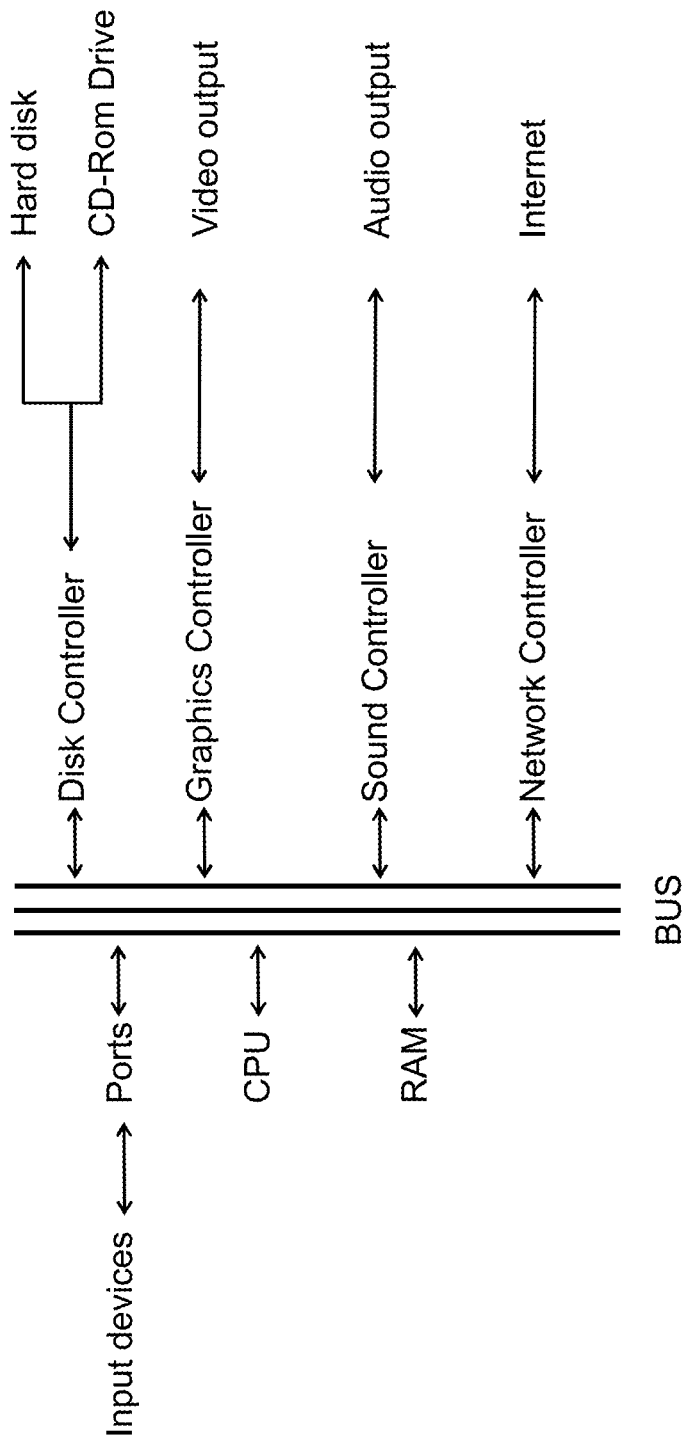
FIG. 1 shows a schematic illustration of a computing device.

FIG. 1 shows a schematic picture of a computing device, containing a Central Processing Unit and Random Access Memory. The CPU acts according to input given from input devices, such as a keyboard, mouse or touchscreen. Computer BUSes are used to communicate, both between input devices and the CPU, but also between different controllers within the computer device, such as the graphics controller and the network controller. These controllers in turn communicate with external devices, such as a monitor for video output with which the graphics controller communicates, and the network controller communicates with for instance the internet, through wireless or wired connections. A user can interact with the computing device through input devices, such as a pointing device (e.g. a mouse) and a keyboard.

Figure 2:
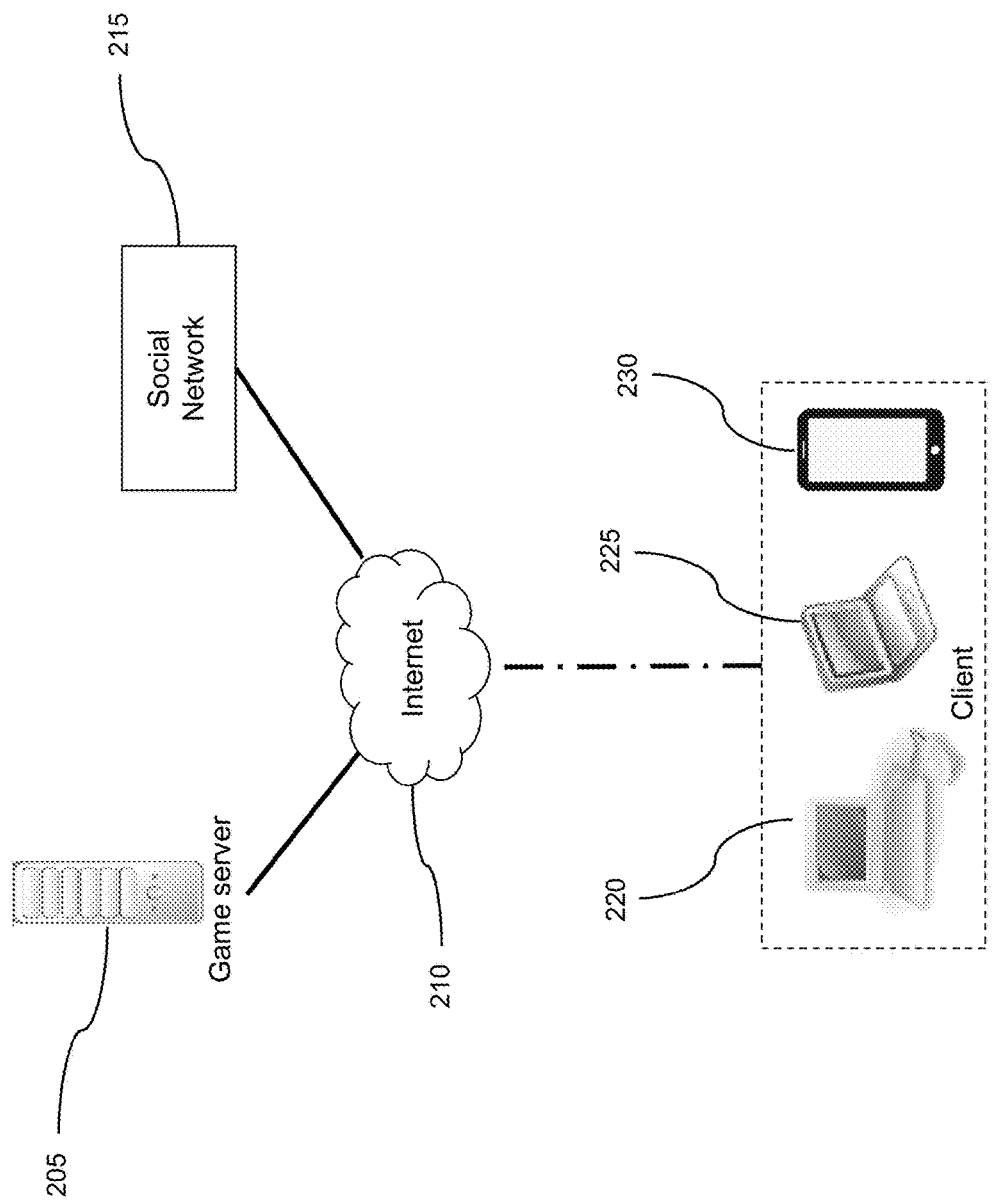
FIG. 2 shows an exemplary environment.

FIG. 2 portrays an exemplary overall environment in which the present invention can be utilized. A virtual game is stored on for instance a game server 210. The virtual game is to be played on a client device, such as a computer 240, 250 or a smartphone or other handheld device 260. The client device can also be a kiosk, arcade gaming station, smart TV or other device with computing capabilities, input devices and a screen that can present the game to a user. The client device communicates with a game server 210 and a social network server 230, for instance through the Internet 220 or other network. It should be understood that the social network 230 and the game server 210 does not have to be located in different places, they could be on the same server or on a plurality of servers located in different locations. An environment where the invention may be implemented is described in PCT/EP2013/060641 which is hereby incorporated by reference. People skilled in the art will understand that other devices than the exemplary ones listed can be also be used without departing from the spirit and scope of the invention.

Different Implementations

The techniques described in this patent can be deployed in many different gameplay architectures. For example, a computer game can be implemented as a computer program that is stored and runs entirely locally on the processor of a PC, games console, tablet or mobile telephone or other computing device. The game can be implemented solely as a computer program that is stored and runs entirely on one of many processors in a remote server, and data streams or updates are supplied to the client device (e.g. tablet, smartphone etc.) to enable the client to render and display graphics and sounds; this 'web services' approach is increasingly common.

Another approach is a hybrid one, in which back-end servers handle some elements of the gameplay, and for instance a Java game applet is provided to client devices and it is the locally running Java applet that generates the graphics/sounds/user interaction for gameplay on the player's client device. Some data may be fed back to the back-end servers to enable scoring, interaction with other players and cross-platform synchronisation. Generally, the techniques described in this specification are not specific to any one game architecture but can be deployed on any suitable game architecture.

The game can be implemented allowing a user to interact with it in different ways depending on the capabilities of the device which the user is accessing the game with. A user can interact with the game through using a touch screen where the user can select and/or move elements on the game board with a finger or for instance with a stylus. The game can also be played with a pointing device such as a mouse or other interaction devices such as a keyboard.

Mobile devices may have a touch screen interface where the player can interact with the game using a finger or a pointing device such as a stylus. Some mobile devices have hard keys that complement the touch screen interface. Such hard keys may be in the form of a button or in the form of a joystick type of interaction.

Over the course of players playing the game, data will be produced. This data can for instance be related to a player's game performance or to game information related to a social network to which the game is connected. It is possible to gather this data, store it and make use of it for instance to improve the game. One example is by using a database to store the amount of times players try and fail a level on average. This data can then be reviewed, and if the players seem to fail a substantial amount of times before completing a level, the difficulty can be adjusted accordingly. The difficulty can be adjusted through changing a score target for the level, increasing the available time or moves or giving the player for instance a booster to enhance the gameplay.

There can be certain performance indicators used to measure the success of the game. These indicators can for instance relate to player retention, the virality of the game and the revenue of the game.

A person skilled in the art will realise that the different approaches to implementing the game is not exhaustive, what is described herein are certain preferred embodiments. It is possible to implement the way in a number of variations without departing from the spirit or scope of the invention.

Clicker Game with Objects to 'Rescue'

The described game is an action puzzle game created by King.com. Make your way through a variety of levels in this clicker style adventure as you rescue pets from the malicious animal catchers!

Basics

The described game belongs to the (match-3) clicker genre. To play the game, click on any group of two or more touching blocks of the same colour, this will remove them from the game board. In the implementation of this game, new blocks will not appear on the game board, this encourages the player to think more strategically on how to remove the existing blocks. Linking as many blocks as possible in one click will give higher points.

Standard Blocks

The game may be implemented having different standard game elements to be used in different levels. Not all of the game elements may be used in a level and the number of different types of game elements used may depend on the game designer and the difficulty to be achieved in the level.

The various types of game elements may be identified by the colour of the game element. In some implementations the game elements may have a surface pattern so that also a colour blind will be able to differentiate between different types of game elements.

Figure 3:
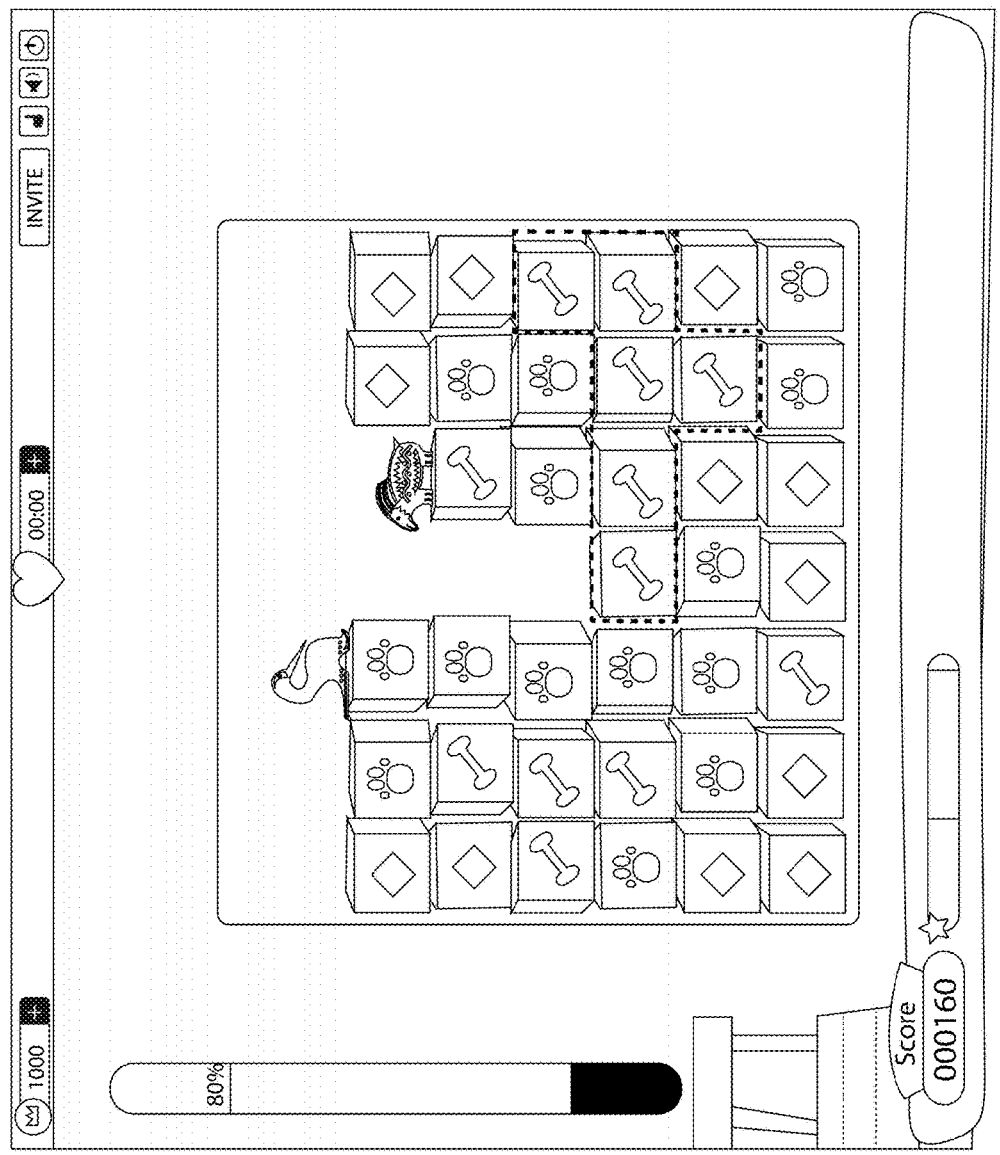
FIG. 3 shows an exemplary level layout.

FIG. 3 shows an example of a level. One of the groups of game elements has a dotted line around them to show that the cursor is hovering over them and that they can be removed by clicking.

The game element blocks drop down and slide left to fill gaps on the game board. There may be elements blocking the game elements to fall down or slide left and the game designer may implement certain rules for certain game elements.

Goals

In Pet Rescue Saga there are different goals to complete a level. Many levels have more than one goal that have to be reached in order to pass them.

Different goals that may be implemented are:
  Eliminate a certain percentage of the blocks on the board
  Obtain enough points to earn at least one star
  Save a minimum number of animals
  Complete the level and reach the bottom before running out of moves
  Special tasks: Save animals, Make a 20 block combo
  Time limit for a speed mode On levels, a maximum of three stars can be earned. This is very difficult and opens up to a great deal of replayability as the player can continue to retry levels until they earn all three stars on each stage and can decide to continue on whenever they like.

Saving Animals

Animals can be trapped on top of columns. To save them, they need to be dropped to the bottom of the screen so that there are no more blocks beneath them. When this happens, the animal will be able to walk off the puzzle board, and thus be saved.

Figure 4:
FIG. 4 shows an exemplary embodiment with animals to rescue.

Blocks may be stacked on top of an animal's head, or other animals, without penalty; see for example FIG. 4. As long as they touch the bottom of the board, they safe. If the screen drops below the location of the animal, the player will most likely fail the level.

Some animals will come inside carriers. In these cases, the carriers have a colour and count as "blocks". They must be matched with blocks of the same colour in order to free the animal. Carriers of the same colour can also be matched with each other.

While an animal is being "freed" from the board, you can continue to make block matches.

Different animals that may be saved in one implementation of the game: Dogs, Pigs, Pigeons, Squirrels, Turtles, Hedgehog, Panda and A Ferret.

Game Modes

The game may be implemented with different game modes for different levels. Some of the game modes may be combined on one level. One such combined game mode can be to rescue a certain number of 'pets' within a certain number of moves.

Classic game mode—Clear the field
  Start with a full game field
  Clear as many blocks as you can until you run out of moves
  Scrollable game field avoids perfect solutions
  Percentage target to reach for progress
  Score multiplier to allow very high score targets to hit
Rescue game mode—Rescue the animals
  Start with a full game field with a set number of animals at top or in middle
  Field empties and animals come down
  Scrollable game field avoids perfect planning
  Try to save as many as possible by bringing them all the way down, so focus on save target
  Can also have additional bonus targets to collect and save
  Helpers: Trap removers, column blast, colour bombs
  Specific animal save target
  The level may be implemented so that there are maximum one animal per column or several animals per column. Having more animals on the game board may make the level harder since there is less space to have regular game elements.
Timed game mode—Score in limited time
  Uses a game field that replenishes and never gets empty
  1 minute gameplay on to focus on top score
  Try to build out large groups and long sequences
  A bonus state can be achieved by collecting enough of each colour. Once active all scores are high as long as you keep making big groups
  Bonus objects to bring down to collect extra time and extra score
Task game mode—complete the defined task
  This is less of a specific game mode and more of an added challenge that can be added to any of the 3 previous game modes to create a bigger challenge
  Tasks can be tasks that make sense for gameplay and not be counter productive to setting a high score Pet Rescue Saga Power Mode Power mode is a feature that may be enabled in Timed game mode levels. When Power Mode is enabled on a level a separate score collected for each colour. The collected score will be indicated by a meter in the GUI (rainbow meter). When the target score is achieved for all colours the Power Mode becomes active. Multipliers will not be applied to the colour score. While in Power Mode all score is multiplied. The mode is clearly indicated with visual effects. Power Mode stays in effect until the player clicks an illegal block or the level ends.

Fail or End a Level

There are 8 different reasons why a level can fail or end:
  There are no more matches available on the board
  Not enough score to clear the level
  Not enough blocks cleared
  Not enough pets rescued
  Big combo target not reached
  Time bomb exploded
  No more moves left
  Quit button used Points Basic points for clearing a group of cubes:
  cubes: 40 points
  cubes: 90 points
  cubes: 160 points
  cubes: 250 points
  cubes: 360 points
  And so on with Score=(no. of cubes)×(no. of cubes)×10
  Advanced points for special blocks and combos:
  Multipliers: X2 multiplier, 2 multiplier in the same combo gives a X4 multiplier and so on.
  Bombs: 300 points for each bomb that is detonated
  Column Blast: 20 points per cube in the column
  The special move points are fixed, and not affected by the number Radioactive cubes cleared group.
  If clicking on a single cube that cannot be cleared the player gets 10 points deducted.
  Clearance bonus: To give a larger value to clearing and to balance scores the player can receive 1000 points per 1% cleared
  Animals saved: Each animal saved gives 5000 points
  Additional scores for specials Powerups/Boosters When progressing through the game, different boosters will be unlocked and available for the player to use. Many boosters can only be used a limited amount of times before the player has to top them up again. To do that the player has to purchase top ups.

Helpers: these are part of the general game experience in a particular game mode.

Boosters: They have to be acquired by the player to make game play targets easier to achieve. Charms: Permanent helpers that can be bought.

There are three main variations of helpers and boosters:

Game impact. This type changes some of the game settings without creating a specific object that appears in the game. Examples would be extra moves, extra time, less colours etc.

Figure 5:
FIG. 5 shows an implementation of a column blaster icon in the top right portion of the screen.
Figure 6:
FIG. 6 shows the column blaster in use.

Activation. A type of booster that is available for you to trigger in the game, but is not part of the game area normally. Can be an icon on the side. Example: Trigger a column blast In game objects. These are special objects that get mixed into the game flow. Fall in randomly. Can be used by the player as part of the game play. Example: Line blast blocks Column Blaster This is a special item shown in the lower right corner of the screen of the exemplary embodiment in FIG. 5. As you match blocks, the rocket will power up. Once ready, the fuse will light, and you'll be able to hear it. Click on the rocket, then click on the column you would like to blast as shown in FIG. 6. Do this to remove all the blocks in that column. As a principle it may remove all blocks and special blockers, but does not harm animals.

There is also a purchasable Column blaster which lets the player use it at any time when playing a level.

In one implementation the player may elect to charge the column blaster twice to clear more than one column, for instance three columns.

Block Buster

Figure 7:
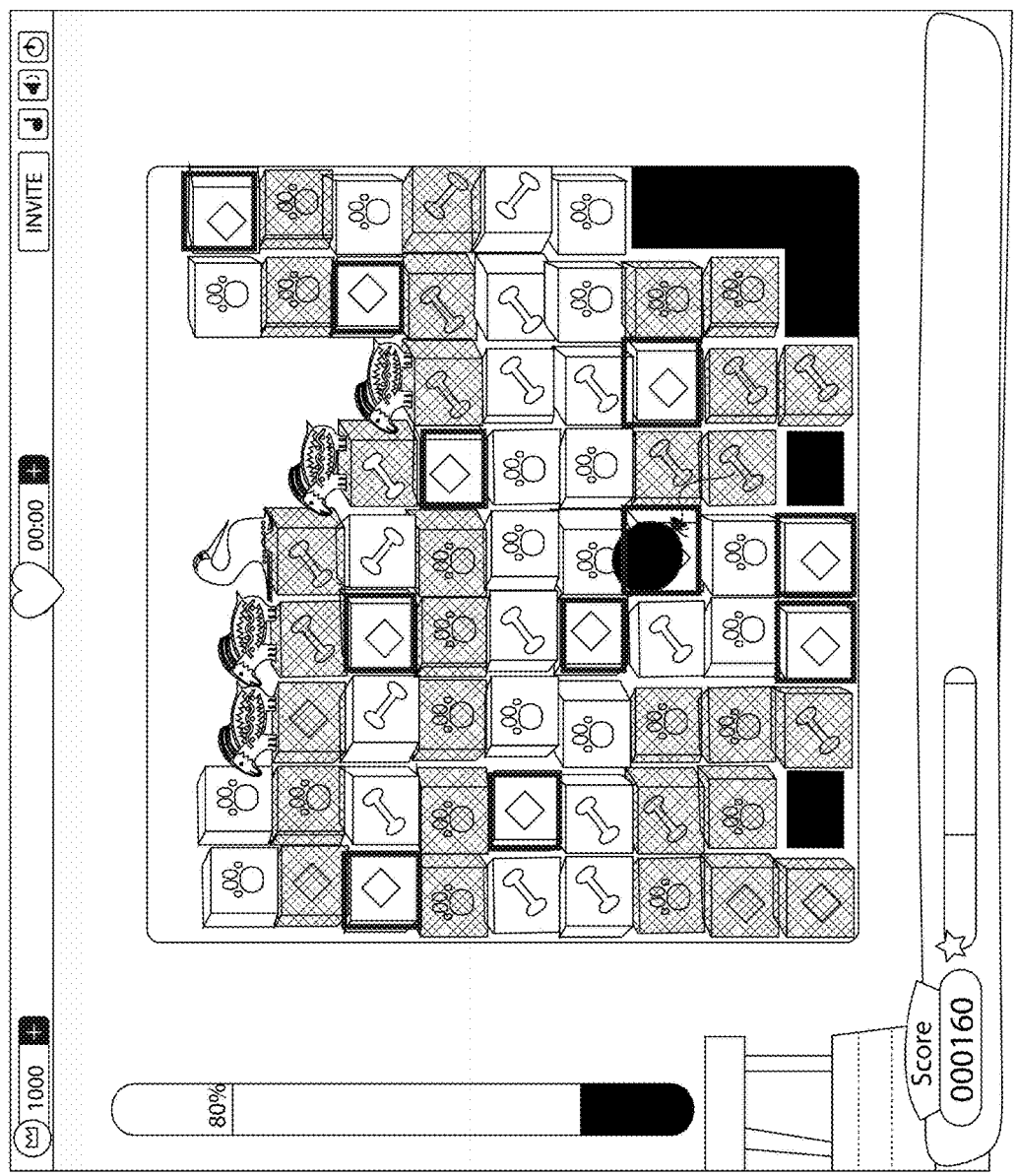
FIG. 7 shows the Colour Pop balloon.

The Block Buster will display when you start a level. It is visible on the right side of the screen. To use it, the player clicks on the icon which turns the cursor into a hammer. The player then clicks on the block they wish to remove. The Block Buster will remove a single block from the board. When there are no more power-ups available, the player can top it up again by purchasing more with Coins via the Map or the puzzle screen. When using the Block buster the cursor turns into a hammer Colour Pop The Colour Pop removes all visible blocks of the same colour. FIG. 7 illustrates this where the booster to be used hovers over a game element and all elements of that type are being highlighted, in this illustration the highlight is implemented as a bold black square around the game elements. To use the booster the player chooses the Colour Pop icon which in one implementation turns the cursor to a balloon. The balloon has the same colour as the block it hovers over.

Special Bonus in Timed Mode

This is a score helper used in the timed mode. You need to fill up a meter of each of the 4 colours to enter rainbow bonus mode. The meters are filled by clearing blocks of each colour, and again a bigger groups build the meter faster than small groups of 2 blocks at a time. Once you are in the rainbow mode all scores double for the rest of the level. (Which is more fun than limiting it). The rainbow target might be good to make flexible for level design or at least stretch linearly with time set of the level Score Helpers Multiplier blocks are standard colour block with a multiplier effect. When used in a combo they double the score or triple depending on the multiplier effect. Multiple blocks can be cleared for super scores. This allows us to set some really high score targets for later levels or just the 3 star scores that are fun to aim for.

Bonus score objects can be mixed into the blocks that give you a bonus score if you manage to collect them. Make them reach the bottom to collect. High score impact: 10.000+ points. Fun to add in later levels where 5 colours are used and they become hard to collect. Placement can be designed for more fun.

Pet Rescue Saga Charms
    Maximum lives
    Extra moves (5 moves)
    Start with full column blast
    Frozen time, when activated lasts for 5 seconds.
    Bantering (special offering)
    Haggling (10% off)
    Scrolling
    Insight (3 moves)
    Babel fish
    Rescue (1 time, open box)
    Cage removal (1 time per level)
    Multiplier
    Demolish (place 1 bomb)
    Switch (Switch 1 block)
    Happy ending (extra blocks after the time has run out)
    Hotbox (dropdown 1 blocks)
    Bank (get more credit faster)
    Faster power-mode
    Increased booster
    Charm of friend (A.I friends helps you out with gifts)
    De-freeze (lets you unlock frozen block
    Lock picking
    Break glas
    Partymode, dancemode
    Season outfit
    Allure (allure unique animals)
    Flashlight (to be used on nightlevels
    Scarecrow (keeps the thieving animals of the gamefield)
    Wind
    Shuffle
    Zoo (Lets you collect rescued pets to your zoo)
    Extra time (15 seconds)
    Special blocks
    Extra line blast
    Painter (lets you paint blocks from one colour to another)
    Treasure map (lets you play the secret levels)

Blocks
    Explosive blocks:
        Bomb
        Colour Bomb
        Line blast
        Ticking Bomb
    Bringdown blocks:
        Extra time
        Extra score
    Pet-related blocks:
        Pet carrier
        Wooden Cage
        Metal Cage
        Gift box
        Crate
        Cardboard box
        Cage
        Extra blocks
        Frozen Block
        Black block Cage Sometimes blocks will have cages around them as exemplified in FIG. 8. In order to free these, you will need to match blocks around them to break them, or cause the cage to drop and break by matching blocks beneath them. Cages can be broken by rockets or bombs, though these will not break the blocks beneath at the same time. They must be broken separately.

Multiplier Blocks

Figure 8:
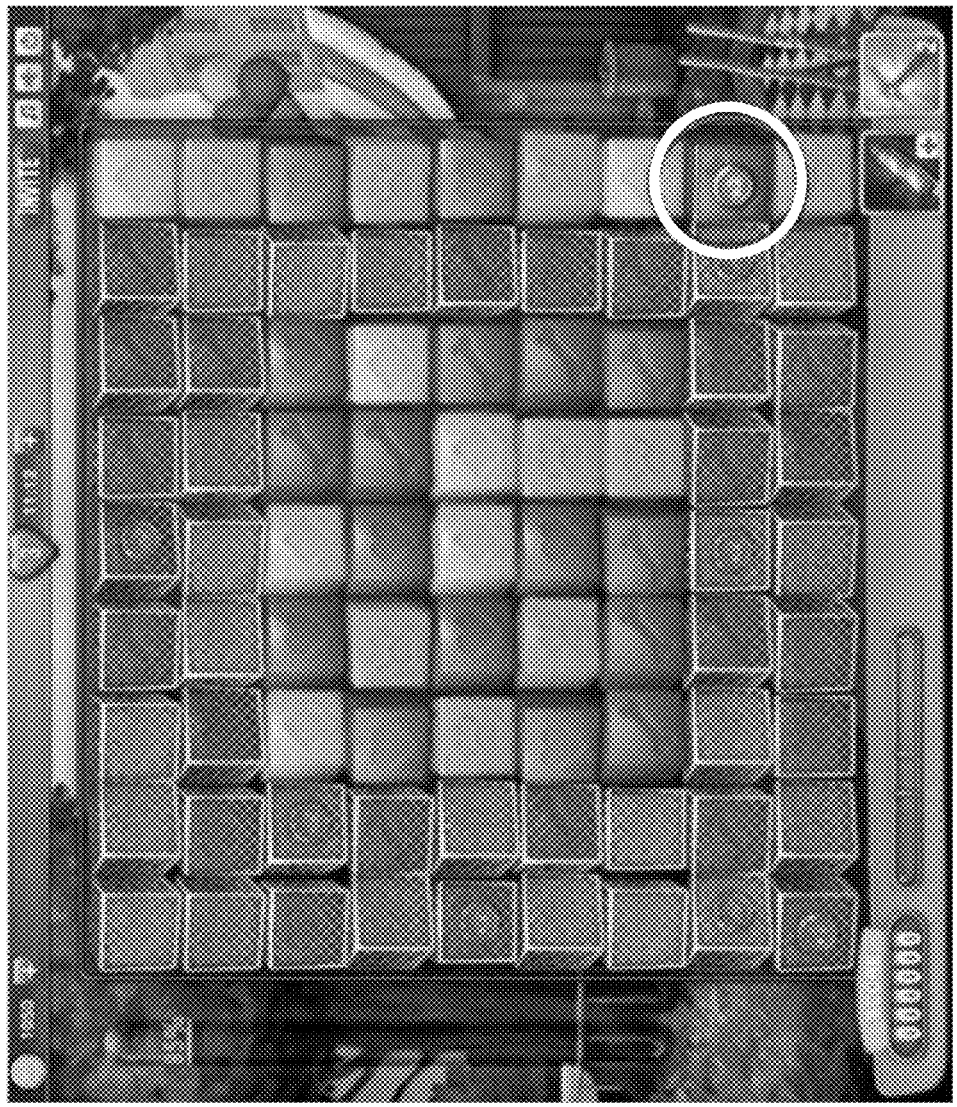
FIG. 8 shows an exemplary embodiment.

These are blocks with small circular metal emblems on them with a "x2" mark as shown in FIG. 8. Multiplier blocks are worth double the score, and thus should be combined with as many other blocks as possible, when possible.

Balloons

Figure 9:
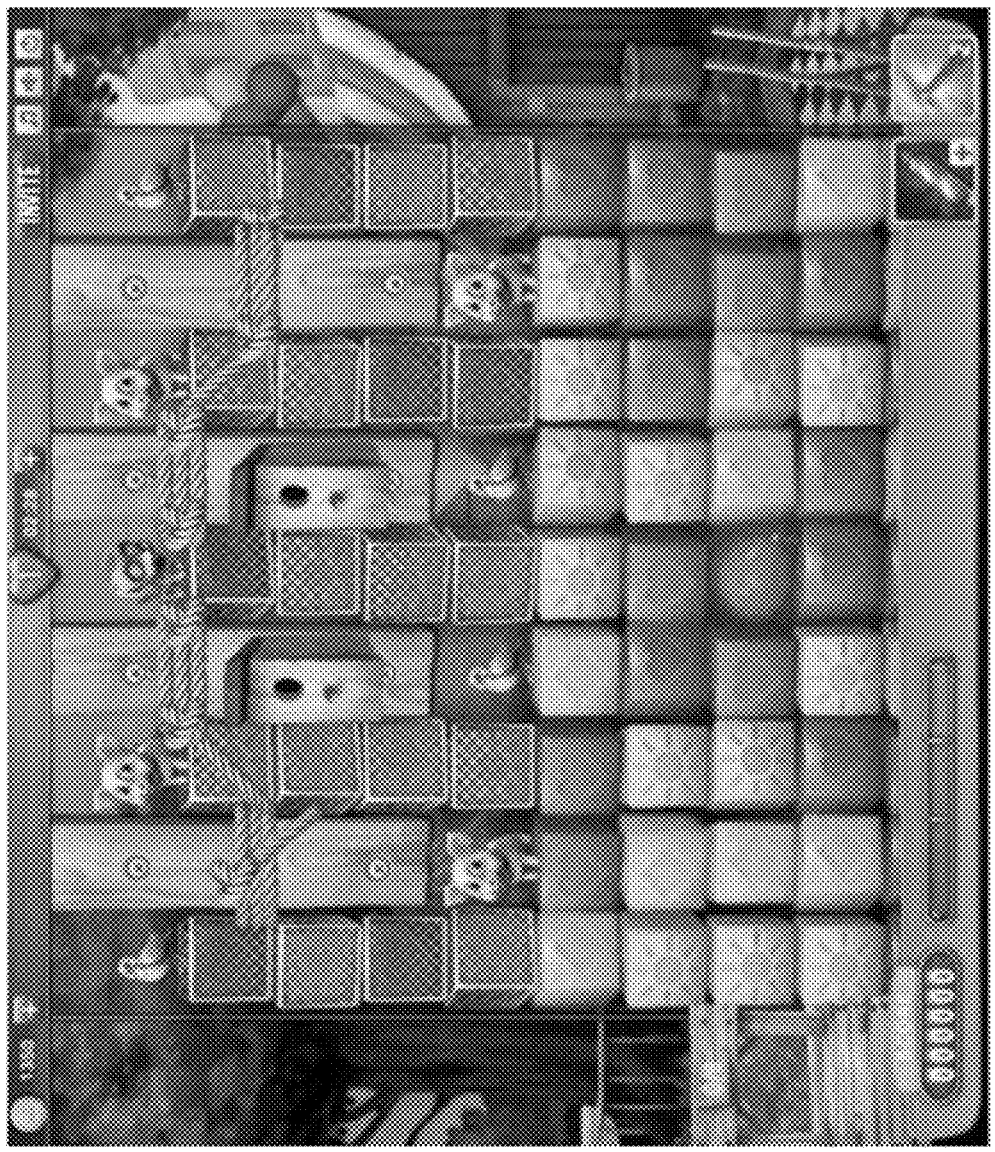
FIG. 9 shows an exemplary embodiment with a red Balloon in the middle of the screen.

In some levels, Balloons appear among the regular game elements as shown in FIG. 9. Clicking on a balloon will remove all visible blocks in the same colour as the balloon.

Black Block

Behaves like a regular block that falls and slides left. They cannot be cleared with a regular combo even if touching other black blocks. Can only be cleared with a special clearing mechanic: Line blast, column blast, bombs.

Bombs

Figure 10:
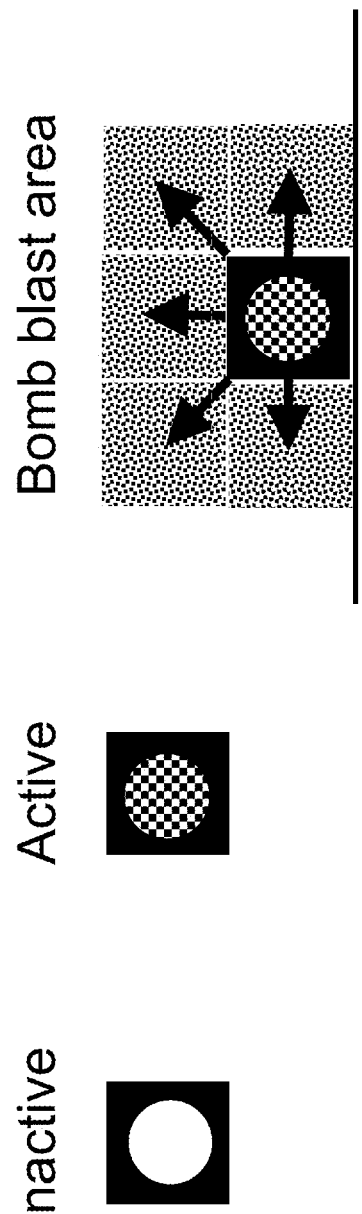
FIG. 10 shows the bomb.
Figure 11:
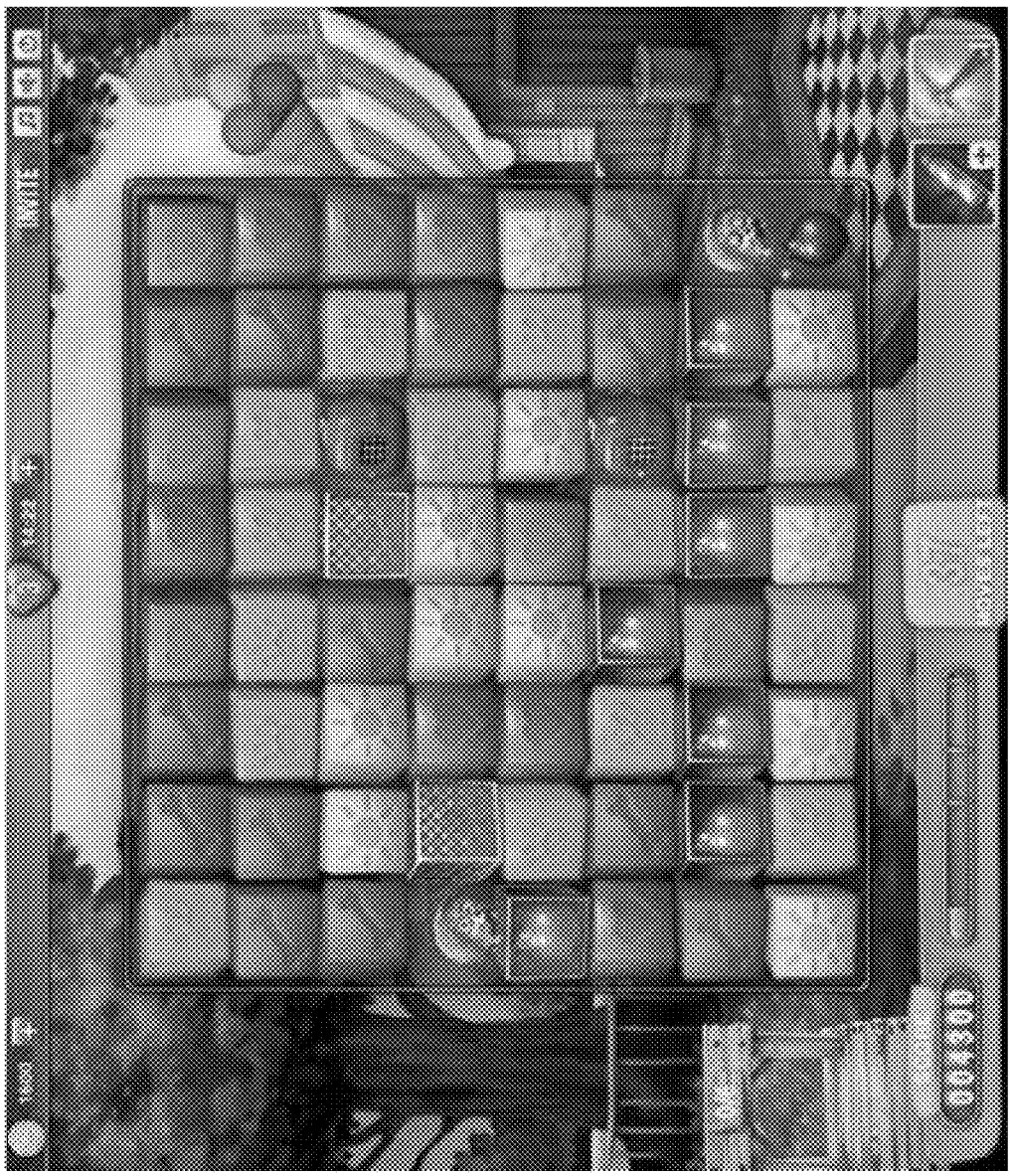
FIG. 11 shows an implementation of bombs on the game board.

Bombs are mixed into the game field and are inert until they touch the ground. Once on the ground the bombs become active and the player can click on a bomb to blast it and nearby blocks away (5 blocks) as shown in FIG. 10 and FIG. 11. Bombs are not dangerous to the animals.

In some implementations, as a deeper extension, the blast from 2 touching bombs is bigger.

Frozen Block

A block in the game field is frozen and cannot be cleared until thawed, so a 2-step clearing is needed. The player thaw one block at a time by clearing a blocking in any of the 4 touching directions next to it. The Frozen block can also be cleared by specials such as a column blast or a bomb, but this should only remove the ice, not the block beneath it. Frozen blocks fall like all other normal blocks.

Metal Cage

Metal Cages cannot be matched. Metal Cages cannot be destroyed except by a special "Destroy Metal Cage". Animals landing on top of a Metal Cage will instantly fall into the cage and be trapped. Animals trapped in a cage are not counted as lost while they are still on the level. Animals can only be freed from a metal Cage that get destroyed by a special "Destroy Metal Cage" booster. Animals below a cage will not be trapped. Animals in Metal Cages that hit the ground will be lost.

Ticking Bomb

Behave like a regular block that fall and slides left. They have a certain colour and count down with each combo made. Clear in a regular combo or with special before they count down. To make it engaging they have room for a 2 digit count down. Vary between 5-20 steps. This makes sure they are not exactly synchronized and the player get to focus. They only start to count when on screen, so when below the fold they lie dormant.

Wooden Cage

Wooden cages can not be matched. Wooden Cages are destroyed by bombs, column- and line blasters and by landing on locked blocks, constraints and the ground. Animals landing on top of a wooden cage will instantly fall into the cage and be trapped. Animals trapped in a cage are not counted as lost while they are still on the level.

Animals will be freed from a cage that get destroyed. (except when the Wooden Cage hits the ground)

Animals below a cage will not be trapped. Animals in Wooden Cages that hit the ground will be lost.

Animals landing on top of a Wooden Cage in the same move as the cage hits the ground will safely escape as the cage will be destroyed before the pet is captured.

Lock and Key

A lock acts as a piece of rock/floor that can be removed by capturing the key. The key is a static bonus object in the mix of blocks that take up one space. Make the key reach the bottom of the game field to collect it. In the editor the game designer can be able to specifically place the lock and the key. Some implementations may allow for several locked blocks, but only 1 key. This gives more freedom in level design.

Infected Blocks

The growing mechanic extends 1 step for each move you make. In some implementations it may 'grow' in all directions. In an alternative implementation they act like a growing black type of block that cannot be cleared but expands. There may be several ways implemented on how to stop these blocks. In some implementations only having bombs or column blasts makes them very hard to stop. Making a big combo next to them can decrease them works well if a certain size is needed, but may make it too easy if any size is OK. A game designer will know that different levels may require different implementations for the level to be a fun experience for the player.

Other Game Features

Coins

This is the game's currency and is used to purchase power-ups. The player can earn Coins by completing puzzles.

Life

The player starts with a maximum of 5 lives, represented by a number within a heart. If a level is successfully completed then no life will be deducted. If a level is failed however, then one life will be deducted for each time the level fails or is not completed by exiting it before it is finished. When there are no more lives left, the player has to wait until a life has been recharged. This takes 30 minutes per life and the counter will start immediately when the player does not have the maximum amount of lives anymore. If the player does not want to wait then he can ask friends to send lives or he can purchase a lives top up.

Level Layout

Level Constraints

Figure 12:
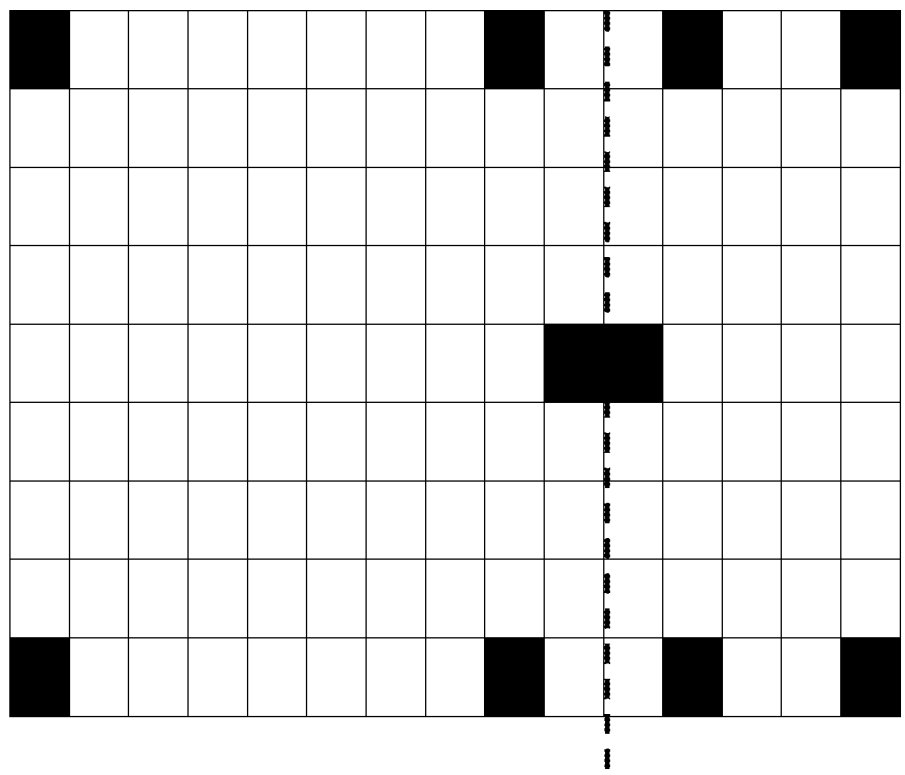
FIG. 12 shows a schematic overview of a level layout.

For all game modes the ability to define the game grid size and limit the playing field is used to make it harder and create variation. It also makes each level more recognizable. Blocks can fall through holes or get stuck on them. The level design has two main features as shown in FIG. 12. There are two types of level constraints:

Holes in the grid

Fillouts

Dropdown items and bombs that land on level constraints are activated. Line blasts, colour bombs, pet carriers and pet cages slide to the left. Pets that fall onto level constraints do not slide.

The level is defined by an upper edge and a lower edge. The player may in a typical implementation only be able to make matches, form groups and interact with the elements that are fully visible on the game board. If there are no possible moves left on the game board the game board may move one step down and the blocks, animals or other game elements in the top row will be knocked off the board and removed from the game. In for instance the game mode where the player is to rescue animals it may be some that the number of animals that have been knocked off the game board has reduced the total number of available animals on the game board to a number lower than that level goal. The game is typically ended at that point and the player has failed the level. In some implementations the player may be offered the option to buy additional animals or other game elements to allow continued playing to finish that level.

Grid

The grid defines the play area, a block can occupy the play area. Holes in the grid show the background and are not valid play areas. Blocks can not occupy holes in the play area, but can fall through. The shape of the grid varies.

Fillouts

Fillouts is a level constraint that occupy holes in the grid and stop blocks from falling through. All level constraints are scrollable. A lock act as a fillout level constraint. Blocks slide on level constraints the same way as they slide on the ground, to the left if there are no blocks that stop them from sliding. Holes in the play area are not valid areas for blocks to slide into, so columns might split up when sliding because of this.

Options

From here you can access game options. You can also choose to quit a puzzle early from here, though you will lose one life for doing so.

Complete

This meter is shown at the side of every puzzle and shows how close you are to 100% block completion.

Score

Your current score is shown at the bottom of the screen. There is also a meter here with lines and stars, which show you how high your score needs to be to obtain a higher star rank.

Map

The map is where the players find themselves when not playing a certain level. From the Map, the player can select what level to play. Levels that can be selected have a coloured patch and a number visible. Levels that cannot yet be accessed will appear to be plain. When a level is completed, a certain number of stars will appear over the corresponding level node, displaying how well the level was completed. If wanting to play a level, the player clicks on corresponding level node.

The player may also see the progress of friends on the map, displayed with a small picture of their friend next to the level they are currently at.

Map Progression

Episodes

The map is divided in 10 episodes which contain 10 levels each.

Each episode can be shown in 3 different states:
- Current+previous episodes will be fully revealed
- The next episode will be partially revealed when the player has the end of the current section, darkened or monochrome and covered with loose clouds.
- Episodes further ahead should be almost entirely obscured (by clouds) but may reveal hints to what the episode will contain.

Unlockables

At specific points, when a player completes a level, animals or objects will be revealed on the map. These may be clickable and feature additional functionality, but does not have any immediate effect on gameplay. The "main" animals appear on the map when the player completes the last level of the current episode.

Animals

Each section ends with an Animal encounter. These present obstacles (collaboration lock) and introduce new unlocked boosters, features etc. The latest encountered animal will also be featured through the current episode in miscellaneous game dialogs as the "sender" of all game-to-player information. I e this animal will guide the player until the next encounter. The first section has an additional animal on level 1. This animal will be the one that introduces the player to the plot and gameplay.

Map Markers

Game levels are accessed by clicking on the map markers (level nodes). Map markers are shown on active or passed levels only.

The information conveyed by the marker icon should be:
Type of level
Cleared or not cleared
Stars achieved
Level number Map markers should be available in graphical variations (i.e., different sizes or rotations).

The pet snatchers are featured on the map ahead of the player, approx. at the positions of future map markers. The pet snatchers will generally be several levels ahead of the player, but will be "caught" by the player on "rescue mode" levels. After a rescue mode level is completed the pet snatchers will be ahead of the player again.

Rank

This is simplified visualization of the score on a level. The player needs to achieve at least one star to complete a level. Three stars is the best score and means that the player has gotten 100% block completion on that level.

Pre Game

The following are examples of what information is included on the pre-game screen:
Best score based event share
Level
Info
Play
Buy boosters Post Game Play Examples of post game events and options provided to the player:
Map event share
1 star score
Continue
2 star score
Share
3 star score
share item
Friend beaten
Share or req.
Fail
Try again
4th fail buy charm
Charm buy
Passed friend
Share gold.
Unlock feature
Share gold.
Completed theme (area)
Share gold Tutorial.

The first time playing the game there is a Welcome pop-up. For some levels there are tutorials included where the game board is shadowed except for the important part in the tutorial together with messages and a character.

Monetization

Price Points

These items can also be implemented to be purchased with a hard currency or a currency

| Item | SoftCost | Social network currency |
| --- | --- | --- |
| Extra Moves (in-game) | N/A | 19 |
| Extra Moves (end-swipe) | N/A | 19 |
| Block Smasher (pre-game) | 3000 | N/A |
| Block Smasher (in-game) | N/A | 9 |
| Column Blaster x3 (pre-game) | N/A | 29 |
| Column Blaster x3 (in-game) | N/A | 29 |
| Colour Pop x3 (pre-game) | N/A | 19 |
| Colour Pop x3 (in-game) | N/A | 19 |
| Line Blaster x3 (pre-game) | N/A | 19 |
| Line Blaster x3 (in-game) | N/A | 19 |
| Key Booster x3 (pre-game) | N/A | 19 |
| Key Booster x3 (in-game) | N/A | 19 |
| Mesh Masher x3 (pre-game) | N/A | 29 |
| Mesh Masher x3 (in-game) | N/A | 29 |

Pop-Ups

The game has different pop-up windows:
Welcome pop-up
Tutorial
Social pop-up (Pre-map)
Gifts
Lives
Help friends Level Map Gui (Pre-Game)
  Buy lives pop-up
    Buy booster pop-up
    Buy
    Petshop pop-up
    Buy
    Buy credit pop-up
    Buy
    Invite pop-up
    Friends select
    Share
    Like pop-up
    Share
    Friends pop-up
    Pets pop-up
Level Map Notification
    Unlocked feature Charm pop-up
    Buy
    Shop
    Unlocked feature Booster pop-up
    Play
    Collaboration pop-up
    Share
    Friend passed pop-up
    Send gift
    Completed Episode pop-up
    Share a gift
    Level pop-up (Pre-game)
    Friend highscore
    Target
    Booster select, booster buy
    Level pop-ups (In-game)
    Booster select
    Level Paus pop-ups (In-game)
    Continue
    Quit (back to map)
    Buy Boosters
Post Game Choices
    Win pop-up (post-game)
    Score—highscore
    Task completed
    Level score
    Friend highscore
    Friend beaten
    Share
    Level score
    Friend highscore
    1 star score
    2 star score
    3 star score
    Fail pop-up (post game)
    Score
    Target failed
    Friends highscore
    Level score
    Replay
    Exit (back to map)
    4th fail pop-up
    Buy
    Continue
    Exit (back to map)
Pre-Game Banner
  Description
    The pre game banner is the banner that is displayed when the level just starts. It repeats the targets of the level just before the level is started.

Banner of Score Mode Level
Start a Score Mode Level
  Behaviour: The banner is displayed and then removed before the user can start the game. The banner displays all targets. A sound effect is played when the banner is moved in and another is played when it is moved out.
Banner of Tutorial Level
Start a Level that has a Tutorial
  Behaviour: The banner is displayed, and when it is removed the tutorial starts. The tutorial must not start before the banner is removed. The banner displays all targets. A sound effect is played when the banner is moved in and another is played when it is moved out.
Banner of Level that Scrolls
  Start a level that scrolls, typically a pet rescue level that is longer than one screen (9 rows)
  Behaviour: The banner is displayed when the scroll reach the top of the level, then the banner is removed and the game starts. A sound effect is played when the banner is moved in and another is played when it is moved out.
Banner of a Level with Just One Target
Start a Level with Just One Target
  Behaviour: The banner is displayed and it just displays one target. A sound effect is played when the banner is moved in and another is played when it is moved out.
Alternative Implementation The ideas described herein can be implemented in various ways and include different features. We will now look at an alternative implementation and it is understood that the features above and below can be combined.

Figure 13:
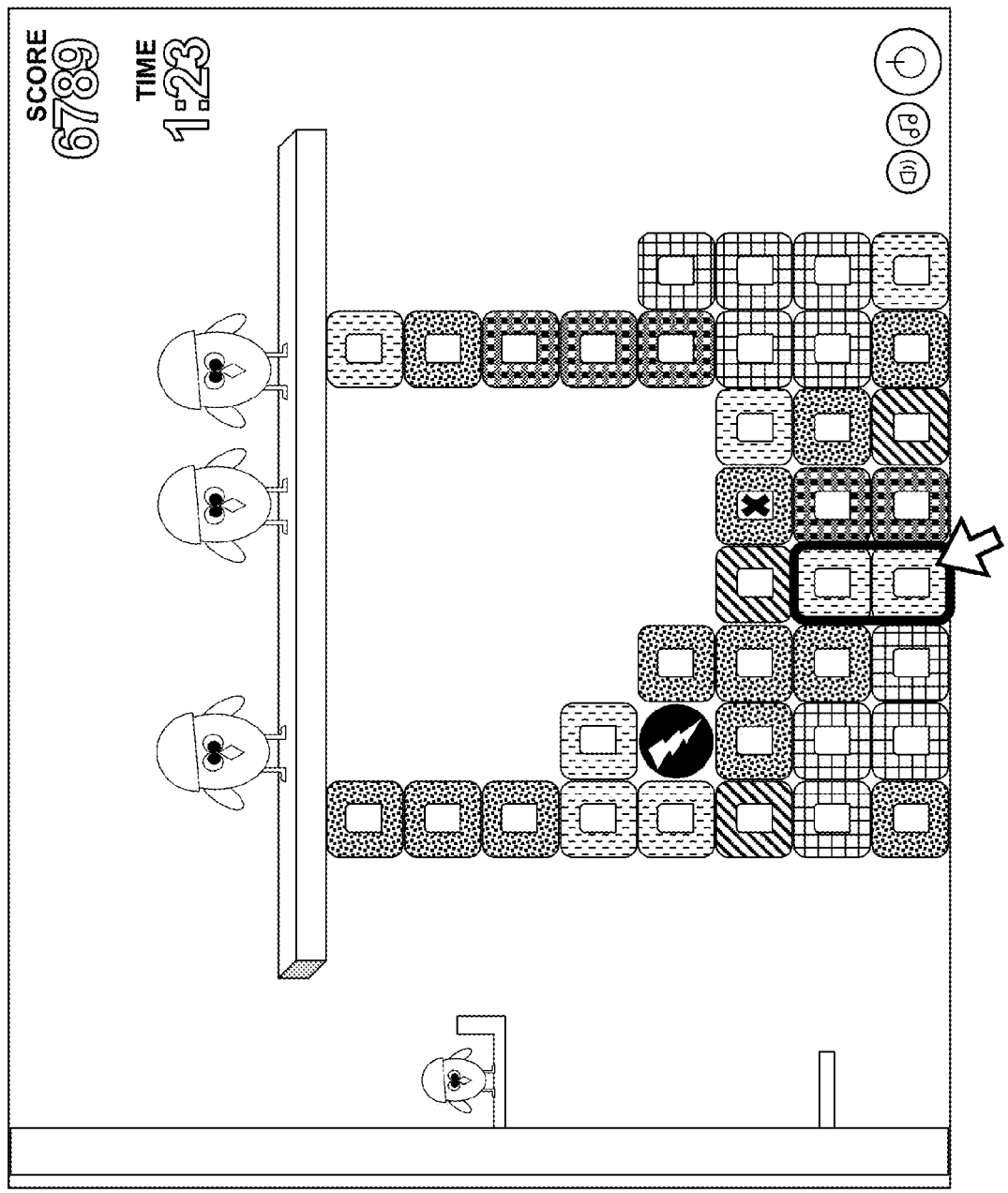
FIG. 13 shows an exemplary implementation where one group of two game elements of the same kind is highlighted.

The following describes an implementation using a 'clicker' mechanic where groups of 2 or more objects (referred to in this document as blocks, bricks or elements) are selected and automatically removed. FIG. 13 shows an example of a clicker game where one group of two game elements of the same kind is highlighted, meaning that this group can be clicked and removed.

The following sections will refer to a game with a clicker mechanic. The ideas explained may also implemented for games with other mechanics.

The game can in different implementations provide rewards for good gameplay. This can be in the form of a special game element that preforms a certain function. These special game elements can remove all visible blocks of one colour, all visible blocks in one column or in one row. One example of one such special game element is the bomb described in the implementation below.

There are different implementations on how to activate these special game elements. They can for instance be activated based on time, that they are included in a group of game elements that are removed or they can be activated by the player.

The special game elements can in certain implementations be bought or selected before the game is started and then used in the game when the player so wishes.

Game Goals

The aim of the game is to remove as much of the building as possible within the allotted time by clicking groups of blocks of the same colour. Once removed, any blocks above the cleared combination fall down to fill the gaps created.

A beam rests on top of the structure and falls down when the last block supporting it is cleared. The beam then crushes certain number of blocks as it is falling. The number of blocks crushed is determined by the height of the fall. The implementation of how many levels the beam can crush can vary.

You complete the game by reaching the ground before the time is up. If any blocks are left in the building when time runs out, you will not get any completion bonuses.

The game plays like a classic clicker where the player aims to remove as many 'floors' of the playing field (for instance 9×9) structure as possible before time runs out by clicking on coloured variations of blocks in combinations of two or more. The game can have different number of colours available throughout the game. Having 4 or 5 different colours creates a certain flow of the game play.

Once removed, any blocks above the cleared combination fall down to fill the gaps created by the removed blocks. However, only combos within the visible playing field may be cleared.

The player can in an alternative implementation scroll the screen downwards and continue clearing the blocks.

Figure 14:
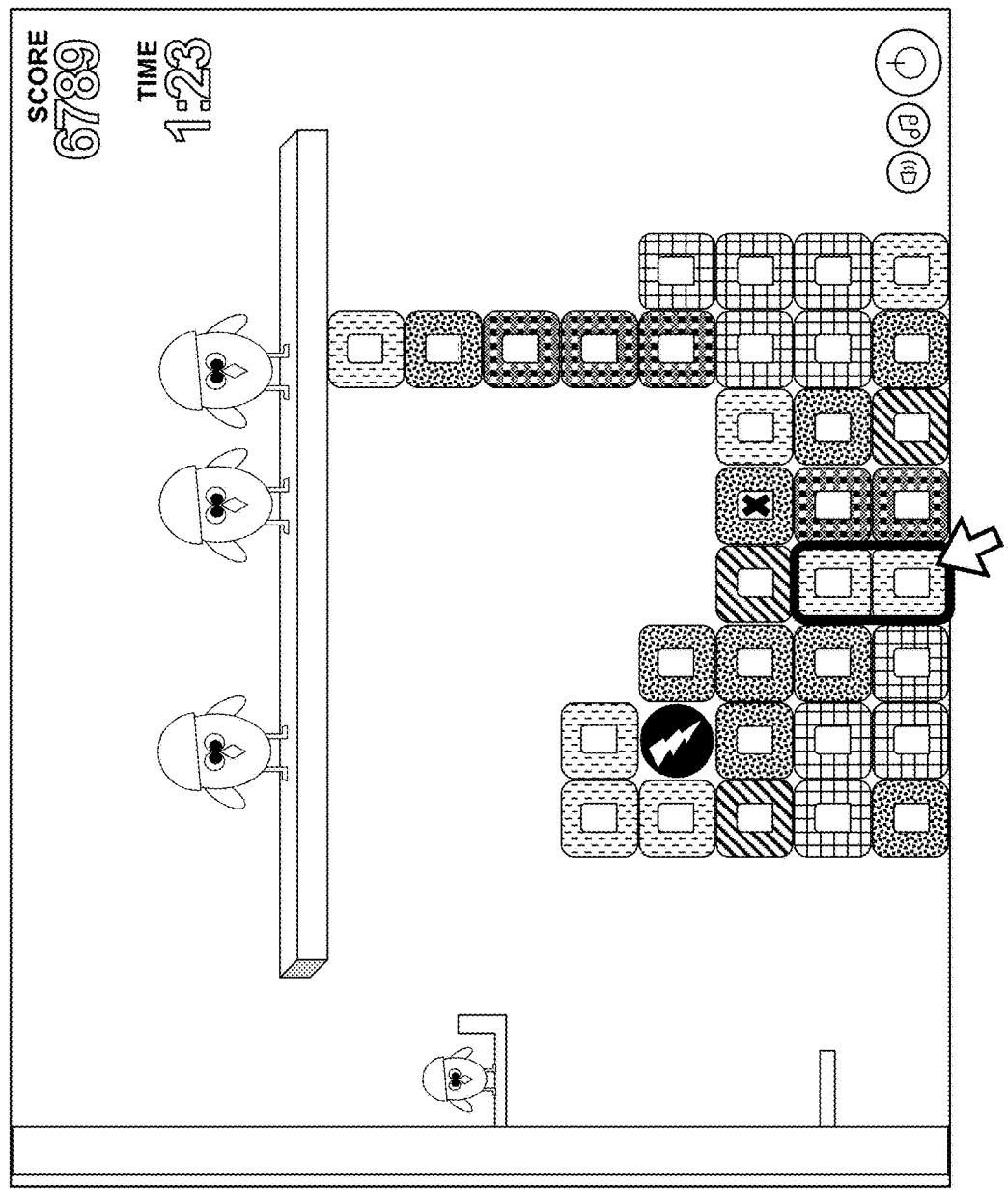
FIG. 14 shows another exemplary implementation.

As the blocks in the supporting top floor are removed, the steel beam falls down, and the higher the fall, the more floors will get crushed before the beam comes to a stop. In an implementation it is enough with one supporting block to hold up the beam, irrespective of where on the beam it is supported as exemplified in FIG. 14.

Figure 15:
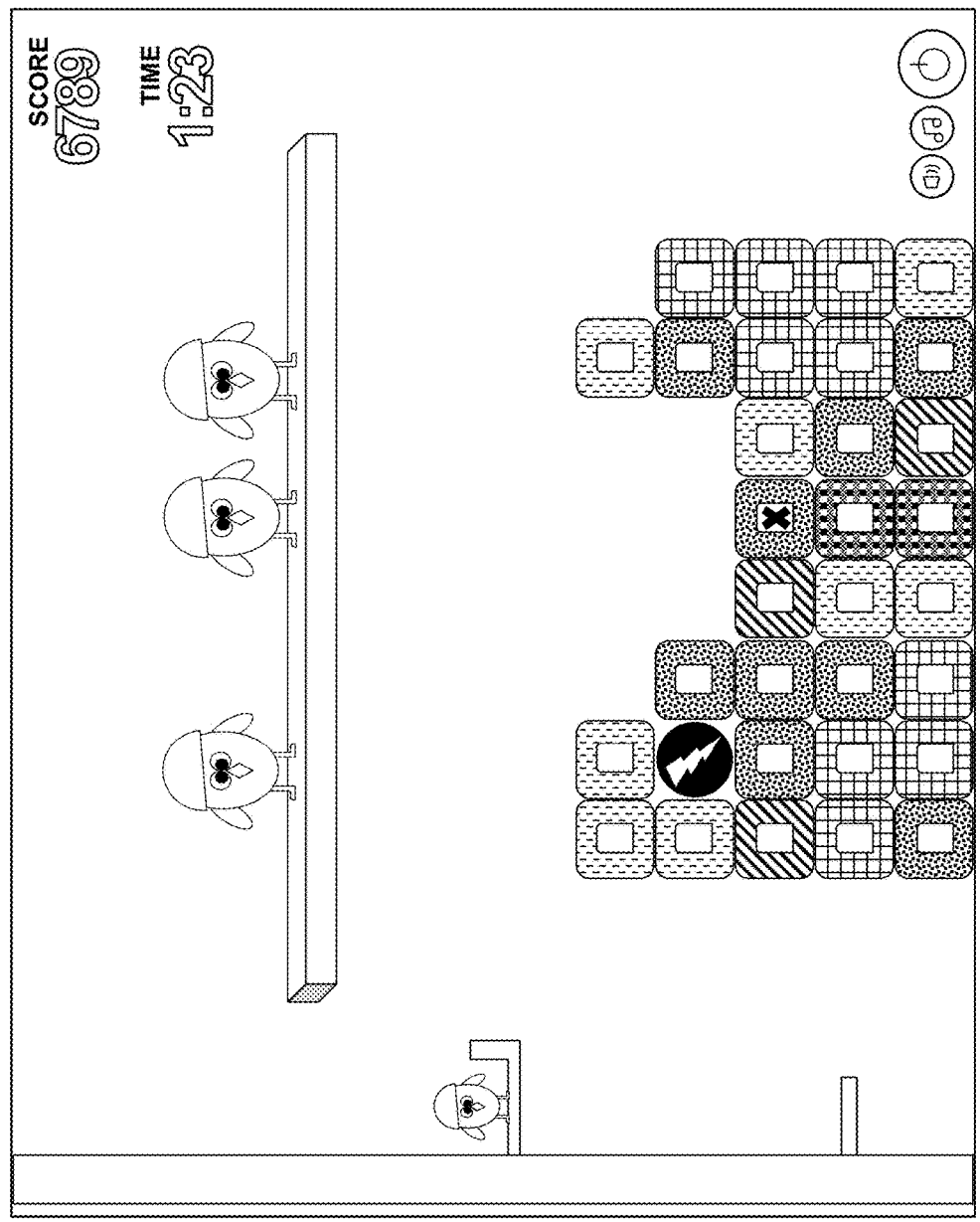
FIG. 15 shows an implementation where a beam hovers above game blocks for a short period of time before falling down and destroying game blocks.

However, by collecting 'characters' (in an exemplary implementation in the form of birds) along the way, the beam is able to remain in mid-air as shown in FIG. 15. Since each character is able to keep the beam aloft for a certain amount of time, the more characters are added, the longer before the beam falls down, giving the player time to remove more blocks in preparation for the subsequent fall.

The characters supporting the beam can be collected after having removed certain number of floors in the structure. The characters can in alternative embodiments be added by good gameplay such as a consecutive number of combinations within a limited time or without clicking on an alone block.

By clicking a certain number of consecutive combos within a certain amount of time of each other, it is possible to enter bonus modes which temporarily removes colours and thereby increases game flow.

Added as helpers, the main characters appear at randomly regular intervals on a telephone pole scrolling along the playing field on the left side of the screen. As the characters scroll past a certain point, the sleeping characters wake up and join the crew on top of the beam. Once there, they enable hang time for the beam at one second per character to give the player more time to prepare the building for the ensuing fall.

Figure 16:
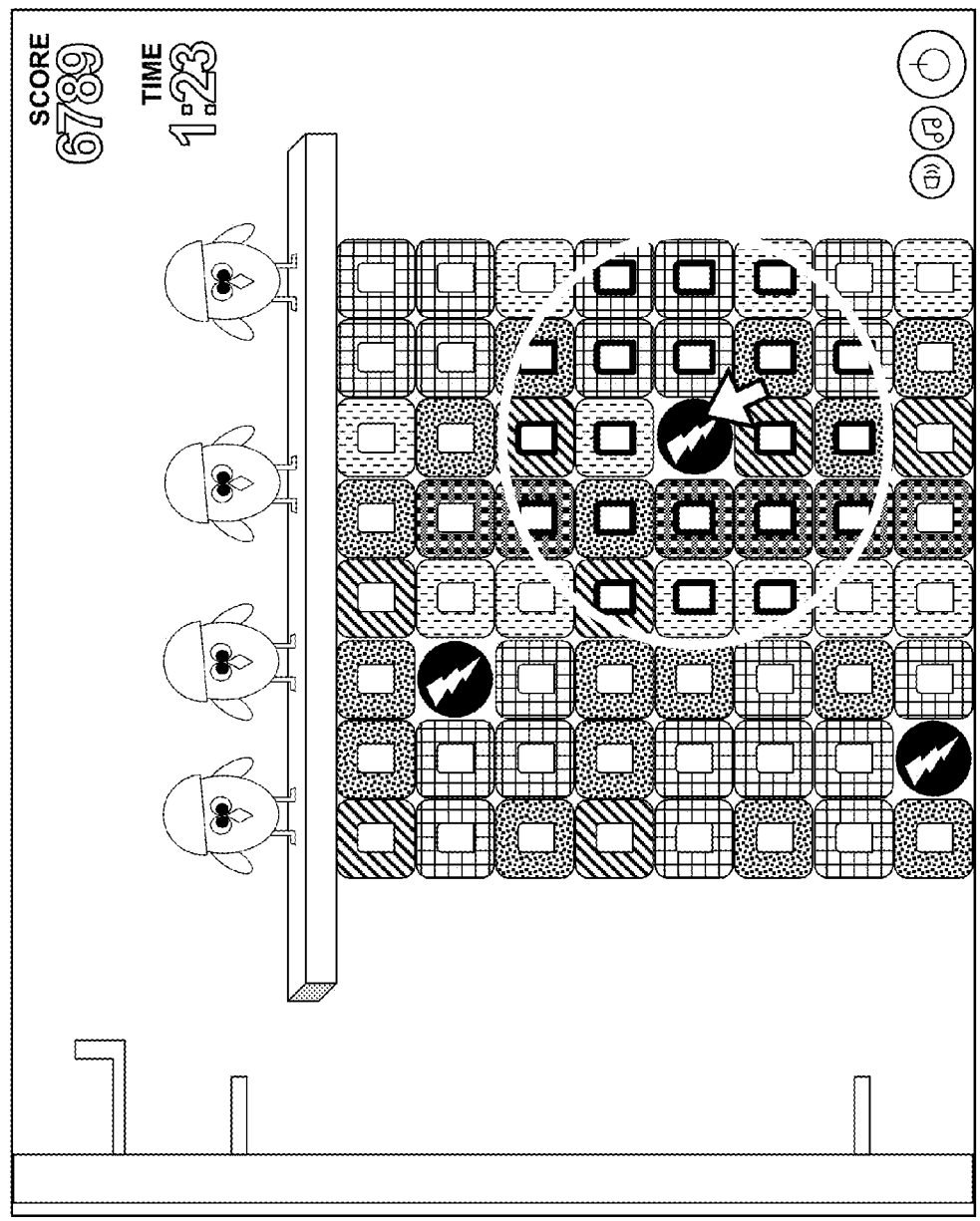
FIG. 16 shows an exemplary implementation where bomb blocks are randomly placed in the play field.

Added as boosters, bomb blocks appear at regular intervals randomly placed throughout the playing field. Clicking a bomb block immediately causes it to detonate and clear all other regular blocks, regardless of colour, within a 2-block radius, see FIG. 16. However, letting the beam crush the bomb will cause a line blast to clear all regular blocks on the same row.

Figure 17:
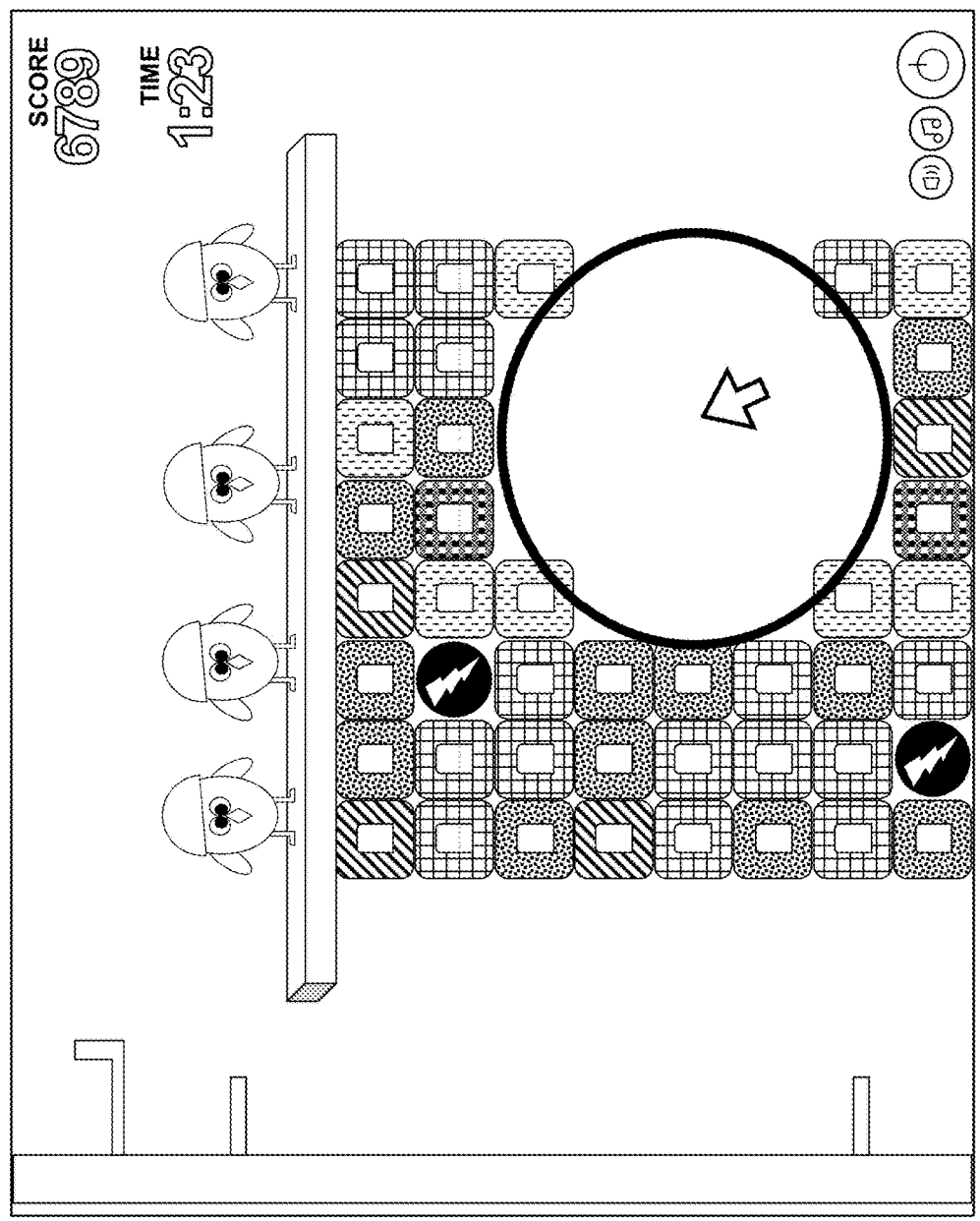
FIG. 17 shows an exemplary implementation showing the detonation area when a bomb block has been clicked.
Figure 18:
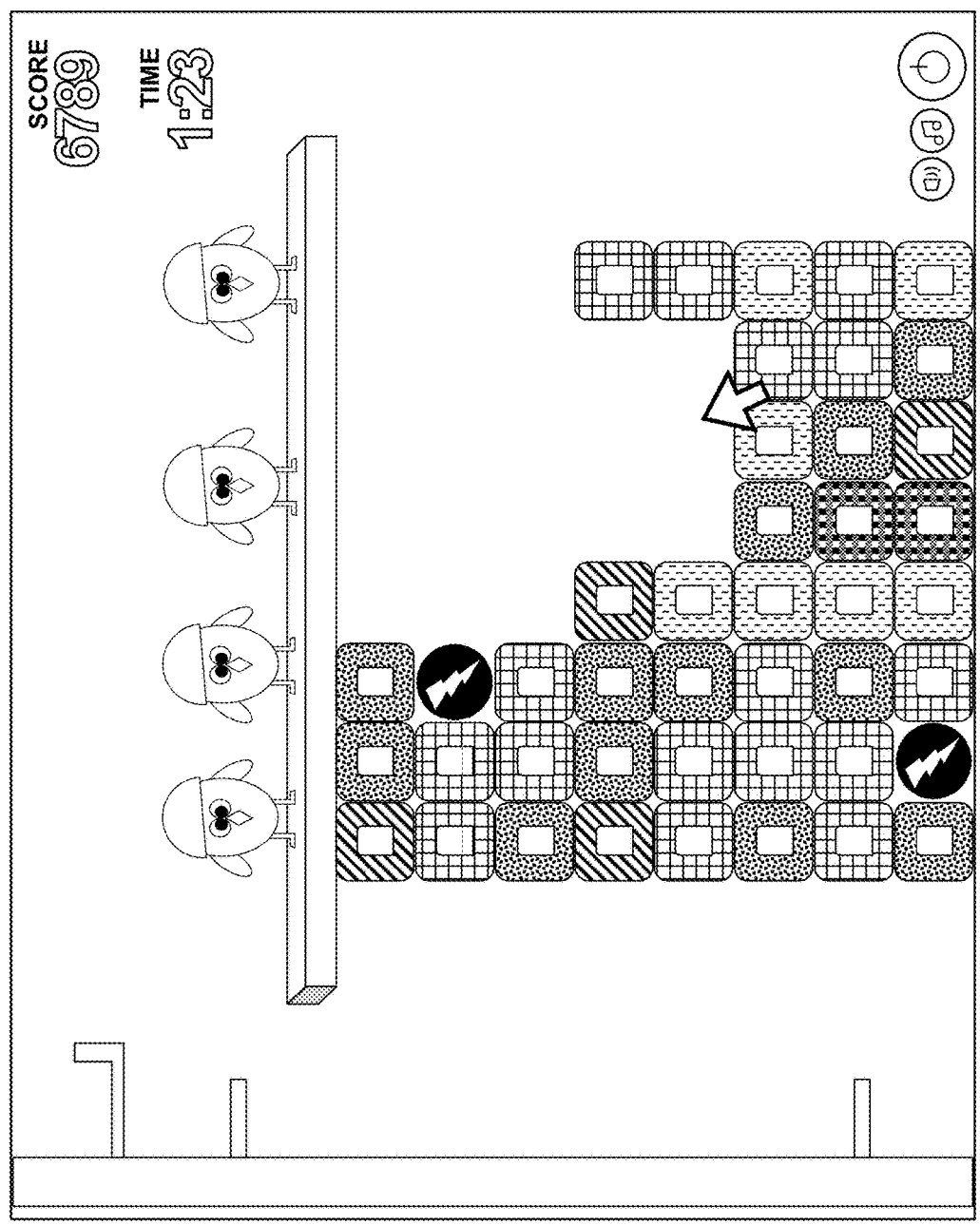
FIG. 18 shows an exemplary implementation where the blocks have fallen down after the detonation of a bomb block.

The bomb may in some instances be detonated with game elements still undestroyed in the area above the bomb detonation. These still intact game elements may fall down to fill up the area below. FIG. 17 shows one implementation of the detonation area when a bomb block has been clicked. FIG. 18 shows when game elements above the detonation area of the bomb block in FIG. 17 have fallen down.

In case there are no more moves to be made in the visible screen (i.e. all visible blocks connect only to blocks of another colour), an informational text will appear to underline this fact, while a 'wrecking ball' clears the screen from blocks, allowing the beam to fall and enable further play.

Since the game is both time- and level based, the final result is decided upon different parameters depending on the final outcome of the session.

The Beam

When you have cleared all blocks in the supporting top floor, the overlying beam falls down. The higher the fall, the more floors will get crushed before the beam comes to a stop.

When you collect birds along the way, the beam will be kept in mid-air as it loses support. Each bird adds a certain amount of time (for instance one second) of hang time, so the more birds are added, the longer before the beam falls down. This offers time for you to remove more blocks to extend the subsequent fall.

The number of blocks the beam can crush can be capped. This limit can be based on the total number of blocks it crushes or the number of floors it falls through.

Figure 19:
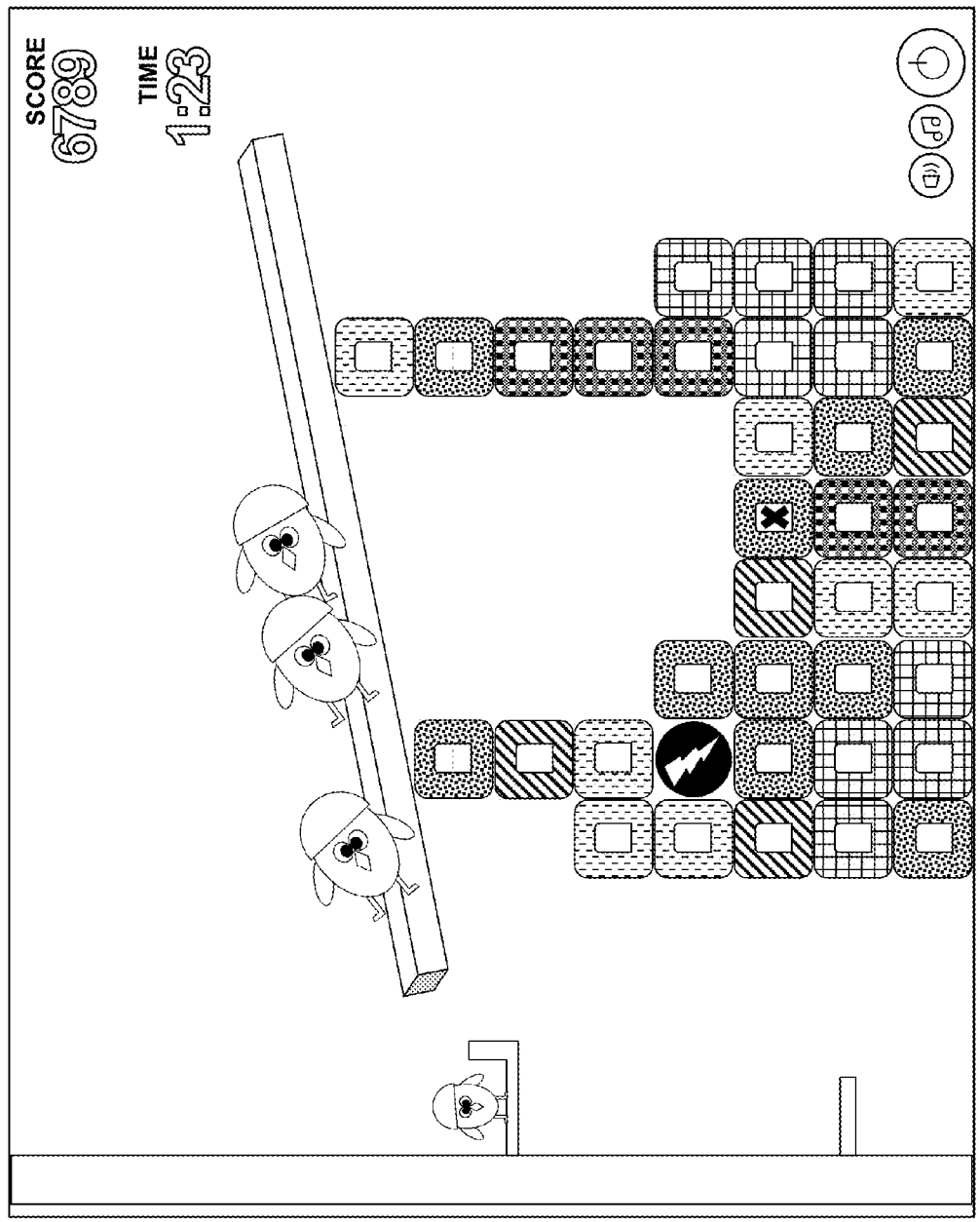
FIG. 19 shows an implementation where the characters supporting the beam can fall off if the beam is only supported with one block.

In one implementation the characters supporting the beam can fall off if the beam is only supported with one block as exemplified in FIG. 19. This feature can be implemented with a time delay so that the player can balance the beam back and forth to keep the characters on the beam. This can be implemented so that the time it takes for the beam to rock far enough for the characters to fall off, differs depending on how far out to one side the single supporting block is.

Bonus Mode

To start the bonus mode, you need to create consecutive combos quickly. When you enter the first bonus mode by creating nine successful combos within one second of each other, one colour will then be removed. To remove another colour, you need to enter the second bonus mode by creating another nine successful combos within one second of each other. Breaking a window by clicking a single block will reset the bonus counter.

Game Controls

You control the game with your mouse. Click groups of blocks of the same colour to remove them. Bombs are blown up by either clicking them or crushing them with the beam. To make the beam fall, simply remove all blocks supporting it. Birds are collected by simply passing them with the beam.

If you wish to end the game prematurely, simply press End Game at the bottom right of the screen. You can also toggle the sound and music On or Off separately.

Game Scoring

Combos

You get points for each combo you make. The bigger the combo, the larger the score.

2 blocks: 400 points
3 blocks: 900 points
4 blocks: 1600 points
. . . and so on using this formula: number of blocks× number of blocks×100

Bombs

You get points for each bomb you detonate. You get different scores depending on how they detonate:

Bomb detonated by your click: number of blocks×number of blocks×50

Bomb detonated by the beam: number of blocks×number of blocks×100

Beam

You get regular combo points for all blocks you crush with the beam. A multiplier is applied to those scores, increasing by 0.1× for every floor you pass until it reaches a cap at 2.0×.

Time

You get points for reaching the ground depending on the amount of time left. The base score for the time bonus is 100,000 points, and any time left when reaching the ground translates into a percentage of this.

Alternative Scoring Implementation

Standard Scores
  2 blocks: 40 points
  3 blocks: 90 points
  4 blocks: 160 points
  Followed by: (number of blocks)2×10

Special Scores

Beam floor crush bonus:
  1 floor: 1×1000 points
  2 floors: 2×1000 points
  3 floors: 3×1000 points
  Followed by: (number of floors)×1000

Bombs
  (Number of blocks)2×100

Out of Time
  Percentage of total floors cleared×1000

Ground Reached

Upon completely clearing the playing field, the remaining time is calculated as a percentage of the total time given; which in turn translates into a percentage of a time bonus of 10.000 points added to the final score Strategy Try to keep a steady pace while playing—not only to keep the flow going, but you may also reach a bonus mode or two that way. Work your way down from the top floors to the bottom ones as this ensures less surprises, allowing you to plan ahead.

Use any beam hang time to your advantage by removing as many blocks as possible before the beam falls down. Finally, don't be disheartened if you find yourself out of moves—the wrecking ball will make sure you're back on track in no time!

Since bigger combos are better and the bonus modes provide just that, listen closely to the sound of the combos and pay attention to the changing background to know when you reach the bonus modes.

Bombs generally give larger scores if detonated by hand rather than if they're crushed by the beam, so try to blow them up with as much surrounding blocks as possible.

To enable higher falls, try to leave a single column as support for the beam and focus on removing as much of the surrounding blocks as possible before removing the supporting pillar.

Characters

Characters appear both as main characters integral to the core mechanics of the game, and as secondary characters adding flare and flavour to the game's setting and story. The main characters, the pigeons of the Block Busters demolition company, naturally play the leading roles as the foremen of the demolition site. As such, they initially sit fast asleep on the scrolling telephone pole on the side of the playing field, before automatically waking up and jumping on top of the beam when passed by. Once there, they each grant the beam one second of extra hang time before releasing it one at a time.

The characters can appear randomly, as a result of good gameplay or at set or random level intervals. The characters can for instance appear randomly at intervals of 50-100 floors, 150-200 floors, 250-300 floors, 350-400 floors and 450-500 floors.

Bombs

Bombs appear as single blocks within the playing field that explode and clear all regular blocks, regardless of colour, within a 2-block radius when clicked. Generated every 10-15 seconds in a randomly selected column within the top rows below the playing field, bombs offer experienced players a welcome boost, while getting the flow going for more inexperienced ones. Acting as any other block, bombs will naturally fall to fill in gaps created underneath as well as automatically get detonated by the falling beam. However, rather than clearing a radius when crushed by the beam, the bomb block will create a line blast beneath the beam, clearing any regular blocks within its own row.

Line Blast Elements

Elements that could be bough as a booster or received in the game. The line blast elements may remove one row or column of blocks.

Paintbrush

A booster that lets the player change the colour of a block or to make it matchable with any other colour.

Bonus Modes

Bonus modes are the special states of gameplay which the player is able to reach by playing fast and accurate. Successfully clicking a certain number of valid combinations of blocks within a certain amount of time from each other will ultimately cause the game to enter the bonus modes. Here, one colour is temporarily removed and the audio-visual feedback intensified to underline this fact.

There are two reachable bonus modes in this implementation of the game; the first is reached from the default mode by clicking 9 consecutive combos within 1 second of each other. As the 9th combo is clicked, all blocks of that colour (the last colour clicked) are simultaneously cleared and will only return once the bonus mode is over. At this point, the audio-visual feedback is intensified using louder explosions, larger effects and screen shakes.

Once entered, the bonus mode runs for a default amount of time of for instance 5 seconds. However, depending on the speed and accuracy of the player, the first bonus mode may be extended into the second bonus mode; by clicking 9 consecutive combos within 0.5 seconds of each other, the game enters the second bonus mode, which removes yet another colour (the last colour clicked) from the playing field, intensifies the audio-visual feedback even further while running for the same default amount of time of 5 seconds before returning to normal mode.

Social Aspect

Connection to a Social Network

Games created using the invention described herein can be connected to or linked with a social network such as Facebook™ or Google+® or a games platform with different players who can interact and see each other's progress. It is common that the users on such networks have avatars with for instance a photo of the user and/or the user's name. Such avatars can for instance also be a sign or a figure.

The social network can be located on a server that is different from the server on which the game is located, the game and the social network can also be located on the same server. In some implementations there is a direct live connection between the social network and the game platform that continuously synchronise them, in other implementations the two platforms synchronise at certain intervals, such as when the player logs into the game. The players progress when having played in offline mode (for instance completed levels and score), for instance if the player is travelling in a tunnel, can be synchronized when the player is connected to the internet.

The user and his friends' avatars can be displayed in the game or in relation to different levels in the game to show the player's progress. The avatars can also be shown in relation to indicators of the player's skill level or high score. In some implementations the avatars can be derived from a social network to which the game is connected, in other implementations they can be derived from a database related to the game. It is possible for the avatars related to users to change depending on the overall progress or performance in the game. For instance, an avatar can become larger or more visually advanced as the player plays the game for a longer time.

The user can connect with other users of the social network, either as "friends" on the social network or as "friends" within the game environment. The player can interact with other players he is connected to on the social network or who are playing the same game.

The game can be implemented to synchronize game state information and/or retrieve and connect to the social graph information and user profile of the player on a social network. It can also be connected to a proprietary network related to the game or the game developer.

The game can also be implemented so that it is connected to a plurality of social networks. The user can be given the option to select what information that can be derived and shared with which social network.

One example of how the game can be connected to a social network is the Facebook™'s Open Graph API allows websites and applications to draw and share information about more objects than simply people, including photos, events, and pages, and their relationships between each other. This expands the social graph concept to more than just relationships between individuals and instead applies it to virtual non-human objects between individuals, as well. A game can typically share in-game events such as that a level has been completed, that a player has passed a friend in the game or beaten a friend's high score on a level. The game can also post events, such as that a player has purchased objects in the game or received objects from other players of the game.

Ways of Playing the Game
Web-Based

One way of implementing a game using the techniques described herein is through a web site with a plurality of casual games. This platform can be used as a basis to test the performance of the game and how it is perceived by players. In some web-based implementations the game is implemented to be played in head-to-head tournaments, has a limited number of levels and no external social network connection. In some implementations the players can play the game against other players on the platform.

If a game proves to be successful in a web-based implementation, it can be further adapted to another type of implementation, based on a virtual terrain in which the player progresses. This implementation typically has a connection to an external social network, and can have multiple game modes such as asynchronous and synchronous tournaments and single player mode. The nodes on the map in the game are typically different levels that the player can play.

The two implementations described above can be part of a modularised approach to developing games, which help streamline and facilitate the process of producing as well as further developing new titles.

Virtual Map

Figure 20:
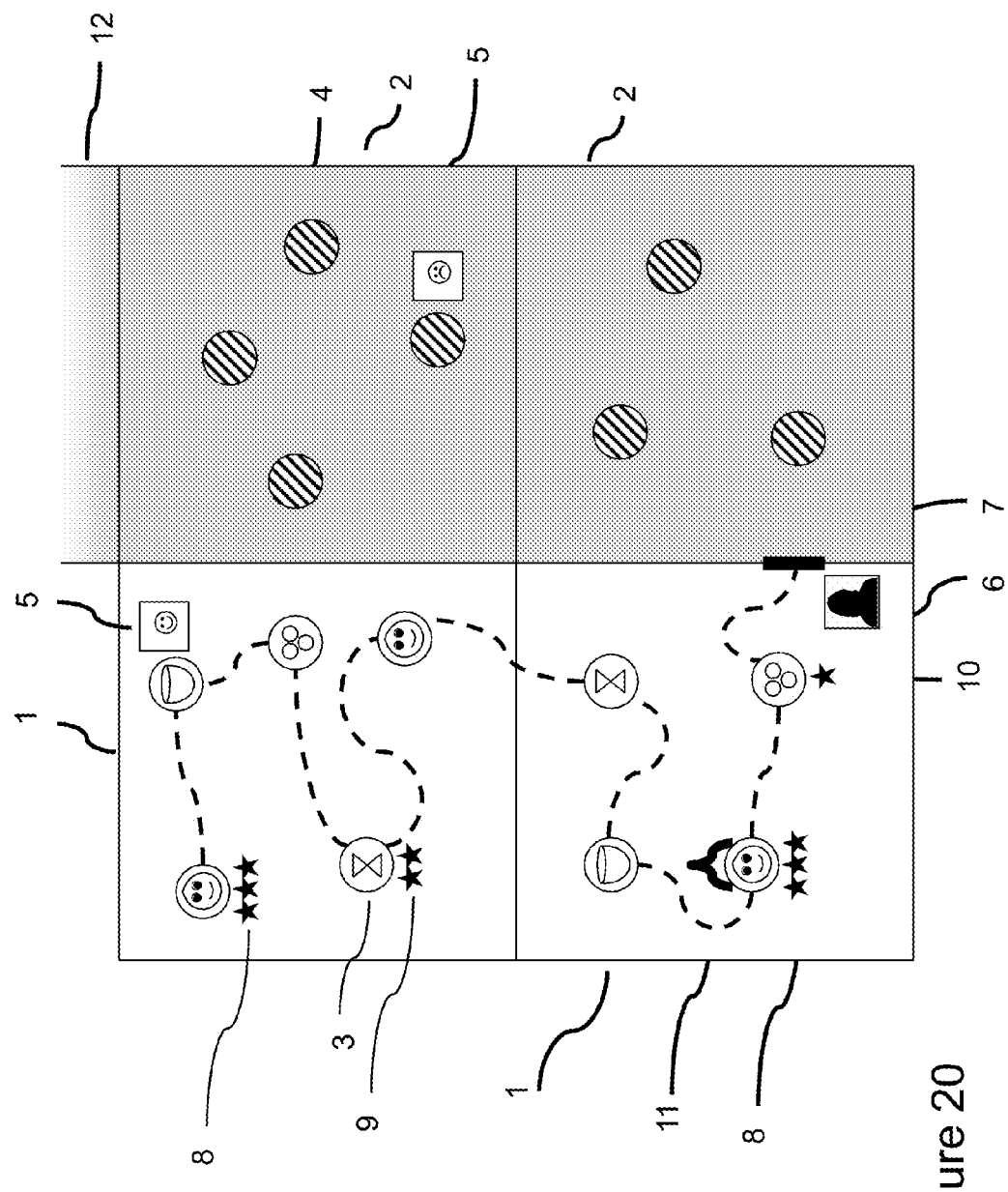
FIG. 20 shows an exemplary implementation of a virtual map.

The game can be implemented so that a player progresses through multiple levels of changing and typically increasing difficulty. FIG. 20 shows an implementation of the game with a virtual map layout of a game environment, displayed on the screen of the computing device used by the game player. As the player progresses through the levels in the game, his progress is represented as a journey along a path on the virtual map. Representing progress in this manner provides an additional layer of engagement for players, and also opportunities for viralisation and monetisation.

The virtual map consists of stages 1, 2 with varying number of levels 3, 4 represented by nodes on the virtual map. The user travels between levels and completes the levels one by one along a path by playing the associated game. When the player reaches the goal of a level, the next level on the path is unlocked and the player can play that level in the game. The number of stages and levels can vary depending on the implementation.

In some implementations of the game, the player will be introduced to the game by tutorials explaining the fundamentals of the game. One way of doing tutorials is to force the player to make certain moves, for instance in the first level of a game the player might be prompted to make the most basic move possible without the option of doing any other move. The tutorials will in most cases be concentrated to the first levels of the game, but they can also be used at later stages to explain newly introduced elements and objects.

The levels can be numbered consecutively throughout the game or they can be numbered within a stage, it is also understood that other ways of identifying the stages and levels can be implemented. New stages to the virtual map 12 can be added by the game designers at any time—so a game may be launched with say 20 levels, and after a number of weeks, there may be fifty or sixty levels present.

Stages in the game can be both locked or unlocked. In most implementations, the majority of levels start out as locked and are then unlocked as the player progresses in the game. Unlocked stages can typically be replayed at any time. One way of unlocking new stages is to complete the last level on the latest stage. The user is sometimes faced with other challenges to unlock the next stage in the virtual map.

In some implementations, certain levels and stages are locked based on other criteria than the player's linear progression in the game. Such levels can for instance be based on the total score the player has achieved on all levels, the average performance on levels or on the number of friends that the player has invited to play the game.

In one implementation, one challenge 7 to unlock a stage arises when traveling from one stage to another once all the levels have been completed in that stage. The levels in the stage to which the player is travelling is typically locked by default, and the player must unlock them. This requires the help of for instance three friends. The player can ask friends for help by sending an in-game message within the game environment or for instance through a social network that the game is connected to. The friends can already be playing the game and do not have to be 'new' players, but they can be friends not already on the same social network.

The player can also pay to get instant access to the locked stage. The currency used for paying can vary between different implementations, for instance it can be hard or soft currency, or it can be based on score achieved in the game. It is possible for the currency to be associated with a social network to which the game is connected, or it can be associated with another platform related to the game. The player can use a combination of help from friend and payment to unlock the new stage. The cost for unlocking can in some implementations be lowered as a fraction of the total number of friends needed when help from some but not all needed friends have been received.

There can be ways of getting past a collaboration block other than asking friends for help and paying for it, which are the most common ways of passing a collaboration block. This can be done through to use of 'Mystery Quests', which gives the player the option of completing one or several challenges to unlock the block. Such challenge can for instance be to play one or several past levels with modified goals in order to pass the collaboration block, for instance three levels—one for each of the locks.

These challenges are typically in the form of replaying a previously completed level but with a new goal to reach, for instance a target high score. In a typical implementation, the score requirement is higher than it is for playing the level regularly, and also no other goals need to be fulfilled. For example, if the player gets to replay a level with jelly with a new target high score, the player would not need to remove the amount of jellies specified as long as the target score was reached.

The request for help is sent to the friend who then has the option to accept to help. The request for help can in some implementations be sent using the social network to which the game is connected; an alternative implementation is to send the request to someone external to the game (via email, text message, instant message for instance) who has to join the game to respond to the help request. It can be understood that there can be variations between implementations in regards to how players respond to requests from other players. In a typical implementation, a link will be provided to the player who has been requested to help. This link can be related to a social network to the game is connected. This is one of the viralisation techniques implemented in this game.

In addition to the virtual map layout in FIG. 20, there can also be other levels or stages that are not part of the progress along the path in the virtual map. Such stages or levels can be present in the game associated with the virtual map at all times or can be unlocked when the user reaches a certain in-game achievement. This in-game achievement can for instance be completing a specific level, reaching a predetermined high score (for instance, collecting a specific number of stars when completing a level—highly skilled gameplay can win the user three stars) or paying virtual currency to unlock the stage or level.

The map layout in FIG. 20 can be used in games connected to or linked with a social network or in a game with a user database. It is possible for users to have an account in the game or on the social network. It is common that the users on such networks have avatars with for instance a photo of the user and/or the user's name. Such avatars can also be a sign or a figure. The user's avatar is displayed on the map layout alongside the level where the user is 6. It is understood that there are different implementations of showing where the user currently is on the map. This can for instance be the latest level the user completed, the level where the player has achieved the highest score or the last completed level along the traversed path.

The user can in some embodiments be given the option to select which users should be shown on the virtual map. The users to choose from can be friends on a social network, or the user can get suggestions to show friends which meet a certain criteria, for instance friends which the player has interacted with the most in the past or friends living in the same geographic area as the player. The user can get the option to choose from other people not being friends on the social network, but that meet other certain criteria.

The user can play any of the unlocked levels on the map, so the user can go back and replay already completed levels to get a better score or beat friends' high scores.

The player is in some implementations of the game rewarded for good gameplay of a level, for instance reaching a target score or completing the level in a short time. In some implementations the user has to reach a certain number of points to complete a level, reaching this target score can be represented with a symbol such as a star. In one implementation a star is lit when the user reaches a certain number of points in a level. The user can earn more than one star on each level and the levels are re-playable to get a higher score. In some implementations the indicators representing the players' performance can be related to other goals, such as completing levels within a certain amount of tries.

The player's total number of stars collected in the game can in some embodiments unlock features. The unlocked features can for instance be power-ups, in-game currency or bonus levels. After being unlocked, such features can typically be accessed by the player in the game. Some unlockables might be given to the player while others require a purchase to be accessed.

The symbol representing how well the user has played on each level can be displayed alongside the level on the map 8, 9, 10.

In the map view, the player can hover over an unlocked level to display a thumbnail version of it. This makes it easier to find specific already completed levels, and can also give the player an idea of what to expect before actually starting a level. In a typical implementation, thumbnails cannot be displayed for levels that have not yet been unlocked. If trying to view one of these a symbol of a padlock will be in the place the miniature version of the level is supposed to be.

The thumbnail can also display how well the player has done on the level if he has played it previously. This can for instance be represented with the number of stars the player has received on that level, the actual score or some other indication.

The thumbnail can also display the player's position on the high score table in relation to the player's friends or showing what friends are on the high score table. This can be a driver for the player to replay the level to beat one of the friends.

If the game is connected to a social network or the user has connected with other players in the game, the levels can present a leaderboard showing who among the user's connections, or among a subset of the user's connections, that has the highest score. There can in some embodiments be a notification 11 shown on the map if the user that has the highest score among the friends connected to the game. Such a notification can be in the form of a message sent through for instance through the social network or an in-game message.

The type of game mode or game goals for a level can be displayed on the map as a symbol, for instance it can be a symbol for the level itself, or it can be shown in proximity to another symbol for the level. Such a symbol 3 can for instance be in the form of an object related to the game goal, such as an hourglass representing a level with a time constraint.

Animations and Interactions on the Virtual Map

The landscape of the virtual map will typically have animated sequences which give a feeling of the map being alive and dynamic. For example, trees on the map can sway in the wind, animals can move around and the player progressing from one level to another can be accompanied by an animation of a player-associated character moving on the map.

In some implementations, it is possible for the player to interact with objects on the map in such a way that animations are triggered. For instance, clicking on a bird can make it fly into the air and hovering over water can make waves appear.

It is also possible to have any combination of a map that is static but reacts to player input, a static map that does not react to player input, a dynamic map that reacts to player input and a dynamic map that does not react to player input.

Figure 21:
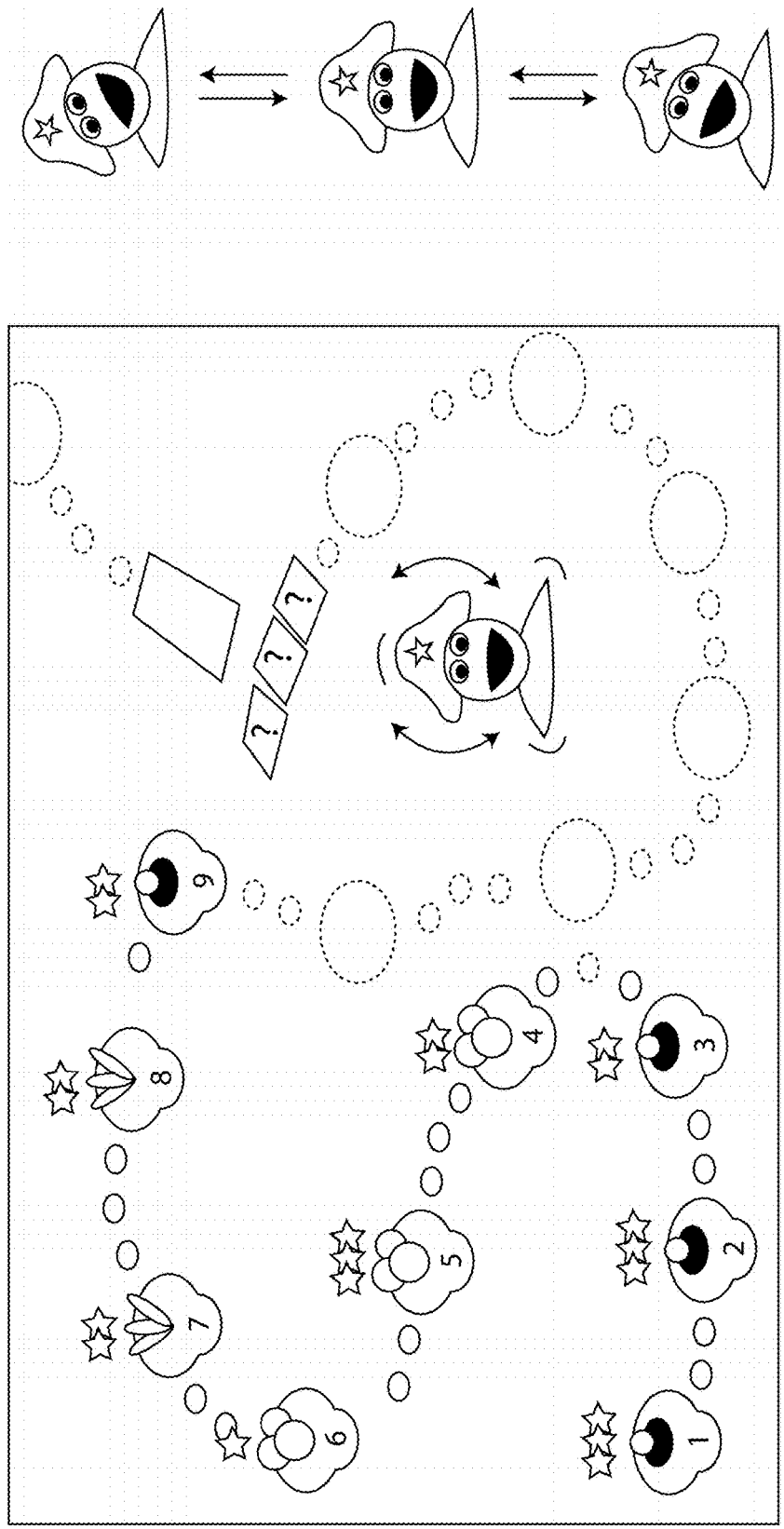
FIG. 21 shows an animated sequence on a virtual map.

One example of how the virtual map can be dynamic and moving is shown in FIG. 21 where as an example, a coconut character moves slightly from side to side. A collection of subtle as well as less subtle animations throughout the map will together make the map appear moving and alive.

Pre- and Post-Level Screens

Before starting a level, players have to select which level to play from the map view. When selecting a level, the player is shown information about the level, such as the amount of points needed, the available boosters that can be used, the goal of the level and also the highscores of friends who have previously played that level.

Figure 22:
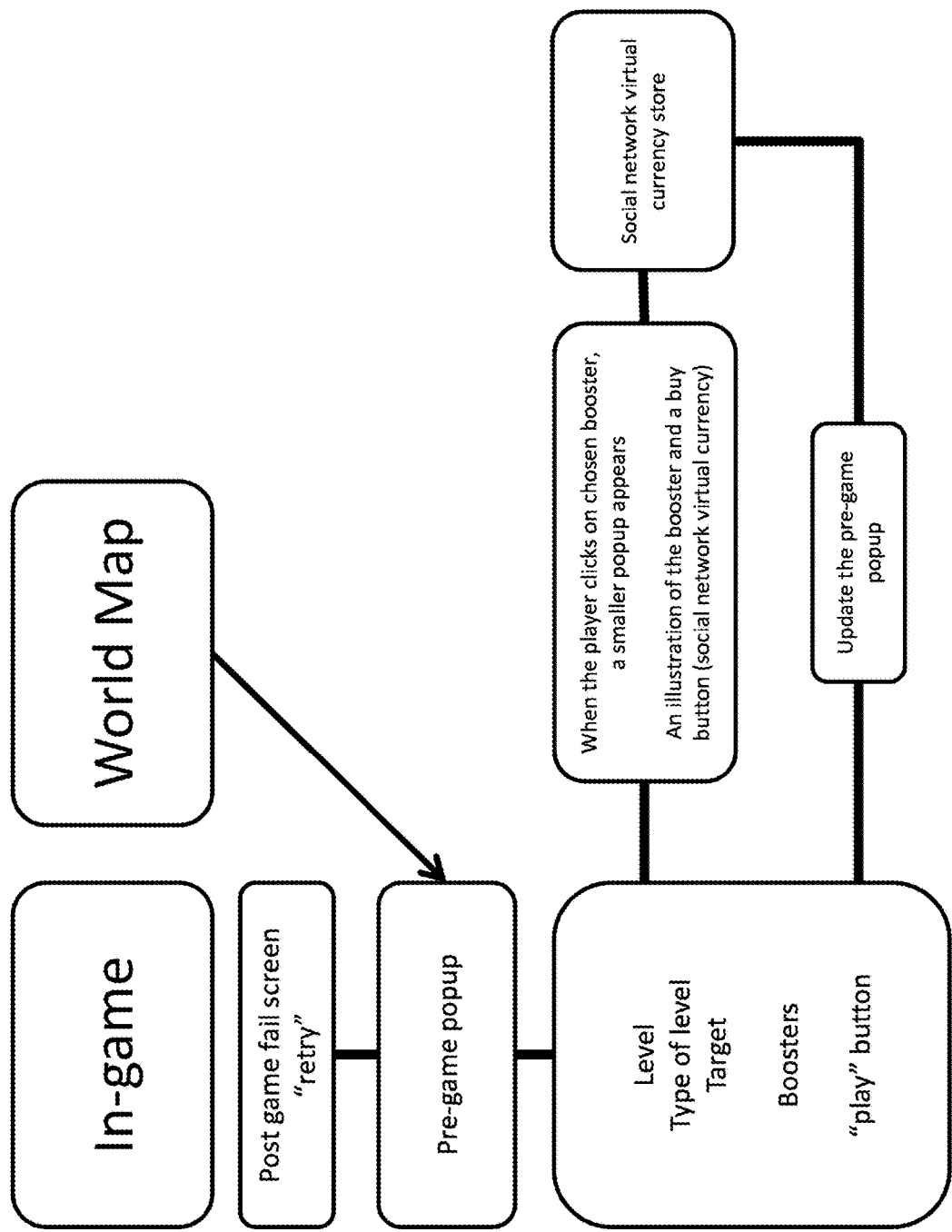
FIG. 22 shows pre-level game progression.

FIG. 22 shows one implementation of the game flow before starting a level, including which screens are shown to the player. When choosing to play a level, either after having previously failed it or after having selected it from the map mode, the player is shown a pre-level screen. Through this screen the player can choose to purchase boosters. By doing so, the player can be transferred to another screen representing the in-game shop, or the purchase can be performed while still in the pre-level screen. If the player has no currency available, it is also possible for a screen related to acquiring currency to be shown.

Figure 23:
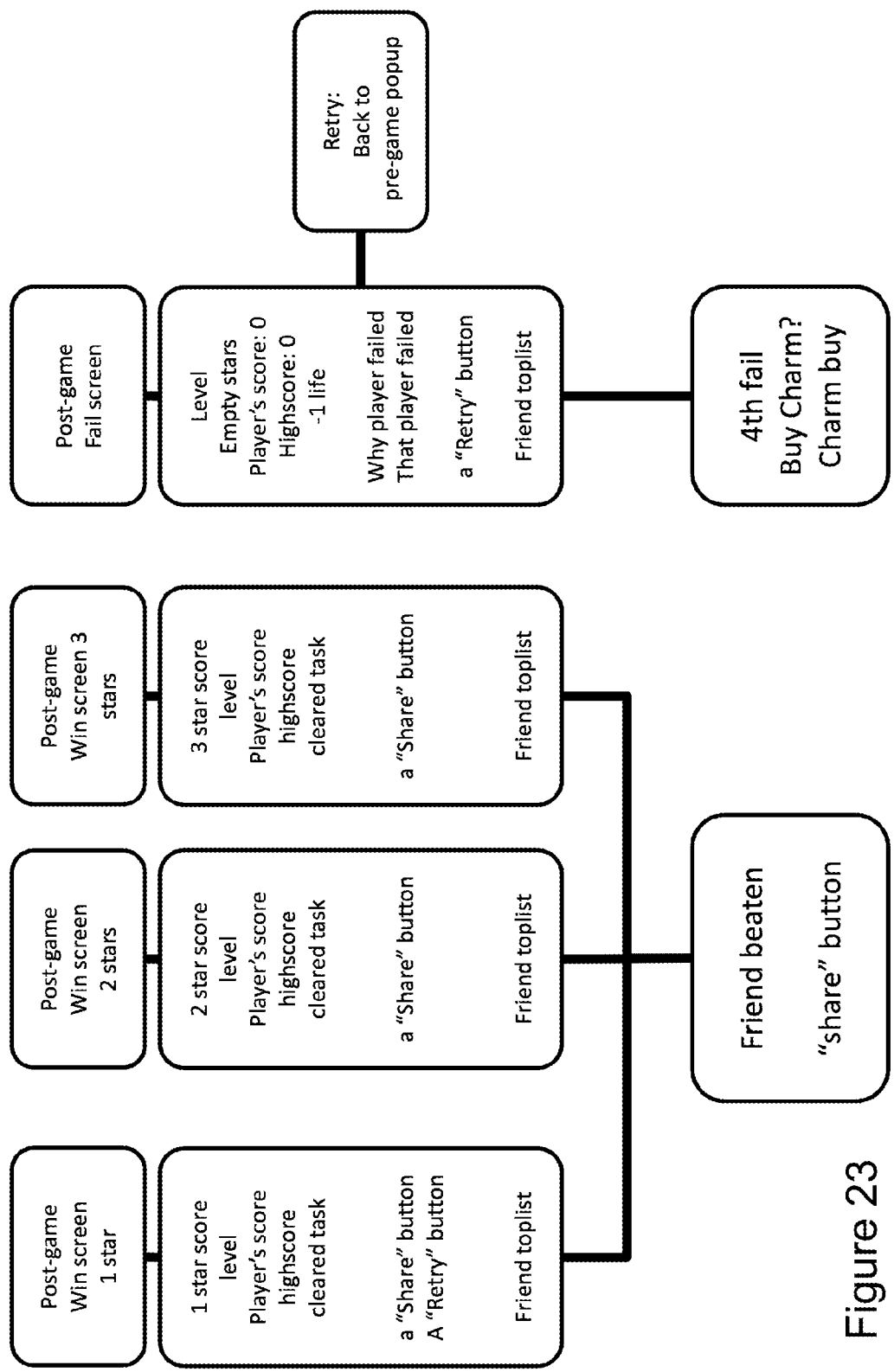
FIG. 23 shows post-level game progression.

After completing a level, the player is presented with a screen that shows the amount of points gained, the amount of stars achieved and also the previous highscores of friends. One implementation of the game flow related to the post-level screen is shown in FIG. 23.

Both of the post-level screens discussed present the player with an option to share this information. The sharing part is done on a social network to which the game is connected. By sharing information such as which friends the player has beaten, competition is encouraged and the viralisation of the game is increased, due to people not playing the game also being able to see such messages.

The player can also be presented with another screen related to the performance on the freshly completed level. This screen shows how good the player scored in relation to friends' highscores, together with a message about which friend(s) that have been beaten.

High Score List

When showing the pre-level screen, players are presented with the highscores of friends. This gives an opportunity to know beforehand what to aim for, and is something that increases the competitive element in the game. The information about friends' scores can be derived from a social network to which the game is connected, it can also be retrieved from a database related to the game. It is important for further increasing the engagement and of players and to some extent viralisation, since players are constantly being reminded about the performance of others, which can incentivise players to try harder and subsequently play more.

In some implementations, each area in the game or certain groups of friends or players can have a 'Champion', 'King' or similar, meaning the player within a network of players that has the best performance on the levels in that area.

Friends' Highscores on Score Meter

In some implementations, there are indications of the performance of other players displayed during the play of a level. This information is often based on data from previously completed levels, but it can also be related to levels that have been attempted and failed by other players. Performance information can for instance be derived from a social network connected to the game or from databases more directly related to the game. In some implementations, players can see the score of other players in real-time, thus increasing the competitive element of the game. The other players whose performance will be displayed is sometimes chosen by the player, sometimes automatically derived from a social network of the player, and other times it can be based on other elements, such as the performance of all players of the game.

Figure 24:
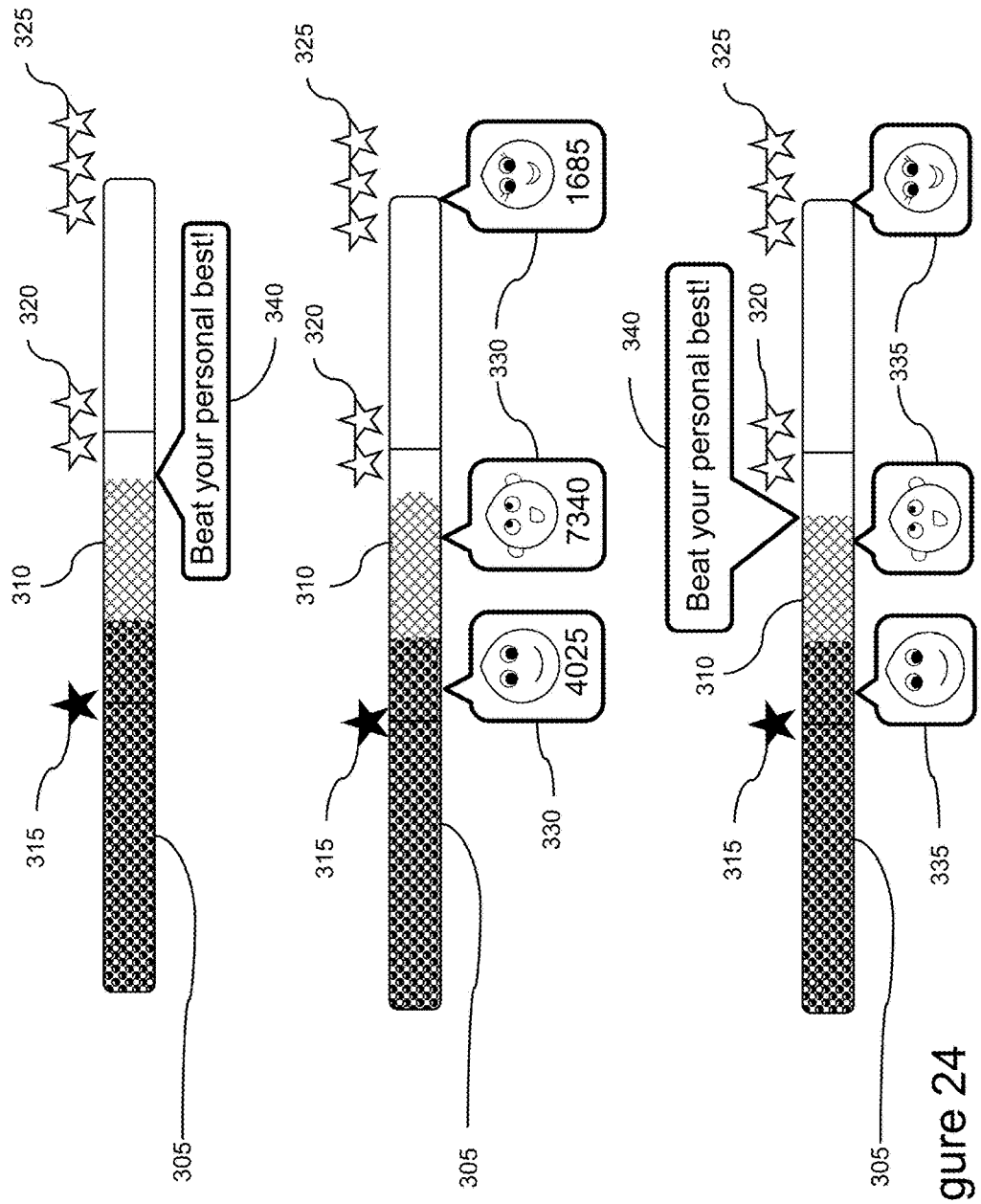
FIG. 24 shows different ways of implementing a score meter and the results of other players.

In some implementations, the player can see indications of the previous high score achieved on a level while playing it, shown by 310 in FIG. 24. It is also possible that no indication of the player's own previous score is shown.

In some implementations, the indications of the performance of other players are shown in relation to the score meter. It can be both absolute and relative indications. The indications can be in the form of pictures associated with the players, as shown by 330 and 335 in FIG. 24. When the player passes the score of another player or the previous best score the player has achieved, a message can be shown to encourage the player and denote the accomplishment. One example of such a message is illustrated by 340 in FIG. 24.

It should be understood that the invention is not limited to using stored scores to show the performance of other players. In one implementation, players can see the scores of other players currently playing the same level while they are playing it, making it so that the indications of other players' scores can be moving in real time during the play of a game.

The score comparisons presented to the player can be given in percentages, points and when applicable other indicators, for instance time played or number of attempts on a level.

Friends' and Player's Progress Showing on Virtual Path

Another feature in the game that increases the competitive element is that friends' progress on the virtual map is shown. Even if the player has not unlocked or reached the areas in which friends are playing, their progress can still be shown by means of a picture associated with the player being displayed next to the level they are currently at.

It is also possible to invite new players to play the game. These can be invited through the game platform or through a social network to which the game is connected. In some implementations, the game suggests which players to invite. This suggestion can for instance be based on if the players have played other games from the same developer, if they are active on a social network or if they seem to like other games in the same genre. It is also possible for the suggestions to be based from data related to a social network, such as how often they interact with other players or how often they log in to the social network.

One aspect that increases the competitive element of the game is that messages can be sent to friends, for instance related to beating their scores or passing them in terms of overall level progression. In some implementations, the game prompts the player to send a message to signal that a friend has been beaten. This message can be edited by the player, or it can be a pre-defined version suggested by the game.

The messages can be generated on a server hosting the game or on a server hosting a social network to which the game is connected. Information used in the message can for instance be derived from one of the databases to which the game is connected or from databases related to networks to which the game is connected.

Lives

In a typical implementation, a player of the game has a certain amount of lives that are used as the player attempts to complete levels. If the player starts a level but does not complete it, a life is lost. When having no lives left, the player cannot play the game anymore.

Regeneration of lives can be done automatically or manually. In some implementations, the player will regenerate lives over time, for instance by replenishing one life every 30 minutes. In other implementations, the player can only regenerate lives by performing certain actions, such as playing other games from the same developer or by making a purchase related to the game.

Sending Gifts

One aspect of the game that increases the viralisation and engagement of players is the ability to send gifts to other players, which help them in the game. It is possible to give certain gifts for free, such as extra lives.

The option to send free lives is available for instance through the pre-level screen and the post-level screen. Which players and/or friends that are displayed as suggested recipients of gifts can be dependent on variables such as how many times they have been attempting a level without succeeding or how long they have played the game in total. It can also be related to data from a social network to which the game is connected, such as how many interactions the player has had with different other players.

Figure 25:
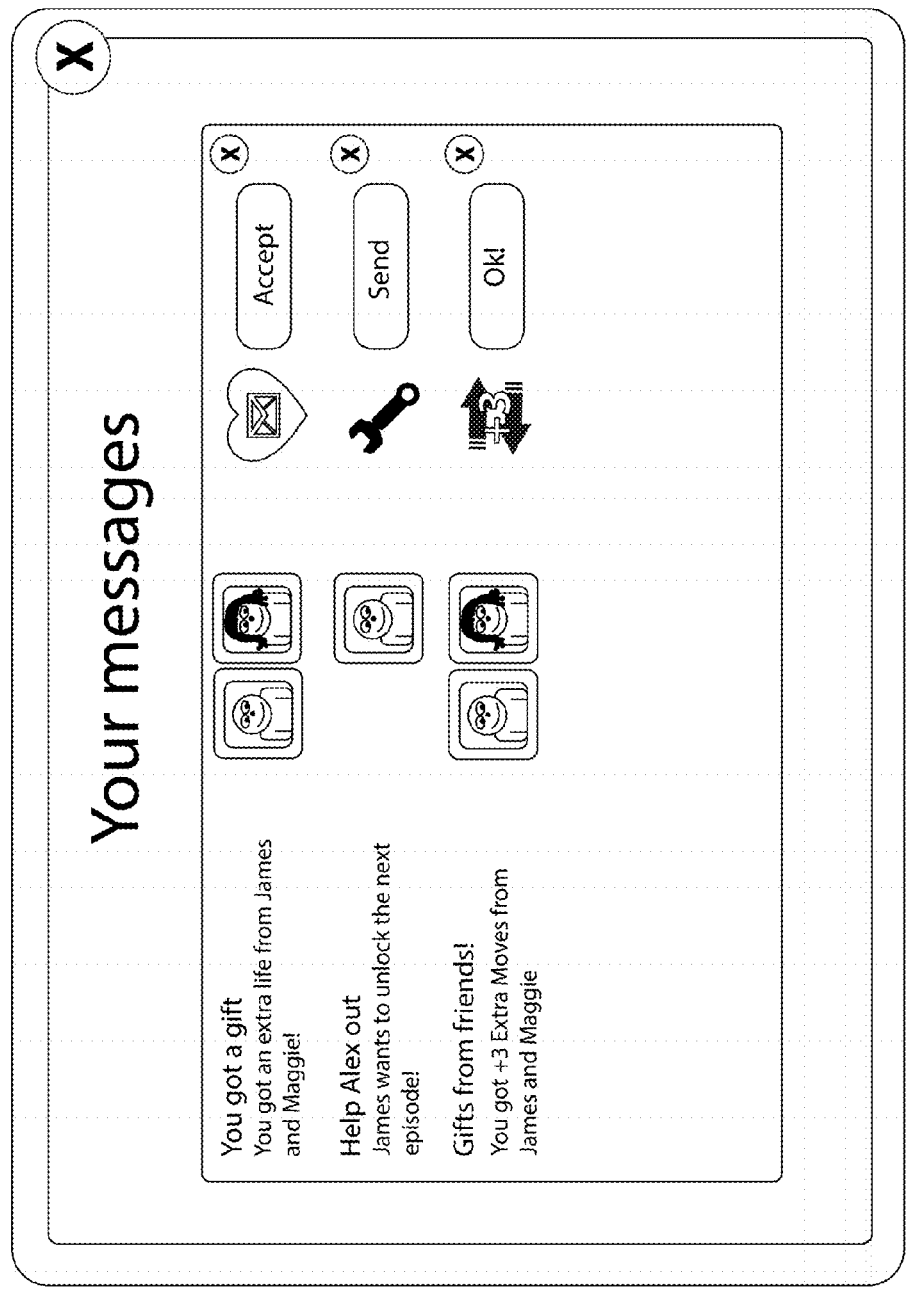
FIG. 25 shows an implementation of how lives and other gifts can be sent and received.

When starting the game, the player can be presented with a list of friends to send lives to. Another screen that can be presented when starting the game is one showing new messages. Gifts sent from other players can be displayed under messages, and certain free gifts such as lives can easily be reciprocated for free. Other gifts that cost money to send cannot always be freely reciprocated. In some implementations, the player can send a life back by just clicking a single button. The life can for instance be sent via the game platform or via a social network to which the game is connected. FIG. 25 shows one example of an implementation in which the player is prompted by the game to send lives to friends.

In some implementations the game prompts players to send lives to other players that have run out of lives. When a player completes a level after receiving help from a friend, a 'thank you'-message can be sent to that friend, either automatically or manually. This message can contain an item of value. In some implementations the player helping another player can get other benefits, such as special symbols or marks being displayed next to their names. Recognition is another benefit that can be awarded to players who help others.

In some implementations, lives that are received in the form of gifts have slightly different characteristics than lives that are gained by other means, such as time-based replenishment. For instance, lives in the form of gifts can make it possible for a player to have more than the otherwise maximum amount of lives. As an example, if the maximum amount of lives is five and the player gets sent an extra life, the player can have access to six lives. However, once the lives are reduced below the standard maximum threshold they will not automatically replenish above that, unless another gift is received.

Figure 26:
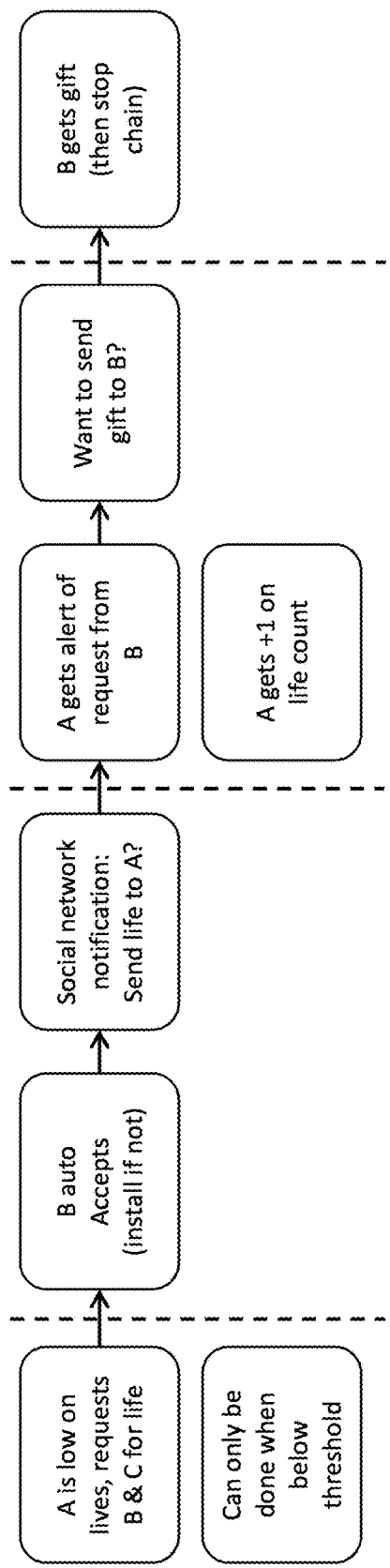
FIG. 26 shows an implementation of the chain of events when requesting and sending lives.

In the mobile version of the game, the player is presented with messages when logging in. Messages that are presented can be related to the player receiving lives and friends requesting lives. This is shown in the figure below. After receiving a life from a friend, the player is asked to send a life back. If choosing to send a life back in response, the friend who originally sent it will not get a request to send back yet another life. So, this chain of events has two steps if a player starts out by sending a life without request; step 1 is sending a life and step 2 is the recipient sending a life back in response or thanking the sending player in other ways, such as a thank-you message or by sending in-game currency. If a player starts with requesting a life, the chain of events has three steps; step 1 is requesting a life, step 2 is receiving a life, step 3 is sending a life or a thank-you message back in response. One implementation of this chain of events is illustrated in FIG. 26.

It is also possible to buy gifts in the in-game shop and send these to friends. Such gifts are in the form of boosters that can be used either during a level or before a level.

Sending help to other players in the form of for instance extra moves and extra time Another way of helping friends is to send items that provide in-game benefits, such as extra moves or extra time depending on the level requirements in the game. In some implementations, certain criteria must be fulfilled in order to send such help. The criteria can be related to how long a player has been stuck on the same level.

A list of friends playing the game can be presented, with suggestions of which ones to help. Some of these friends might have been stuck on a level for an extended period of time, and the player then has an option to help these players by sending extra moves or extra time, free of charge. This can be different from boosters that give extra moves or time, for instance by only being usable and available on a specific level. This can be a way of facilitating the harder levels of the game by receiving help from friends, increasing player engagement and viralisation.

It is also possible for the game to prompt the player to send help to friends that have been stuck on the same level for an extended period of time. In some implementations, this period of time is two days. In other implementations, the criteria for a player being stuck is related to the amount of times they have tried and failed a level.

Figure 27:
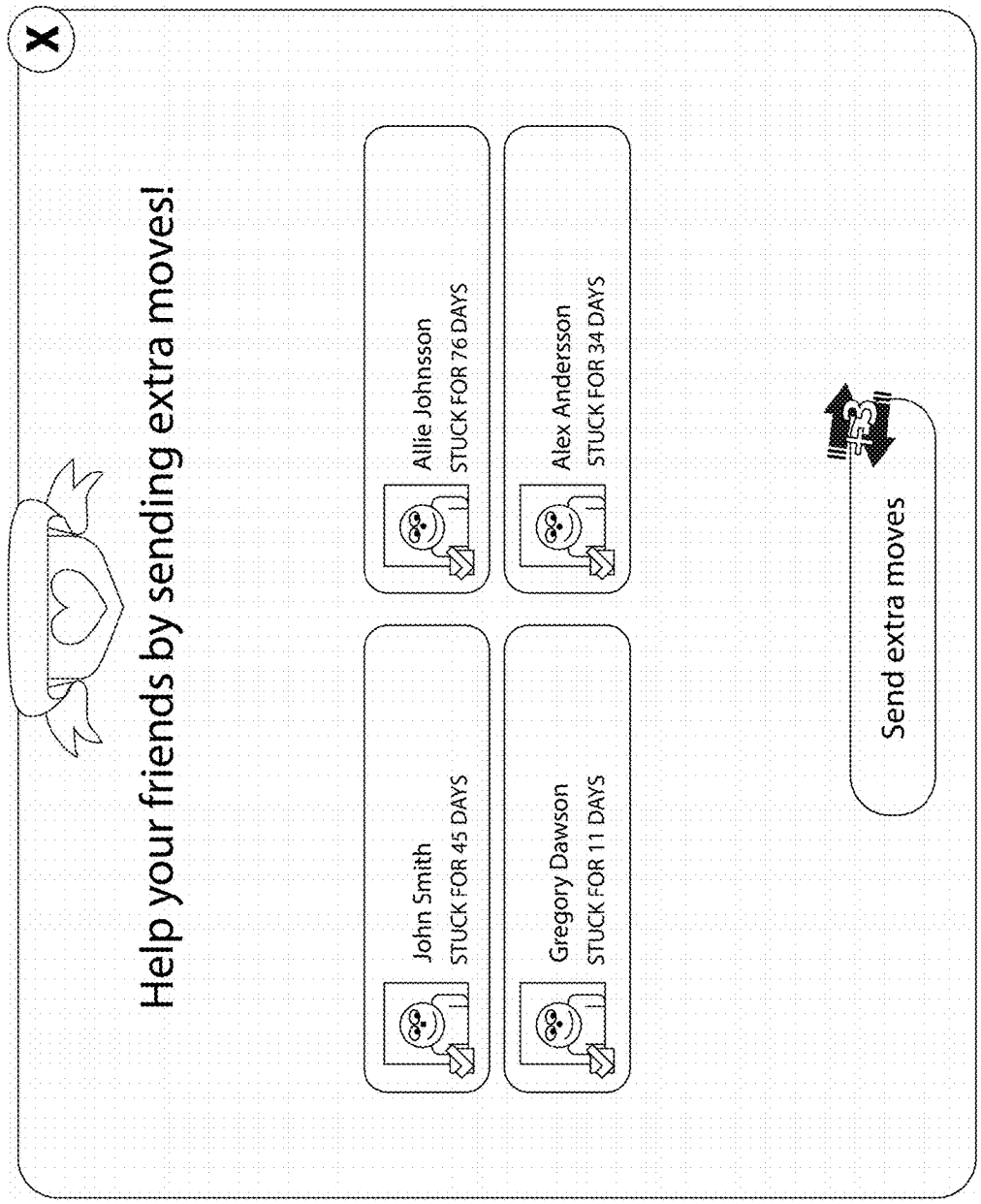
FIG. 27 shows a message board prompting the player to help friends that have been stuck for an extended period of time.

The prompting from the game can happen at different points in the game, for instance when a player logs onto the game. Such prompting is illustrated in FIG. 27. The prompting increases engagement by increasing the likelihood of someone providing help to players when the game is particularly difficult, and also adds a sense of collaboration and community among players. When a player has received extra moves, it can be indicated by a symbol next to the level in which the moves can be used.

In some implementations, the player can receive help from multiple friends. Help from multiple friends can be used at the same time or distributed over multiple occasions. When a player completes a level after receiving help from a friend, a 'thank you'-message can be sent to that friend. This message can have different implementations, such as the ones described in the passage above about a thank-you message related to sending lives.

Head to Head Tournaments

The game can also be implemented to be played in a tournament mode with a limited time or limited number of moves or both over a consecutive set of levels. The score can be collected over the several levels to give the player a score for all the levels completed. The tournament mode can in some implementations be played with a virtual map, in other implementations the game has a special interface for head to head competition. One such implementation can be a split-screen mode where each player can see what the other player does in real-time.

The player can in some implementations play the game in head to head tournaments against one or several other players. The player with the highest collective score over the number of levels will be the winner in the tournament. In some implementations the tournaments are played with real time comparisons of players' scores, in other implementations the scores of players are compared after finishing a level.

The game can also be played in tournaments with jackpots where the player plays the same level where the same types of game elements are used. Jackpots can be absolute or they can be given as a multiplier of a stake that the player can input.

The game can also be played in an elimination competition against other players.

Rewards and Bonuses

The game can have schemes for giving rewards and bonuses to players. One reason for giving out rewards is to increase player engagement, and to some extent to help with monetisation. Players can for instance be rewarded for playing. Criteria can include playing for multiple days in a row, playing a certain amount of games within a certain time frame, playing a certain amount of games per day, achieving a certain score per day, etc. This is something that awards persistence and dedication. In other implementations, there is a daily bonus available that is gained by every player playing the game online during that day, or to players passing a certain secret location during that day.

By giving players samples of existing boosters, they are given a free preview of purchasable items that potentially can lead to sales in the long run, which helps monetise the game. Some implementations contain boosters that regenerate over time, for example a booster that can be used once every two days.

Purchasing and In-Game Shop

It is possible for players to make purchases in the game or through a social network connected to the game. One way of making such purchases is through the in-game shop. The shop is accessible for instance through the virtual map screen, but depending on the implementation it can be available from any screen in the game. From the shop it is possible to buy permanent as well as non-permanent boosters. These boosters can be used to gain benefits in the game, or they can be sent to friends as gifts.

The player does not always have to enter the shop in order to purchase boosters. The pre-level screen is one example of where the player is presented with the option to buy boosters without first entering the shop. A person skilled in the art will understand that this is just one example, it is possible to have purchasing options available from any screen in the game. The purchases can be made through a game platform or through a social network to which the game is connected.

In one implementation, the game platform communicates with the social network platform to indicate that a player is interested in buying an item in the game. The player is then directed to a purchasing window associated with the social network to which the game is connected. This window can be within the social network interface or it can be related to a third party service that provides payment options. In the purchasing window the player can choose to pay with a currency associated with the social network, or with a corresponding amount of hard currency if the player does not have any stored currency associated with the social network.

In some implementations, the player is given the option to purchase certain boosters when failing a level. Specific boosters that are particularly effective on a certain level can be suggested. This is done to increase monetisation and help players overcome difficult levels.

It is also possible to have offers directed at specific groups of players, such as the ones who have not previously purchased anything. In some implementations, players who have not purchased anything will get an initial offer that is discounted from the standard price, in order to incentivise them to start making purchases in-game.

The currency used for purchases can be hard currency, soft currency or it can be based on in-game score. The currency can be associated with a social network to which the game is connected.

Cross-Device and Cross-Game Functionalities

Three platforms in particular are changing the way people expect games to be played. These three platforms are growing at the same time, and provide new input possibilities. To date, games have not absorbed all the new input possibilities.

The first platform is Facebook. The skilled person will understand that where Facebook is referred to in this document, other social network platforms may be used. A Facebook game may be a social game, a game you play with your friends. It is rare or unthinkable to launch a game (i.e. to play for the first time) on Facebook that is a paid game, because people playing games on Facebook expect not to pay to access a game. A Facebook game may be played on the internet, after logging in to Facebook (whether automatically or manually), such as from a personal computer.

The second platform is smartphones. Use of smartphones is not always continuous. You may use a smartphone for 5 minutes on a bus, and then for 20 minutes on a connecting train, for example. The use can have many starts and stops. Not like someone working at an office desk or at a home desk in a conventional way. A smartphone can be on an iOS platform, or on an Android platform, for example.

The third platform is tablets. What is a tablet? It can function as a mobile device and as a non-mobile device. The tablet can be a substitute for a personal computer. A user may want a seamless experience between using the game on a personal computer and on a tablet and on another mobile device. A tablet can be on an iOS platform, or on an Android platform, for example.

A game which works on a plurality of such as all three of the above platforms (or more), may provide a connected fully-synchronized seamless experience. Hence multi-platform games are important. Key criteria for multi-platform games are: they are free, they are social, stop-start use is possible, and seamless experience is provided. Such games may be "played anywhere" e.g. in a mobile environment or in a non-mobile environment. Such games may also be played online or offline.

The game must be fun when used in a stop-start way, and when used for even just short intervals. In an example, a game consists of parts or levels, each of which runs for about 3 minutes, eg. between 1 and 5 minutes. In an example, a game is structured in levels, so that if successful in a game level, such as by scoring a minimum score, a user can progress from that level to the next level. In an example, a game has about 200 levels.

A game can be optimized post-launch. For example, if it is clear that too many users are failing to progress past a particular level, the minimum score to pass the level can be lowered. An optimized game may be provided as an application update from an application store. In an alternative, a game may be optimized by a server sending a revised data file of scores required to pass each game level to a mobile device, when a game state of a user is being synchronized with the server, wherein the application running on the device replaces the previous file of scores stored on the device required to pass each level with the revised file of scores required to pass each level.

Some implementations of the game allows for the game state and for instance results of past levels and score to be synchronised between different devices or platforms. The synchronisation can happen while playing the game, if the player is connected, or it can be synced at certain times when the player chooses to connect to the game server. It is also possible for the player to play the game entirely in offline mode, but in that case there won't be real-time data available that relates to for instance the performance of other players. In a typical implementation, synchronisation of game progression between platforms can only happen when the player is connected to the game server.

The game can for instance be played in an offline mode on a handheld device using locally stored information on the handheld device. The device can store all or some of the levels that are available for the player to play in the game. Some of the features in the game can be locally run on the device and dependent on the local machine. Other features, such as data related to other players, will not be available in real time when playing offline, but rather gathered a certain points in time. One example of a locally run feature can for instance be that if the game is implemented to regenerate lives after a certain period of time, then the time can be locally decided based on the clock on the device. In some implementations, the central game server clock can override the local clock when the local device is or has been synchronised with the server.

A game can be implemented so that the player knows if it has synchronised the available data with the central server or servers. This can for instance be through a coloured symbol or a check mark that indicates that the information is up to date. The servers with which the game can synchronise include but are not limited to; a server running the game, servers hosting a social network to which the game is connected and a server hosting other games the player is active on.

The game can also indicate if it has been able to establish a connection with the central server for synchronisation or if for instance the network connection is down. That the device is offline can for instance be illustrated with a greyed out icon.

In some implementations, players can be rewarded for playing the game on multiple platforms. For instance, players that active on a computer-based platform could get a bonus for also installing the game on a handheld device. Such bonus may for instance be in the form of in-game currency, a booster to be used in the game or other in-game valuable object.

Players can also be rewarded for playing multiple games that are related, for instance games from the same developer. When choosing to play a new game, the player can receive bonuses in another game. This can be triggered by using a link from one game to the other, or by games sharing information between one other so that it automatically detects a player that is playing more than one game and subsequently rewards them. One way of rewarding players that play multiple games and/or play games on multiple platforms can be to give access to certain missions that are only available after fulfilling certain such criteria.

It is also possible that games may have elements in common that enables certain objects, for instance boosters, to be usable in multiple games. These games can be located on the same or on different servers. In some implementations, a booster bought in one game can be used in another game that shares certain features with it.

One example of an implementation with synchronisation across platforms is as follows:

A first server, for instance one hosting a social network, with a first data store storing data relating to the state of a game. The first server is configured to communicate with a first plurality of devices, such as mobile phones or personal computers, through a first application programming interface, where the first plurality of devices is related to a first computing platform.

A second server, for instance one hosting a game platform, with a second data store storing data relating to the state of the game. The second server is configured to communicate with a second plurality of devices, such as mobile phones or personal computers, through a second application programming interface, where the second plurality of devices is related to a second computing platform.

A third server with a third data store, configured to communicate with the first and the second server. The three servers are configured to synchronise the three data stores in such a way that when synchronized, the first, second and third data store all relate to a synchronised game state.

Localisation and Updates

It is possible for implementations of the game to vary depending on the location of the player. For instance, the language can be adapted and translated into different languages. It can also be so that updates of the game are incorporated at different times in different locations, in order to not interfere with for instance the times of the day that players are as most active.

If trying to access the game online, as opposed to starting a local version that is saved on the device, while updates are being made, the player can be met by a message saying that the game cannot be accessed right at that moment.

Concepts

There are multiple technical challenges facing the designer of computer implemented games. These challenges can be broadly categorised into the following areas: 'engagement'; 'viralisation' and 'monetisation'.

We will look first at 'engagement', which involves designing game play to be engaging and rewarding to players. This typically requires games to be easily understood at their simplest or introductory levels, providing rewarding game play with even quite simple game mechanics, but becoming progressively more challenging so that players are not bored, but remain engaged and develop rewarding skills Effective engagement requires various forms of feedback to reinforce players' sense of success and accomplishment. Effective engagement can be greatly magnified if the game has a social aspect—for example, it is linked into a social network so that game players can interact with their friends in the social network. The game can then transform into something that goes far beyond a simple solo game experience, into a shared journey.

'Viralisation' requires a game to be include various techniques that encourage players to share the game with others, encouraging them to play the game. It is a key technique in enabling mass-scale distribution or penetration of games. Viralisation can be especially effective when the game is integrated into a social network environment in some manner, so that the game can then propagate through the network of player's friends, and their friends and so on.

'Monetisation' covers those techniques that enable revenue to be generated from a game; this involves many challenges, because the monetisation techniques need to be acceptable to players and in no way undermine engagement.

A successful and original game will requires a team of game designers to solve complex problems of engagement, viralisation and monetisation; this can take many months of skilled work and, not infrequently, a great deal of trial-and-error testing of new ideas, functions and game mechanics before a game successfully combines all these elements into a new experience. The skilled game designer will appreciate that there is an almost infinite number of possible combinations of game features and mechanics available to him—although in isolation, these features may be known, it takes inventive insight to create a combination where there is some synergistic effect, or where the whole is more compelling than the mere sum of its parts.

Concepts

A gaming system in which functions and features relating to sharing players' game state information, including levels and achievements, on a virtual path (or other virtual world) with that player's social network friends is continuously or regularly optimized for engagement and monetization by continuously or regularly monitoring and analyzing player behavior and interaction, such as monetisation.

A gaming system in which a single user database, which may be distributed or centralised, tracks all metrics for all players, including all game state information, irrespective of the platform used by each of those players, and that single user database is accessible by several different games, such as a match 3 switcher and a match 3 clicker, a bubble shooter etc.

A casual, social game connected to a player's friends through a social network, in which every change in the game state, such as every move of a game piece by the user, and every consequential change in every game piece on the game board, is accompanied by sound and/or visual feedback to provide immediate, positive gratification to the player.

A match 3 switcher game, in which players can see their own and also their social network friends' game level position on a virtual path (or other virtual world) and in which game state information is fully sync'd across different platforms, such as iOS, desktop and Android via Facebook, so that a player can seamlessly stop and re-start playing the game on any of those different platforms.

A match 3 switcher game, in which a player's score and game level position and also the scores and game level positions of all their social network friends also playing the game, is fully sync'd across different platforms, such as iOS, desktop and Android via Facebook.

A match 3 switcher game, in which players can see their own and their social network friends' game level position on a virtual path (or other virtual world) and, in which each level of the game can be failed and, if a level is failed, the game automatically offers the player extra moves to purchase, to carry on playing the game.

A match 3 switcher game, in which players can see their own and their social network friends' game level position on a virtual path (or other virtual world), in which in-app purchases are bought for real or virtual currency by touching an icon of the booster shown next to the gameplay board, and then touching a 'buy' button that is subsequently displayed.

A match 3 switcher game, in which a player's score and game level position and also the scores and game level positions of all their social network friends also playing the game, is fully sync'd across different platforms, such as iOS, desktop and Android via Facebook, and there are sections of the game that must be unlocked through either help from those friends or through a purchase.

A match 3 switcher game, connected to a player's friends through a social network, in which friends can send gifts, boosters, extra moves, or extra lives to one another.

A match 3 switcher game, in which players can see their own and social network friends' game level position on a virtual path (or other virtual world) and where a visual prompt is displayed by the game if a friend's high score has been beaten by that player, the prompt enabling the player to send a message to that friend.

A match 3 switcher game, in which players can see their own and also their social network friends' game level position on a virtual path (or other virtual world) and where the player can play the game in offline mode on one platform/device and the progress in the game and other game state information is synchronised with a remote server when the device is online again and the player can continue playing the game on another platform.

A match 3 switcher game, in which players can see their own and their social network friends' game level position on a virtual path (or other virtual world) and the game enables the player to buy a permanent booster which can be used without limit in time.

A match 3 switcher game, in which players can see their own and their social network friends' game level position on a virtual path (or other virtual world), in which successive levels have different difficulty rankings to introduce variety even without a new game mechanic being introduced—e.g. after a difficult level, there is an easier level.

A match 3 switcher game, connected to a player's friends through a social network, where some or all of those friends are sent a message prompting the friend(s) to assist the player once that player has played, but not completed, a level, for more than a predefined time or predefined number of attempts.

A match 3 switcher game, or other kind of social, casual game, in which players can see their own and their social network friends' level position on a virtual path (or other virtual world) and where the player is prompted to notify a social network friend when the friend's high score on a specific level has been beaten by that player.

A match 3 switcher game, in which players can see their own and their social network friends' game level position on a virtual path (or other virtual world), in which the game state information is fully sync'd across different platforms, such as iOS, desktop and Android via Facebook, and, in which the gameplay for each level can be enhanced through the use of an acquired item, such as a booster.

A match 3 switcher game, in which players can see their own and their social network friends' game level position on a virtual path (or other virtual world), in which the game state information is fully sync'd across different platforms, such as iOS, desktop and Android via Facebook, and, in which the gameplay for each level can be enhanced through the use of an acquired item, such as a booster, and where the game state information relating to the acquisition or use of an acquired item is synchronized across several different platforms.

A match 3 switcher game, in which players can see their own and their social network friends' game level position on a virtual path (or other virtual world) and, in which the game board contains switchable elements that can be matched with other switchable elements and switchable elements that cannot be matched with other switchable elements on the game board, where one of the goals for completing a level is to interact with the game board in such a way that a predefined number of non-matchable switchable elements are placed in any of a plurality of predefined areas on the game board, such as being brought down from the top of the gameboard to the bottom.

A match 3 game in which the player has to satisfy multiple criteria within a limited number of moves to complete the level; in which the criteria include at least two of the following:

reaching a target score removing matchable game elements to clear a path for a non-matchable game element to reach a predefined area on the game board clear a predefined number of a certain type of game items layered on the game board having a matchable game element, together with each of the layered game items, where each layered game item can be removed by removing a matcheable game element in the same position as the layered game item.

A match 3 switcher game in which a player can purchase on-line a booster to aid gameplay and that booster, once available for use on the player's current platform, can be used immediately and alternatively on any other platform used by the player, and in which game state information for that player, including information relating to use of the booster, is synchronised using a remote server across each of several different devices used by that player.

A casual online game connected to a social network in which players can see their own and their social network friends' game level position on a virtual path (or other virtual world) with nodes representing levels in the game, and each node can reveal, in response to user input, a graphical preview representation of the gameboard for that level and, if the player has played that level before, a visual indication of how well the player succeeded on that level.

A match 3 switcher game in which, after a player has failed to meet the level completion criteria, a message is shown articulating why the level completion criteria was not met, and offering as the only visually significant option to replay the level.

A match 3 switcher game in which, after a player has achieved the level completion criteria, a message is shown articulating that the level was successfully completed, and offering as the only visually significant option to share information to a social network.

A match 3 switcher game in which, when matching 3 or more of the same type of game element the matched game elements are removed from the game board and replaced with a game element from the same type of game elements that has a higher stage, and when including the newly introduced game element in a new combination replacing it with another game element of a further higher stage, when the introduced game element reach a certain stage it is removed and all game elements of the same type on the game board are upgraded one level.

NB Each of the above concepts can be combine with any and all of the other high-level concepts. Also, although the high-level concepts are generally defined in relation to a match 3-switcher game, the concepts can be deployed in other game variants (e.g. clicker games).

Further High-Level Concepts

A gaming system in which a single user database, which may be distributed or centralised, tracks all metrics for all players, including all game state information, irrespective of the platform used by each of those players, and that single user database is accessible by several different games, such as a match 3 switcher or clicker, a bubble shooter etc.

A clicker game, in which players can see their own and also their social network friends' game level position on a virtual path (or other virtual world) and in which game state information is fully sync'd across different platforms, such as iOS, desktop and Android via Facebook, so that a player can seamlessly stop and re-start playing the game on any of those different platforms.

A clicker game, in which a player's score and game level position and also the scores and game level positions of all their social network friends also playing the game, is fully sync'd across different platforms, such as iOS, desktop and Android via Facebook.

A clicker game, in which players can see their own and their social network friends' game level position on a virtual path (or other virtual world) and, in which each level of the game can be failed and, if a level is failed, the game automatically offers the player extra moves to purchase, to carry on playing the game.

A clicker game, in which players can see their own and their social network friends' game level position on a virtual path (or other virtual world), in which in-app purchases are bought for real or virtual currency by touching an icon of the booster shown next to the gameplay board, and then touching a 'buy' button that is subsequently displayed.

A clicker game, in which a player's score and game level position and also the scores and game level positions of all their social network friends also playing the game, is fully sync'd across different platforms, such as iOS, desktop and Android via Facebook, and there are sections of the game that must be unlocked through either help from those friends or through a purchase.

A clicker game, connected to a player's friends through a social network, in which friends can send gifts, boosters, extra moves, or extra lives to one another.

A clicker game, in which players can see their own and social network friends' game level position on a virtual path (or other virtual world) and where a visual prompt is displayed by the game if a friend's high score has been beaten by that player, the prompt enabling the player to send a message to that friend.

A clicker game, in which players can see their own and also their social network friends' game level position on a virtual path (or other virtual world) and where the player can play the game in offline mode on one platform/device and the progress in the game and other game state information is synchronised with a remote server when the device is online again and the player can continue playing the game on another platform.

A clicker game, in which players can see their own and their social network friends' game level position on a virtual path (or other virtual world) and the game enables the player to buy a permanent booster which can be used without limit in time.

A clicker game, in which players can see their own and their social network friends' game level position on a virtual path (or other virtual world), in which successive levels have different difficulty rankings to introduce variety even without a new game mechanic being introduced—e.g. after a difficult level, there is an easier level.

A clicker game, connected to a player's friends through a social network, where some or all of those friends are sent a message prompting the friend(s) to assist the player once that player has played, but not completed, a level, for more than a predefined time or predefined number of attempts.

A clicker game, or other kind of social, casual game, in which players can see their own and their social network friends' level position on a virtual path (or other virtual world) and where the player is prompted to notify a social network friend when the friend's high score on a specific level has been beaten by that player.

A clicker game, in which players can see their own and their social network friends' game level position on a virtual path (or other virtual world), in which the game state information is fully sync'd across different platforms, such as iOS, desktop and Android via Facebook, and, in which the gameplay for each level can be enhanced through the use of an acquired item, such as a booster.

A clicker game, in which players can see their own and their social network friends' game level position on a virtual path (or other virtual world), in which the game state information is fully sync'd across different platforms, such as iOS, desktop and Android via Facebook, and, in which the gameplay for each level can be enhanced through the use of an acquired item, such as a booster, and where the game state information relating to the acquisition or use of an acquired item is synchronized across several different platforms.

A clicker game, in which players can see their own and their social network friends' game level position on a virtual path (or other virtual world) and, in which the game board contains switchable elements that can be matched with other switchable elements and switchable elements that cannot be matched with other switchable elements on the game board, where one of the goals for completing a level is to interact with the game board in such a way that a predefined number of non-matchable switchable elements are placed in any of a plurality of predefined areas on the game board, such as being brought down from the top of the gameboard to the bottom.

A clicker game in which the player has to satisfy multiple criteria within a limited number of moves to complete the level; in which the criteria include at least two of the following:
  reaching a target score
  removing matchable game elements to clear a path for a non-matchable game element to reach a predefined area on the game board
  clear a predefined number of a certain type of game items layered on the game board having a matchable game element, together with each of the layered game items, where each layered game item can be removed by removing a matcheable game element in the same position as the layered game item.

A clicker game in which a player can purchase on-line a booster to aid gameplay and that booster, once available for use on the player's current platform, can be used immediately and alternatively on any other platform used by the player, and in which game state information for that player, including information relating to use of the booster, is synchronised using a remote server across each of several different devices used by that player.

A clicker game in which, after a player has failed to meet the level completion criteria, a message is shown articulating why the level completion criteria was not met, and offering as the only visually significant option to replay the level.

A clicker game in which, after a player has achieved the level completion criteria, a message is shown articulating that the level was successfully completed, and offering as the only visually significant option to share information to a social network.

A clicker game in which, when removing a group of game elements of the same type of game element the matched game elements are removed from the game board and replaced with a game element from the same type of game elements that has a higher stage, and when including the newly introduced game element in a new combination of removed game elements replacing it with another game element of a further higher stage, when the introduced game element reach a certain stage it is removed from the game board and all other game elements of the same type on the game board are upgraded one level.

NB Each of the above concepts can be combine with any and all of the other high-level concepts. Also, although the high-level concepts are generally defined in relation to a specific type of game match 3-switcher game, the concepts can be deployed in other game variants (e.g. clicker games, match 3-switcher games, bubble shooter games, puzzle games).

Key Features Shared Across all High-Level Concepts

Game elements are the game pieces that are used in the match 3 switcher game

Game elements are shiny, reflective, brightly coloured candies, but the background gameplay region is dark and matt, so the game elements readily stand out, reducing cognitive load.

Some or all game levels are untimed, eliminating any time pressure; (e.g because a player can seamlessly stop and re-start playing the game at any time since game state information is stored, e.g. remotely and/or on the playing device)

Some or all levels have a true fail (which enables monetization through purchasing extra moves; true fails in casual games are rare because the assumption to the designer is that it will put people off playing the game; one implementation may manipulate the fail condition to make it feel agreeable).

Virtual path is through a candy-themed fantasy map

Continuous musical soundtrack plays during gameplay

Game generates and displays congratulatory messages when the player scores more than a predefined amount, or matches more than a predefined number of game elements, in a single move Failing a level is accompanied with a soothing, whistling soundtrack There is always an available match-3 switcher move, readily seen by the average player, that will score some points, whilst higher scoring moves are randomly available.

Games are played using software downloaded to an end-user device such as a smartphone, tablet, PC or laptop, or running remotely on a server, or a combination of the two, the software running on one or more processors, and the processor controls or is involved with all gameplay, game interaction, graphics displays, communication, interaction with social networks, synchronization across platforms, data storage, game state information.

Games are played using a hardware gaming system comprising processors and data memories, the system including multiple end-user devices, such as smartphones, tablets and PCs, as well as remotely connected servers, the gaming system enabling the games defined above to be played on the multiple end-user devices.

The game is defined using non-transitory computer readable medium encoded with instructions for controlling a hardware gaming system to display and enable users to play the games defined above.

Further Concepts

A match 3-game, fully sync'd across platforms, having an algorithm for automatically detecting when there are no possible moves left.

A match 3-game, fully sync'd across platforms, having an algorithm for re-shuffling the elements on the game board.

A switcher-based match 3-game fully sync'd a cross platforms, having sections which must be unlocked with the help of friends or through a purchase.

A switcher-based match 3-game, fully sync'd across platforms with at least 3-5 different goals for completing different levels.

A switcher-based match 3-game, fully sync'd across platforms, having a limited amount of lives that can be replenished either by waiting or by purchasing new lives.

A switcher-based match 3-game fully sync'd across different platforms.

A match-3 switcher game that offers users to buy permanent boosters which can be accessed one or more times for each time playing a level or once a day.

A match-3 switcher game which is connected to the player's friends through a social network and where friends can send gifts to each other.

A match-3 switcher game which is connected to the player's friends through a social network and where friends can help each other by sending extra moves or extra lives.

A match-3 switcher game which is connected to the player's friends through a social network and where friends can help each other by sending various boosters and where the help sent can only be used on the level the player is stuck on.

A match-3 game that has a sign in the shape of a bow tie or ribbon next to those level nodes on the visual path where help from the player's friends.

A match-3 game where there are six standard game elements to switch in the shape of candies.

A match-3 switcher game where the player's Facebook portrait moves along a virtual path when progressing through the game.

A match-3 game where there is a map showing the progress of the player and where the map looks like a foldable physical game board which has been place on top of a table.

A match-3 game where the player moves along a virtual path and where the path moves through different candy themed areas and where each area has its own sub-story with an intro and an end when entering and exiting each area respectively.

The switch-based match 3 game, comprising a special game element, which, variable in its character, can be automatically moved and combined with other game elements into a match combo, or is locked in the blocker that is required to be unlocked first.

The switch-based match 3 game, comprising a special game element, which, variable in its character, can remain as the same special game element after combinable moves are taken.

The switch-based match 3 game, comprising a special game element, which, variable in its character, can transform into a random game element that can either yield a combo to remove the game elements or yield an obstacle to block the combo, depending on the game elements it combined with.

The switch-based match 3 game, comprising a special game element, which can transform into another special game element that, when combined with other game elements, yields a special combo effect to remove all the game elements in a row and/or column, or a bigger area more than a layer.

The switch-based match 3 game, comprising a special game element, which can transform into another special game element that, when combined with other game elements, yields a special combo effect to remove game elements of the same colour.

The switch-based match 3 game, comprising a special game element, which can transform into another special game element that is not playable or movable unless it is unlocked first.

The switch-based match 3 game, comprising a special game element, which can transform into another special game element that, consume other game elements so that they are not playable or movable.]

2The switch-based match 3 game, comprising special boosters, which can be obtainable free of charge.

The booster element can be obtainable free of charge by installing the game at a different platform, e.g. iPad.

The booster can be obtainable free of charge by seeking help from social network friends.

The switch-based match 3 game, comprising special boosters, which are purchasable before or during the game level.

The switch-based match 3 game, comprising special boosters, which can smash and remove any game element.

The switch-based match 3 game, comprising special boosters, which allow the game element to switch if no any combinable move on the game board is available.

The switch-based match 3 game, comprising special boosters, which allow different special game elements to exist at the start of the game level.

The switch-based match 3 game, comprising special boosters, which add five to the count of the time-counting in-game elements on the game board.

The switch-based match 3 game, comprising special boosters, which rolls over an area on the game board by transforming into striped game element and creates three line blasts.

The switch-based match 3 game, comprising special boosters, which, following its path, can chomp away any game elements and have them removed at several squares.

The switch-based match 3 game, comprising special boosters, which more than one can be mixed or combined from a certain game level.

A match 3 switcher game, in which players can see their social network friends' level position on a virtual path and where the player can play the game in offline mode on one platform/device and the progress in the game is synchronised with a central server when the device is online again and the player can continue playing the game on another platform.

A casual online game connected to a social network where social network friends are prompted to assist another player if that other player has played, but not completed, a level meeting a certain criteria; the criteria can be any of the following The player has played the level a predefined number of times A predefined time has passed since the player first played the level A casual online game connected to a social network where social network friends are prompted to assist another player if that other player has played, but not completed, a level meeting a certain criteria, the help received can only be used by the player on that specific level.

A method for displaying score in a virtual game, comprising:

Measuring the score a player receives while playing a game; and

Visually representing an indication of how this score relates to one or multiple pre-defined goals;

Gathering information about the high scores of different players of the game level; and Comparing the current score of the player, the previous high score of the player and the high scores of other players; and During the play of the game, visually representing the difference between the current score, the different high scores and the pre-defined goals.

Although these ideas are generally defined in relation to a match 3-switcher game, the ideas can be deployed in other game variants (e.g. clicker games etc).

Summary of Other Features

Match 3 game

Match 4 for a special item

Match 5 for a special item

Combine special items for an explosion that clears game elements

Items are game elements

Six standard game elements with different appearance

Shiny, reflective, brightly coloured game elements; but background is matt

If the player doesn't make a move for a pre-set time, then a possible match-3 combination of game elements is shown, with each game element briefly illuminated or otherwise highlighted.

Continuous musical soundtrack

If 4 game elements are combined, then a striped game element results; combining that striped game element into a match-3 combination removes all game elements in the stripe direction for the row or column of the striped game element The direction of the stripes of a striped game element is perpendicular to the combination that created the striped game element The column and line that are removed are determined by the crossing point (the cell) in which the combination is made If 5 game elements are combined in a line, then a special game element results;

subsequently switching that special game element with an adjacent game element of a given colour then removes all game elements on the board in that colour.

If the special game element that removes all game elements of one colour is combined with a striped game element then all game elements of the striped game element's colour becomes triggered striped game elements If the special game element that removes all game elements of one colour is combined with another identical special game element then all game element son the game board are removed in a sweeping motion from left to right.

Removing game elements through combinations or special game elements only removes one 'layer'.

Some special game elements or combinations of regular game elements remove more than one 'layer'

Some elements on the game board can only be removed if an adjacent game element is removed.

Some elements 'consume' other game elements so that they are not playable or moveable.

Can only consume/move if there is a game element in an adjacent cell on the game board Some elements 'consume' other game elements so that they are not playable or moveable—they appear after Time Number of moves Number of moves that have not performed a specific action Some elements 'consume' other game elements so that they are not playable or moveable These game elements consume other game elements in a hierarchy: 1) Regular game elements, 2) special game elements Some special game elements can be swapped normally, which later transforms into a random game element that can be either a positive element or an obstacle.

Positive: e.g. a striped game element, a wrapped game element, a colour bomb, a fish, a lucky game element which can transform into useful element when removed, etc.

Negative: e.g. a piece of chocolate, (which, if left unchecked, will spread), a chocolate factory, a piece of licorice, a piece of cream of random "thickness", etc.

Congratulatory words on screen and spoken after good gameplay

Levels are timed

Levels are not timed

Levels contain non-combinable game elements that shall be moved to the last row on the screen where they disappear in order to complete the game.

All non-combinable game elements to be moved are on the game board at the start

All non-combinable game elements to be moved are not on the game board at the start and will be introduced during the gameplay when other game elements are removed The method on how the non-combinable game elements are introduced on to the game board Remove a certain number of some or all of the available types of matchablegame elements on the game board to complete the level.

The sequence of game elements is re-arranged (instead of "level failed") with the current elements on the board when no combinable moves are available during the level.

Blockers
  Jelly
  Expanding Chocolate blocker
  Frosting blocker
  1 Layer Frosting
  2 Layers Frosting
  3 Layers Frosting
  4 Layers Frosting
  5 Layers Frosting
  Licorice blocker
  Locked objects blocker
  Game element Cannon
  Chocolate fountain
  Marmelade
  Bomb (countdown bomb—one in each colour)
  Walls
  Net
Boosters
  Free Switch
  Shuffle
  Bomb Cooler
  Sweet Teeth
  Coconut licorice
  Free switcher hand
  Paintbrush
  Frozen clock charm
  +3 Heart charm Mix paper bag
Booster fish
Booster 5 switch
Bubblegum Troll
Other In-Game Elements
  Mystery Game element—One in each colour
  Lucky Game element—One in each colour
  Fish—One in each colour
    Regular
    Wrapped
    Polka
  Wrapped fish—One in each colour
  Polka fish—One in each colour
  Black Metal Game element
  Time Bomb Maker
  A part of the game board that moves a game element that passes through it to a different part on the game board
  Levels can be completed in under 80 moves
  Each level has a true fail, giving player option to play that level again
  Failing a level is accompanied with a soothing whistling soundtrack
  Succeeding at a level moves the user one step along a virtual path
  The virtual path is set on a candy themed fantasy map which has the appearance of a physical game board that is foldable and placed on top of a table.
  Moving along the virtual path transports the player through different themed landscapes/areas and when entering a new landscape a sub-story begins which then ends when that landscape has been progressed through.
  On the virtual path there are level nodes representing each level. The level nodes have a specific look depending on what type of goal the level they represent has.
    Shown on all levels
    Shown on all unlocked levels
    Each node can reveal a preview thumbnail of the level
    The thumbnail can show how well the player has succeeded on that level before (stars, points, place in high score list)
Game Life
  The maximum game life is set (5 times). The player will lose a life if fails a level.
  1. Players automatically gain one game life every 30 minutes free of charge.
  2. Chance of purchasing game life is provided if no game life is available.
  3. Seek friends' help is possible through social network Facebook. Players may send requests for more lives by clicking the icon on the screen, which will launch a Facebook pop-up that allows the player to select friends individually.
  4. A special method of adding game life is to purchase the Charm of Life from which the player may increase number of maximum lives from five to eight. The change of default life time can be permanent through a full refill Charm of life.
  Players can see their social network friends' position on the virtual path
  Players can see their social network friends' scores for a level, e.g. when they complete that level
  Players can see their social network friends' scores for the same level they are currently playing on the star meter together with their friends' portrait
  Players can post their results for a level on their Facebook wall
  The player is prompted to post a message/on the wall of a friend that is passed in the high score list
  The player is presented with the option o texted the play on the level (more moves or time) to beat one of the friends in that level.
    Can be triggered by that the player is within a threshold of the friend's score on that level
  Players can see the full extent of the virtual path
  Number of levels in the path is being increased by the game designer every few days or weeks
  Every interaction is accompanied with sound and a visual feedback
  When a level is failed, the player is offered extra moves to purchase
  The player can buy in-app boosters and charms to help with the current level
  Boosters can be bought before a level
  Boosters can be bought during a level
  There is a booster that lets the player switch two game elements that do not match
  There is a booster that gives additional time for the player to complete a timed level Coconut Wheel, a booster that rolls over an area on the game board by transforming into striped game element and creates (3) line blasts
  The method to define where the coconut wheel is to roll (if that is not defined by the user)
  A booster that instantly gives 5 extra moves
  A booster that inserts special elements (jelly fishes) on the game board which clears three pieces of jelly when matched
  A booster that lets the player start a level with a colour bomb three times
  A booster that lets the player start a level with one bomb and one lineblast 3 times
  Lollipop booster: A booster that may smash and remove any game element
  Stripe & wrap booster: A booster that gives a striped game element and a wrapped game element at the beginning of the game.
  Shuffle Game element: A booster that allows to shuffle the game element on the board if no any good move is available.
  Bomb Cooler booster: A booster that adds five to the count of all the visible bombs on the game board
  Boosters can be permanent and available to the player for all levels or they can be non-permanent and need to be topped-up through purchases or help from friends
  The player can choose to use boosters both before starting a level and during the play of a level.
  In-app purchases are bought by touching an icon of the booster shown next to the gameplay board, and then touching a 'buy' button that is subsequently displayed
  At some levels, the player may ask friends from her social network to help
  Social network friends can provide a player with boosters and extra moves
  Social network friends are prompted to help out if the player has been 'stuck' on a level for a specified time without completing the level.
    The received help can only be used for that specific level where the player has been stuck
    The player can receive help from several friends (can in different implementations use help from several friends or only from one friend)
  Social network friends are prompted to help out if the player has played a level a certain number of times without completing the level.
  Social network friends are prompted to help if the player has run out of game life and wish to continue the game.
  The help that can be sent to a stuck friend can be extra moves to be used for free in that specific level That the player has received from a friend is indicated on the overview map in relation to the level where the help can be used In one implementations if the player has completed the level using the help from a specific friend a 'thank you' message is sent to the helping friend.

That message can be an item of value

The message can be a message only

The helping friend can get another benefit

The helping friend can get recognition

A player that is stuck can 'buy' himself past that level with help from friends—receiving help/unlocking from a plurality of friends gets the player past the level.

All levels require the player to combine game elements in various combinations Successive levels can have different difficulty rankings—e.g. after a tough level, there is an easy level.

Goal for successive levels may change—e.g. one level may require the player to clear all the jellies, and the next may require the player to bring down all the special non-candy foods. Or successive levels may require jellies to be cleared, but have very different shapes of the gameboard and blockers.

A goal may be to collect, by making combos, a certain amount of game elements, special game elements or specific combos in order to complete a level.

Fully sync'd across iOS, desktop and Android via Facebook.

Some levels are designed to be exceptionally difficult to succeed at through skill alone.

Game is free to play, but in-game purchases can be made for boosters/charms to help gameplay.

The tutorial of the game spans over the first six levels.

The game board's grid has a maximum size of 9×9

The invention claimed is:

1. A computer implemented method for controlling the view of a gameboard for a computer game on a display of a computing device comprising one or more processors by executing computer code on said one or more processors to perform the steps of:
  controlling the display to electronically display computer game graphics of the gameboard with multiple game elements that are removed when matched by drawing on the display the multiple game elements in a series of rows and columns, wherein the gameboard comprises more rows than are displayed on the display at any one time;
  controlling the display so as to show at least one or said game elements moving down the gameboard to fill gaps;
  configuring at least one of said processors to determine that none of said multiple game elements satisfy a match condition; and
  in response to determining that none of said multiple game elements satisfy a match condition, scrolling the electronic display of the game graphics of the gameboard down and removing game elements of a top row of game elements from the gameboard.

2. The method of claim 1 in which an object of the game is to remove a target percentage of the game elements or a predefined quantity of the game elements.

3. The method of claim 1 in which a line blast booster that clears all game elements along a line of the gameboard can be selected and moved by a player of the game to a specific line.

4. The method of claim 1 further comprising controlling the display to show more than a target number of the game objects of said first type being brought to the bottom of the gameboard, to earn a player of the game additional points or bonuses.

5. The method of claim 1 in which some or all game levels have no time limit.

6. The method of claim 1 in which the game is a casual, social game and some or all levels have a true fail.

7. The method of claim 1 further comprising playing a continuous musical soundtrack during gameplay.

8. The method of claim 1 further comprising generating and displaying on said display congratulatory messages when a player of the game scores more than a predefined amount, or matches more than a predefined number of game elements, in a single move.

9. The method of claim 1 further comprising automatically detecting when there are no possible moves left.

10. The method of claim 1 further comprising re-shuffling the game elements on the game board.

11. The method of claim 1 in which said one or more processors control said display to display, if no move has been made for more than a predefined period of time, help or hints comprising brightening and enlarging game elements that may be used in a possible move on the board with a flashing animation.

12. The method of claim 1 in which a processor is programmed to require a player to reach a target score before running out of moves in order to complete a level successfully, and the level has no time limit.

13. The method of claim 1 in which a processor is programmed to automatically replenish a life for a player every 30 minutes.

14. The method of claim 1 in which a processor is programmed to control the display to show, if a player finishes a level in under the target number of moves, random game elements on the game board being triggered and the player receiving bonus points.

15. The method of claim 1 in which a processor is programmed to, if a level is finished with moves left, control the display to show those moves being converted to special game elements that trigger for extra bonus points.

16. The method of claim 1 further comprising transmitting a request for lives to a social network contact of a player of the game.

17. The method of claim 16, further comprising transmitting a request for other help to a social network contact of said player of the game.

18. The method of claim 1 further comprising transmitting a message to social network friends of a player of the game if said player has played, but not completed, a level meeting a certain criteria.

19. The method of claim 1 further comprising transmitting a gift to a social network contact of a player of the game.

20. The method of claim 1 further comprising synchronising the game state between different devices.

21. The method of claim 1 in which a processor is programmed so that a player can seamlessly stop and re-start playing the game.

22. The method of claim 1 in which every change in the game state, and every change in every game piece on the game board, is accompanied by sound and visual feedback.

23. The method of claim 1 further comprising preserving game state information, enabling a remote server system to identify a player and all aspects of the state of the game they are playing, so that the player can end game play on one device and resume from a different device at a later time at exactly the same state.

24. The method of claim 1 in which the different device is a different type of device.

25. The method of claim 1 further comprising accessing the game through a social network.

26. The method of claim 1 in which the game is a casual, social game, that can be downloaded as an app to a smartphone and/or tablet computer and which can be accessed or played using a social network application or environment.

27. The method of claim 1 in which the processor is programmed to control the display to show a virtual path or other virtual world that indicates the level reached by a player and that player's social network friends.

28. The method of claim 1 in which the design of the game is optimised through a process including the step of: using data analytics to understand the impact of changes to the game design in terms of player engagement and/or monetisation and/or viralisation and; implementing changes to the game design.

29. The method of claim 1, wherein said columns are irregularly arranged and at least some of said columns comprise different numbers of game elements.

30. The method of claim 1, wherein said one or more processors are further programmed to: control the display to show one or more game objects of a first type placed on or amongst the game elements.

31. The method of claim 30, further comprising controlling the display to show a game object of said first type being placed within a blocking element, wherein said blocking element cannot be removed when matched or switched with other blocking elements.

32. The method of claim 31 in which said blocking element can only be removed from the gameboard when a game object of a second type is moved adjacent to that blocking element.

33. The method of claim 30, further comprising controlling the display to show the game objects of said first type being animated.

34. A computer implemented method for controlling the display of a computing device adapted to play a computer game, said computing device comprising one or more processors and a display, said method being performed by executing computer code on said one or more processors to perform the steps of:
controlling the display to electronically display computer game graphics of a gameboard with multiple first game elements that are removed when matched by drawing on the display said multiple first game elements in a series of rows and columns, said first game elements supporting an object;
controlling the display to electronically display a number of second game elements associated with said object;
upon at least some of said first game elements supporting the object being matched and removed, controlling the display to display the object hanging unsupported;
controlling at least one of said processors to determine that a predetermined time period has expired, wherein said predefined time period is dependent upon the number of said second game elements associated with said object; and
in response to determining that said predetermined time period has expired, controlling the display to electronic display said object falling down the gameboard and removing one or more first game elements in its path, wherein the number of first game elements removed is dependent upon physics properties of the object.

35. The method of claim 34 further comprising enabling a player to remove blocks by the player clicking on blocks.

36. The method of claim 34 further comprising controlling the display to show blocks being removed by the object crushing the blocks as it falls on them, the number of blocks crushed being a function of the physics properties of the falling object.

37. The method of claim 34 in which the first game elements are square, cuboid, brick-shaped, or spherical.

38. The method of claim 34 in which the object is at least one of:
a girder, brick, person, animal, house, or household object.

39. The method of claim 34, wherein said columns are irregularly arranged and at least some of said columns comprise different numbers of game elements.

40. A computing device adapted to play a computer game, the device including a processor, a memory, a display, a touch screen or a cursor based input device, and computer code stored in device memory or on a remote server and executable by the device processor or a remote processor, and in which said one or more processors execute said computer code to perform the steps of:
controlling the display to electronically display computer game graphics of a gameboard with multiple game elements that are removed when matched by drawings on the display the multiple game elements in a series of rows and columns, wherein the gameboard comprises more rows than are displayed on the display at any one time as irregularly arranged columns of coloured blocks;
controlling the display so as to show at least one of said game elements moving down the gameboard to fill gaps;
controlling the processor to determine that none of said multiple game elements satisfy a match condition; and
in response to determining that none of said multiple game elements satisfy a match condition, scrolling the electronic display of the game graphics of the gameboard down and removing game elements of a top row of game elements from the gameboard.

* * * * *